(12) United States Patent
Nakamura

(10) Patent No.: US 7,924,666 B2
(45) Date of Patent: Apr. 12, 2011

(54) DRIVE DEVICE

(75) Inventor: Tadashi Nakamura, Nara (JP)

(73) Assignee: Panasonic Corporation, Osaka (JP)

( * ) Notice: Subject to any disclaimer, the term of this patent is extended or adjusted under 35 U.S.C. 154(b) by 981 days.

(21) Appl. No.: 11/570,730

(22) PCT Filed: Jun. 15, 2005

(86) PCT No.: PCT/JP2005/010963
§ 371 (c)(1),
(2), (4) Date: Jun. 4, 2007

(87) PCT Pub. No.: WO2005/124773
PCT Pub. Date: Dec. 29, 2005

(65) Prior Publication Data
US 2008/0019247 A1    Jan. 24, 2008

(30) Foreign Application Priority Data

| Jun. 15, 2004 | (JP) | 2004-177662 |
|---|---|---|
| Jun. 15, 2004 | (JP) | 2004-177663 |
| Jun. 15, 2004 | (JP) | 2004-177664 |
| Jun. 15, 2004 | (JP) | 2004-177665 |
| Jun. 15, 2004 | (JP) | 2004-177666 |
| Jun. 15, 2004 | (JP) | 2004-177668 |
| Jun. 25, 2004 | (JP) | 2004-189013 |
| Sep. 2, 2004 | (JP) | 2004-255440 |

(51) Int. Cl.
*G11B 7/00* (2006.01)

(52) U.S. Cl. ............... 369/47.14; 369/47.15; 369/53.17; 369/59.25

(58) Field of Classification Search ............... 369/47.14, 369/47.15, 47.22, 53.17, 59.25
See application file for complete search history.

(56) References Cited

FOREIGN PATENT DOCUMENTS

| JP | 60-086622 | 5/1985 |
|---|---|---|
| JP | 06-275023 | 9/1994 |
| JP | 11-213626 | 8/1999 |
| JP | 11-339385 | 12/1999 |
| JP | 2000-040306 | 2/2000 |
| JP | 2001-143399 | 5/2001 |

OTHER PUBLICATIONS

International Search Report dated Sep. 16, 2005.

*Primary Examiner* — Jorge L Ortiz Criado
(74) *Attorney, Agent, or Firm* — Snell & Wilmer L.L.P.

(57) ABSTRACT

A drive apparatus of the present invention includes a recording/reproduction section and a drive control section. The drive control section at least performs a process including: receiving a recording instruction at least specifying a location at which data is to be recorded; determining whether a data recording which is performed in accordance with the recording instruction is an appending recording, a first time pseudo-overwrite recording or a second time or more pseudo-overwrite recording; generating data including location information before replacement having information set therein according to the result of the determination; and controlling the recording/reproduction section to record the data in one of the plurality of ECC clusters of the write-once recording medium.

6 Claims, 44 Drawing Sheets

Session management information 200

Track management information 210

Space bitmap management information 220

FIG.3

Disc structure information 1100

| General information 1101 |
|---|
| Replacement management information list location information 1102 |
| User area start location information 1103 |
| User area end location information 1104 |
| Spare area information 1105 |
| Recording mode information 1106 |
| Last recorded address information 1107 |
| Disc management information area information 1107b |
| Spare area management information 1108 |
| Session management information location information 1109 |
| Space bitmap management information location information 1110 |

PRIOR ART

Replacement management information list 1000

Replacement management information 1010

PRIOR ART

PRIOR ART

PRIOR ART

FIG.11

Replacement management information 1010B

| Status information 1011 | | | Original location information 1012 | Replacement location information 1013 | Type |
|---|---|---|---|---|---|
| Flag1 | Flag2 | Flag3 | | | |
| 0 | 0 | 00 | Defective cluster or Overwritten cluster location information | Replacement cluster location information (in Spare area) | (1) |
| 0 | 0 | 01 | Defective clusters or Overwritten clusters start location information | Replacement cluster start location information (in Spare area) | (2) |
| 0 | 0 | 10 | Defective clusters or Overwritten clusters end location information | Replacement cluster end location information (in Spare area) | (3) |
| 0 | 1 | 00 | Defective cluster or Overwritten cluster location information | Replacement cluster location information (in User data area) | (4) |
| 0 | 1 | 01 | Defective clusters or Overwritten clusters start location information | Replacement cluster start location information (in User data area) | (5) |
| 0 | 1 | 10 | Defective clusters or Overwritten clusters end location information | Replacement cluster end location information (in User data area) | (6) |
| 1 | 0 | 00 | Defective cluster location information | — | (7) |

Flag1
  For replacement: 0
  For defect: 1

Flag2
  Replace in Spare area or no replacement cluster: 0
  Replace in User data area: 1

Flag3
  Single cluster : 00
  Contiguous clusters (start location) : 01
  Contiguous clusters (end location) : 10

FIG. 13A

| PSN | Data |
|---|---|
| 100-131 | A1 |
| 132-163 | B |
| 164-195 | (Unrecorded) |
| 196-227 | (Unrecorded) |
| ... | ... |
| 1100-1131 | A |
| 1132-1163 | [Defective] |
| 1164-1195 | (Unrecorded) |
| 1196-1227 | (Unrecorded) |
| 1228-1259 | (Unrecorded) |
| 1260-1291 | (Unrecorded) |
| 1292-1323 | (Unrecorded) |
| 1324-1355 | (Unrecorded) |
| 1336-1382 | (Unrecorded) |
| ... | ... |

| LSN | Data |
|---|---|
| 0-31 | A1 |
| 32-63 | B |
| 64-95 | (Unrecorded) |
| 96-127 | (Unrecorded) |
| 128-159 | (Unrecorded) |
| 160-191 | (Unrecorded) |
| 192-223 | (Unrecorded) |
| 224-255 | (Unrecorded) |
| 256-287 | (Unrecorded) |
| ... | ... |

Inner spare area 106
User data area 108
LRA 500A

| Status information | | | Original location | Replacement location | |
|---|---|---|---|---|---|
| 0 | 0 | 00 | 1100 | 100 | 511 |
| 0 | 0 | 00 | 1132 | 132 | 512 |

FIG. 14A

| PSN | Data |
|---|---|
| 100-131 | A1 |
| 132-163 | B |
| 164-195 | (Unrecorded) |
| 196-227 | (Unrecorded) |
| ... | ... |
| 1100-1131 | A |
| 1132-1163 | [Defective] |
| 1164-1195 | [Defective] |
| 1196-1227 | C |
| 1228-1259 | D |
| 1260-1291 | [Defective] |
| 1292-1323 | D1 |
| 1324-1355 | D2 |
| 1336-1382 | (Unrecorded) |
| ... | ... |

Inner spare area 106
User data area 108
LRA 501B
LRA 500B

| LSN | Data |
|---|---|
| 0-31 | A1 |
| 32-63 | B |
| 64-95 | C |
| 96-127 | (Unrecorded) |
| 128-159 | D2 |
| 160-191 | (Unrecorded) |
| 192-223 | (Unrecorded) |
| 224-255 | (Unrecorded) |
| 256-287 | (Unrecorded) |
| ... | ... |

| Status information | | | Original location | Replacement location | |
|---|---|---|---|---|---|
| 0 | 0 | 00 | 1100 | 100 | 511 |
| 0 | 0 | 00 | 1132 | 132 | 512 |
| 0 | 1 | 00 | 1164 | 1196 | 513 |
| 0 | 1 | 00 | 1228 | 1292 | 514 / 514A |
| 0 | 1 | 00 | 1228 | 1324 | 515 |
| 1 | 0 | 00 | 1260 | 0 | |

| Status information | | | Original location | Replacement location | |
|---|---|---|---|---|---|
| 0 | 0 | 00 | 1100 | 100 | 511 |
| 0 | 0 | 00 | 1132 | 132 | 512 |
| 0 | 1 | 00 | 1164 | 1196 | 513 |
| 0 | 1 | 00 | 1228 | 1324 | 514A |
| 0 | 1 | 01 | 1336 | x2 | 516 |
| 0 | 1 | 10 | x1 | x3 | 517 |
| 1 | 0 | 00 | 1260 | 0 | 515 |

1000C

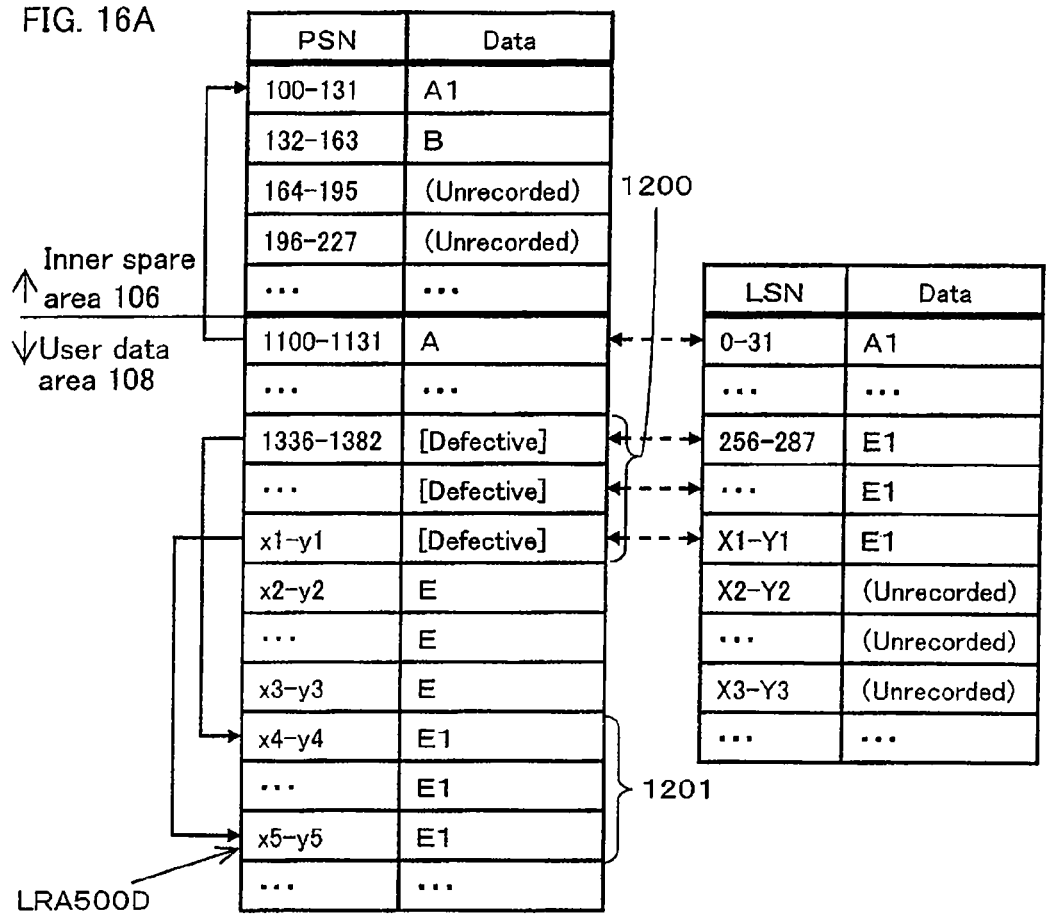

FIG. 18

DFL entry 2010

| Status 1 2011A | Defective cluster first PSN 2012 | Status 2 2011B | Replacement cluster first PSN 2013 |
|---|---|---|---|

FIG. 20A

|  | PSN | Data |
|---|---|---|
|  | ... | ... |
| LRA | 1000-1131 | A0 |
|  | 1132-1163 | (Unrecorded) |
|  | 1164-1195 | (Unrecorded) |
|  | 1196-1227 | (Unrecorded) |
|  | 1228-1259 | (Unrecorded) |
|  | 1260-1291 | (Unrecorded) |
|  | 1292-1323 | (Unrecorded) |
| User data area 108 | 1324-1355 | (Unrecorded) |
|  | ... | ... |
| Outer spare area 107 | x10-y10 | ... |
|  | ... | ... |

| LSN | Data |
|---|---|
| ... | ... |
| 0-31 | A0 |
| 32-63 | (Unrecorded) |
| 64-95 | (Unrecorded) |
| 96-127 | (Unrecorded) |
| 128-159 | (Unrecorded) |
| 160-191 | (Unrecorded) |
| 192-223 | (Unrecorded) |
| 224-255 | (Unrecorded) |
| ... | ... |

FIG. 20B

| Header information 1001 |
|---|

FIG. 21A

| PSN | Data |
|---|---|
| ... | ... |
| 1000-1131 | A0 |
| 1132-1163 | A1 |
| 1164-1195 | (Unrecorded) |
| 1196-1227 | (Unrecorded) |
| 1228-1259 | (Unrecorded) |
| 1260-1291 | (Unrecorded) |
| 1292-1323 | (Unrecorded) |
| 1324-1355 | (Unrecorded) |
| ... | ... |
| x10-y10 | ... |
| ... | ... |

LRA (points to 1132-1163)

User data area 108 / Outer spare area 107

| LSN | Data |
|---|---|
| ... | ... |
| 0-31 | A1 |
| 32-63 | (Unrecorded) |
| 64-95 | (Unrecorded) |
| 96-127 | (Unrecorded) |
| 128-159 | (Unrecorded) |
| 160-191 | (Unrecorded) |
| 192-223 | (Unrecorded) |
| 224-255 | (Unrecorded) |
| ... | ... |

FIG. 21B

| Header information 1001 | | | |
|---|---|---|---|
| 0000 | 1000 | 0000 | 1132 |

| PSN | Data |
|---|---|
| ... | ... |
| 1000-1131 | A0 |
| 1132-1163 | A1 |
| 1164-1195 | A2 |
| 1196-1227 | (Unrecorded) |
| 1228-1259 | (Unrecorded) |
| 1260-1291 | (Unrecorded) |
| 1292-1323 | (Unrecorded) |
| 1324-1355 | (Unrecorded) |
| ... | ... |
| x10-y10 | ... |
| ... | ... |

LRA points to 1164-1195

User data area 108 / Outer spare area 107

| LSN | Data |
|---|---|
| 0-31 | A2 |
| 32-63 | (Unrecorded) |
| 64-95 | (Unrecorded) |
| 96-127 | (Unrecorded) |
| 128-159 | (Unrecorded) |
| 160-191 | (Unrecorded) |
| 192-223 | (Unrecorded) |
| 224-255 | (Unrecorded) |
| ... | ... |

FIG. 22B

| Header information 1001 | | | |
|---|---|---|---|
| 0000 | 1000 | 0000 | 1164 |

| PSN | Data |
|---|---|
| ... | ... |
| 1000-1131 | A |
| 1132-1163 | A1 |
| 1164-1195 | A2 |
| 1196-1227 | [Defective] |
| 1228-1259 | C0 |
| 1260-1291 | C0 |
| 1292-1323 | C0 |
| 1324-1355 | (Unrecorded) |
| ... | ... |
| x10-y10 | B0 |
| ... | ... |

| LSN | Data |
|---|---|
| ... | ... |
| 0-31 | A2 |
| 32-63 | (Unrecorded) |
| 64-95 | (Unrecorded) |
| 96-127 | B0 |
| 128-159 | C0 |
| 160-191 | C0 |
| 192-223 | C0 |
| 224-255 | (Unrecorded) |
| 256-287 | (Unrecorded) |
| 288-319 | (Unrecorded) |
| ... | ... |

LRA

User data area 108

Outer spare area 107

FIG. 23B

| Header information 1001 | | | |
|---|---|---|---|
| 0000 | 1000 | 0000 | 1164 |
| 0000 | 1196 | 0000 | x10 |

2100B
2101A

| Header information 1001 | | | | |
|---|---|---|---|---|
| 0000 | 1000 | 0000 | 1164 | 2100B |
| 0000 | 1196 | 0000 | x10 | 2101A |
| 0000 | 1228 | 0001 | 1324 | 2102A |
| 0000 | 1292 | 0010 | 1388 | 2103A |

FIG. 26A

| PSN | Data |
|---|---|
| 100-131 | A1 |
| 132-163 | B |
| 164-195 | (Unrecorded) |
| 196-227 | (Unrecorded) |
| ... | ... |
| 1000-1131 | A |
| 1132-1163 | [Defective] |
| 1164-1195 | [Defective] |
| 1196-1227 | C |
| 1228-1259 | D |
| 1260-1291 | [Defective] |
| 1292-1323 | D1 |
| 1324-1355 | D2 |
| 1336-1367 | F |
| 1368-1399 | G |
| ... | ... |

Inner spare area 106
User data area 108
LRA 500F

| LSN | Data |
|---|---|
| 0-31 | A1 |
| 32-63 | B |
| 64-95 | C |
| 96-127 | D2 |
| 128-159 | F |
| 160-191 | G |
| 192-223 | (Unrecorded) |
| 224-255 | (Unrecorded) |
| 256-287 | (Unrecorded) |
| 288-319 | (Unrecorded) |
| ... | ... |

| Status information | | | Original location | Replacement location | |
|---|---|---|---|---|---|
| 0 | 0 | 00 | 1000 | 100 | 521 |
| 0 | 0 | 00 | 1132 | 132 | 522 |
| 0 | 1 | 00 | 1164 | 1196 | 523 |
| 0 | 1 | 00 | 1196 | 1324 | 524 |
| 0 | 1 | 00 | 1228 | 1336 | 525 |
| 0 | 1 | 00 | 1260 | 1368 | 526 |
| 1 | 0 | 00 | 1132 | 0 | 530 |
| 1 | 0 | 00 | 1164 | 0 | 531 |
| 1 | 0 | 00 | 1260 | 0 | 532 |

PRIOR ART

PRIOR ART

PRIOR ART

Flag-A: Padding flag
  When 0: Recorded data from host
  When 1: Padding data by drive
Flag-B: Validity flag
  When 0: Valid data
  When 1: Invalid data
Flag-C: Update flag
  When 0, updated (including new recording)
  When 1, not updated

FIG.35

| Status information 1011 | | | | Original location information 1012 | Replacement location information 1013 |
|---|---|---|---|---|---|
| Flag1 | Flag2 | Flag3 | Flag4 | | |
| ... | ... | ... | 00 | Defective cluster | Replacement cluster location information |
| | | | 01 | Cluster location before updating (including data before replacement) | |
| | | | 10 | Cluster location before updating (including unrelated data) | |

1010C

| Status 1 2011A | Defective cluster first PSN 2012 | Status 2 2011B | Replacement cluster first PSN 2013 |
|---|---|---|---|
| 0000 | a0 | 1000 | a3 |

6200

Specified by host apparatus

Specified by host apparatus

Specified by host apparatus

DRIVE DEVICE

CROSS-REFERENCE TO RELATED APPLICATIONS

This is a U.S. national phase filing under 35 U.S.C. §371 of PCT/JP2005/010963 filed Jun. 15, 2005 and claims priority from Japanese Application Nos. 2004-177662, 2004-177663, 2004-177664, 2004-177665, 2004-177666, 2004-177668, 2004-189013, and 2004-255440, which were filed on Jun. 15, 2004, Jun. 15, 2004, Jun. 15, 2004, Jun. 15, 2004, Jun. 15, 2004, Jun. 15, 2004, Jun. 25, 2004 and Sep. 2, 2004, respectively.

TECHNICAL FIELD

The present invention relates to a drive apparatus for recording data in an information recording medium and for reproducing the data recorded in the information recording medium.

BACKGROUND ART

Recently, various types of information recording mediums are used to record digital data. For example, a rewritable optical disc or a write-once optical disc is used. In the rewritable optical disc, data can be rewritten repeatedly at the same location. In the write-once optical disc, data can be written only once at the same location, while it is inexpensive.

As an example of rewritable optical discs, there are DVD-RAM discs and BD-RE (Blu-ray Disc Rewritable) discs and the like.

As an example of write-once optical discs, there are DVD-R discs and BD-R (Blu-ray Disc Recordable) discs and the like.

In the rewritable optical disc, a defective management mechanism is introduced to improve the reliability of data recorded on the disc.

The defective management mechanism includes a slipping replacement algorithm and a linear replacement algorithm.

The slipping replacement algorithm is mainly performed when the disc is formatted. In the slipping replacement algorithm, all of the ECC clusters in the user data area are checked for detecting a defective cluster. When the defective cluster is found, the location of the defective cluster is registered to a primary defect list (hereinafter, "PDL"). The logical cluster corresponding to the defective cluster is shifted such that the logical cluster corresponds to a physical cluster which is next to the physical cluster corresponding to the defective cluster.

Thus, when the user data is recorded, it is possible to avoid recording the user data in the defective cluster registered in the PDL. As a result, it is possible to improve the reliability of the data recording.

The linear replacement algorithm is performed when a user data is recorded.

After the user data is recorded, a verify process is performed. In the verify process, the recording result is verified. If the data recording has failed, the ECC cluster including the recording location is determined as a defective cluster. Then, the location of the defective cluster is managed by a secondary defect list (hereinafter, "SDL").

The user data is recorded in the spare area which is located at the inner-most periphery or the outer-most periphery on the disc, instead of the defective cluster in the user data area.

The verify process described above is performed during the replacement recording. If the data recording has succeeded, the location at which the user data is recorded is determined.

An SDL entry which correlates the location of the defective cluster with an ECC cluster for replacement is generated. Then, the SDL entry is registered to the SDL.

The SDL entry is provided for each of the all ECC clusters included in the spare area. It is possible to manage whether or not each ECC cluster in the spare area is available as a replacement cluster. If the ECC cluster is an unrecorded area in the spare area, then the ECC cluster is available as a replacement cluster. If the ECC cluster is a recorded area in the spare area, then the ECC cluster is not available as a replacement cluster. The unrecorded area in the spare area is also called a spare cluster.

In the reproduction process, by referring to the PDL and the SDL, if necessary, the data is reproduced from the replacement cluster.

The PDL and the SDL are recorded in a defect management area (hereinafter, "DMA") provided in the lead-in area on the disc. In the DMA, information indicating the size of the spare area and the like is further recorded.

In the rewritable optical disc, the information on the defective management is updated by rewriting the DMA.

In the write-once optical disc, it is possible to introduce a defective management mechanism, for example, as described in the specification of U.S. laid-open patent publication No. 2004/0076096 (hereinafter, "reference 1").

FIG. 3 of the reference 1 shows a data structure of the disc. In the disc of the reference 1, the DMA is provided in the lead-in area and the lead-out area.

Further, a temporary defect management area (hereinafter, "TDMA") is provided in the lead-in area and the lead-out area.

In the write-once optical disc, the information on the defective management is updated by additionally recording defective information in the TDMA each time the defective information is updated.

When the disc is closed or finalized, the data in the latest TDMA is recorded in the DMA.

In the TDMA, temporary defect management information (hereinafter, "TDDS") and temporary defect information (hereinafter, "TDFL") are recorded.

FIG. 5B of the reference 1 shows a data structure of the TDDS. The TDDS includes pointer information to the TDFL. The TDFL can be recorded in the TDMA a plurality of times. The pointer information is recorded for the respective TDFLs.

In the TDDS, a last recorded address on the write-once optical disc is recorded. As shown in FIG. 5B of the reference 1, a single write-once optical disc can have a plurality of last recorded addresses.

In the TDDS, a last recorded replacement address on the write-once optical disc is recorded. As shown in FIG. 5B of the reference 1, a single write-once optical disc can have a plurality of last recorded replacement addresses.

FIG. 6 of the reference 1 shows a data structure of the TDFL.

The TDFL includes information regarding defect #1, #2, ... and the like.

The information regarding defect includes status information, a pointer to the defective cluster and a pointer to the replacement cluster.

The information regarding defect has a data structure similar to the SDL entry included in the SDL. The information regarding defect performs a function similar to the SDL entry.

FIGS. 33A and 33B show a method for updating the TDFL disclosed in FIG. 9A and FIG. 9B of the reference 1.

FIG. 33A shows a data structure of the TDFL #0. The TDFL #0 includes the information regarding defect #1, #2 and #3 corresponding to the defects #1, #2 and #3.

After the TDFL #0 is recorded, it is assumed that the defects #4 and #5 are detected as a result of performing a new data recording. In this case, the TDFL #1 shown in FIG. 33B is recorded on the write-once optical disc.

The TDFL #1 is generated by maintaining the information regarding defect #1, #2 and #3 included in the TDFL #0 and adding the information regarding defect #4 and #5 corresponding to the defects #4 and #5.

FIG. 10 of the reference 1 shows a data structure of the information regarding defect.

The information regarding defect includes status information. The status information includes information indicating that the defective area is a continuous defect block or a single defect block.

The information regarding defect further includes a pointer to the defective area (the location of the defective area on the disc).

The information regarding defect further includes a pointer to the replacement area corresponding to the defective area.

When the defective area is a continuous defect block, the status information indicates that a pointer to the defective area designates a start location of the continuous defect block or an end location of the continuous defect block. In this case, the status information further indicates that a pointer to the replacement area designates a start location of the replacement block or an end location of the replacement block.

By using these data structures, the defective management mechanism can be implemented in the write-once optical disc.

Further, by using the defective management mechanism described above, it is possible to implement a pseudo-overwrite recording for the write-once optical disc.

With reference to FIGS. 31 and 32, the pseudo-overwrite recording for the write-once optical disc will be described.

As described above, in the defective management mechanism, by using the replacement information such as the information regarding defect or the SDL entry, the physical address at which the data is actually recorded is mapped to another location which is previously allocated, without changing the logical address at which the data is recorded.

When it is instructed to record data at a logical address at which the data has already been recorded on the write-once optical disc, the data is recorded in a sector located at a physical address which is different from the physical address corresponding to the logical address, and the replacement information is updated to maintain the logical address. According to this process, it is possible to overwrite data in a pseudo manner. Hereinafter, such data recording is referred to as a pseudo-overwrite recording.

FIG. 31 shows a data structure after directories and files are recorded in the information recording medium 1 which is a write-once optical disc. In the state shown in FIG. 31, it is assumed that the pseudo-overwrite recording has not been performed.

In the write-once optical disc, the user data area on the disc is managed as a unit of track or session.

In FIG. 31, the user data recorded in the user data area is managed by a file system. A space managed by the file system is referred to as a volume space 2.

In the description below, it is assumed that information recorded in the information recording medium 1 as the volume/file structure of the file system (e.g. descriptor, pointer, metadata partition and metadata file) has a data structure defined in the ISO/IEC 13346 standard or the UDF (Universal Disc Format) specification, unless it is explicitly described on the contrary.

In FIG. 31, a volume structure area 3 and a physical partition 4 are recorded in the volume space 2.

In the physical partition 4, metadata partitions 5a, 5b defined by version 2.5 of the UDF specification are included.

In the physical partition 4, metadata file 6a and metadata mirror file 6b which is the duplication of the metadata file 6a are recorded.

FE (metadata file) 7a and FE (metadata mirror file) 7b, each being a file entry (FE) indicating the recording location in the physical partition 4, are recorded. Further, data file (File-a) 8 and data file (File-b) 9 are also recorded.

All information on the file structure such as a file entry and directory file is allocated in the metadata partition, i.e. the metadata file.

In the data structure defined in the UDF specification, the respective recording locations of the metadata partition 5a and the file set descriptor (FSD) 12 are recorded in the volume structure area 3.

By retrieving the file structure from the ROOT directory using the FSD 12 as a start point, it is possible to access data file (File-a) 8, for example.

Next, in the state shown in FIG. 31, it is assumed that the pseudo-overwrite recording for data file (File-c) is performed.

FIG. 32 shows a data structure after the pseudo-overwrite recording for data file (File-c) is completed.

Herein, it is assumed that the data file (File-c) is recorded immediately under the ROOT directory on the information recording medium 1.

During recording the data file (File-c), the required information on the file structure is updated or generated in order to add the data file (File-c). Specifically, FE (ROOT) 13 is updated and FE (File-c) 14 is generated, for example.

The data file (File-c) 15 is recorded in an unrecorded area shown in FIG. 31. FIG. 32 shows a state at this time.

When the FE (File-c) 14 is recorded, the FE (File-c) 14 is recorded in the unrecorded area 11a in the metadata partition 5a (i.e. the metadata file 6a).

Next, the pseudo-overwrite recording is performed as if the FE (ROOT) 16 would be overwritten on the FE (ROOT) 13.

In this case, as shown in FIG. 32, the data for the FE (ROOT) 16 is recorded in the spare area 17.

Further, the replacement information included in the disc management information 2 is updated such that the FE (ROOT) 13 is mapped to the FE (ROOT) 16.

After performing the recording process for files, a reproduction operation for reproducing the data file (File-c) 15 will be described.

The location information of FE (metadata file) 7a and the location information of FSD 12 are obtained from the volume structure area 3 of the information recording medium 1.

Next, the file structure is reproduced. In order to reproduce the file structure, the FSD 12 is reproduced based on the location information of FE (metadata file) 7a and the location information of FSD 12.

The location information of the FE (ROOT) 13 is obtained as a logical address from the reproduced FSD 12.

The FE (ROOT) 13 is reproduced based on the location information of the FE (ROOT) 13.

By referring to the replacement information, the FE (ROOT) 16, to which the FE (ROOT) 13 is mapped, is reproduced.

The FE (ROOT) 16 includes the latest ROOT directory file. Accordingly, the FE (ROOT) 16 includes the location information of the FE (File-c) 14.

The data file (File-c) 15 is reproduced using the location information of the data file (File-c) 15 which is obtained from the FE (File-c) 14.

Thus, in the write-once optical disc, it is possible to perform a pseudo-overwrite recording using the defective management mechanism.

However, according to the pseudo-overwrite recording for the write-once optical disc described above, there is a problem that if there is no unrecorded area in the spare area, it is not possible to further perform the data recording even if there is an unrecorded area in the user data area. This is because it is not possible to update file system information.

In particular, in the write-once optical disc, the size of the spare area is fixed at the time when the disc is formatted (initialized), unlike the rewritable optical disc in which the size of the spare area can be extended if required.

It is difficult to determine the size of the spare area appropriately in view of the pseudo-overwrite recording which may be performed in the future.

If the size of the spare area is determined as a relatively large size, the size of the user data area must be reduced. If the size of the spare area is determined as a relatively small size, a problem may be caused. The problem is that it is not possible to further perform the data recording even if there is an unrecorded area in the user data area. In either case, it is not possible to effectively utilize the user data area of the write-once optical disc.

The present invention is intended to solve the problem described above. One of the purposes of the present invention is to provide a drive apparatus capable of utilizing the user data area without any loss in the pseudo-overwrite recording for the write-once optical disc.

According to the present invention, it is possible to provide a drive apparatus capable of utilizing the user data area without any loss in the pseudo-overwrite recording for the write-once optical disc.

DISCLOSURE OF THE INVENTION

According to one aspect of the invention, a drive apparatus is provided for performing a sequential recording for a write-once recording medium, wherein the write-once recording medium includes a plurality of ECC clusters, the drive apparatus including: a recording/reproduction section for performing a recording operation or a reproduction operation for the write-once recording medium; and a drive control section for controlling the recording/reproduction section, wherein the drive control section at least performs a process including: receiving a recording instruction at least specifying a location at which data is to be recorded; determining whether a data recording which is performed in accordance with the recording instruction is an appending recording, a first time pseudo-overwrite recording or a second time or more pseudo-overwrite recording; generating data including location information before replacement having information set therein according to the result of the determination; and controlling the recording/reproduction section to record the data in one of the plurality of ECC clusters of the write-once recording medium, the drive control section performs a process including: when the data recording is determined to be the appending recording, setting information indicating that a replacement recording is not performed in the location information before replacement; when the data recording is determined to be the first time pseudo-overwrite recording, setting information indicating the location specified by the recording instruction in the location information before replacement; or when the data recording is determined to be the second time or more pseudo-overwrite recording, setting information indicating a replacement location for the location specified by the recording instruction in the location information before replacement.

According to another aspect of the invention, a drive apparatus is provided for performing a sequential recording for a write-once recording medium, wherein the write-once recording medium includes a plurality of ECC clusters, each of the plurality of ECC clusters includes a plurality of physical sectors and a plurality of attribute information, the plurality of physical sectors respectively corresponding to the plurality of physical sectors, the drive apparatus including: a recording/reproduction section for performing a recording operation or a reproduction operation for the write-once recording medium; and a drive control section for controlling the recording/reproduction section, wherein the drive control section at least performs a process including: receiving a recording instruction at least specifying data to be recorded and a location at which the data is to be recorded; determining whether or not the data specified by the recording instruction can be recorded in at least one of the plurality of physical sectors included in one of the plurality of ECC clusters; and controlling the recording/reproduction section to record invalid data and the attribute information in each of the at least one physical sector when it is determined that the data specified by the recording instruction cannot be recorded in the at least one physical sector, in an RMW process of reproducing data recorded in an original ECC cluster including the location specified by the recording instruction; modifying at least a portion of the reproduced data; and recording the modified data in a replacement ECC cluster, the drive control section performs a process including controlling the recording/reproduction section to record dummy data as the invalid data in a physical sector in the replacement ECC cluster and setting first information in the attribute information corresponding to the physical sector having the invalid data recorded thereon when the data recorded in a physical sector included in the original ECC sector cannot be recorded due to a failure of the data reproduction, the physical sector in the replacement ECC cluster replacing the physical sector in the original ECC cluster having the failure of the data reproduction; and controlling the recording/reproduction section to record padding data as the invalid data in each of the at least one physical sector, with the insufficient amount of the data, of the plurality of physical sectors included in the ECC cluster and setting second information in the attribute information corresponding to each of the at least one physical sector having the invalid data recorded thereon when the data specified by the recording instruction cannot be recorded due to the amount of data insufficiently filling one entire ECC cluster.

According to another aspect of the invention, a drive apparatus is provided for reproducing data recorded in a write-once recording medium, wherein the write-once recording medium includes a plurality of ECC clusters, each of the plurality of ECC clusters includes a plurality of physical sectors, location information before replacement is recorded in each of the plurality of ECC sectors, information indicating that a replacement recording is not performed is set in the location information before replacement when a data recording which is performed in accordance with a recording instruction is an appending recording, information indicating the location specified by the recording instruction is set in the location information before replacement when the data recording which is performed in accordance with the recording instruction is a first time pseudo-overwrite recording; and information indicating a replacement location for the location specified by the recording instruction is set in the location information before replacement when the data recording which is performed in accordance with the recording instruction is a second time or more pseudo-overwrite recording, attribute information is recorded in each of the plurality of physical sectors, first information or second information is set in the attribute information, in an RMW process of reproducing data recorded in an original ECC cluster including the location specified by the recording instruction; modifying at least a portion of the reproduced data; and recording the modified data in a replacement ECC cluster, the first information indicates that the data recorded in a physical sector included in the original ECC sector cannot be recorded due to a failure of the data reproduction, the second information indicates the data specified by the recording instruction cannot be recorded due to the amount of data insufficiently filling one entire ECC cluster, the drive apparatus including: a recording/reproduction section for performing a recording operation or a reproduction operation for the write-once recording medium; and a drive control section for controlling the recording/reproduction section, wherein the drive control section at least performs a process including: receiving a reproduction instruction at least specifying a location at which data is to be recorded; determining whether or not an ECC cluster including the location specified by the reproduction instruction is already replaced with a replacement ECC cluster; controlling the recording/reproduction section to reproduce data recorded in the replacement ECC cluster when it is determined that the ECC cluster including the location specified by the recording instruction is already replaced with the replacement ECC cluster; determining whether or not attribute information having the first information set therein is included in the reproduced data; controlling the recording/reproduction section to reproduce the data recorded in a physical sector included in an ECC cluster, at a location indicated by the location information before replacement, corresponding to the replacement ECC cluster when the attribute information having the first information set therein is determined to be included in the reproduced data, the physical sector corresponding to a physical sector having the attribute information recorded thereon, the attribute information having the first information set therein at the replacement ECC cluster.

BRIEF DESCRIPTION OF THE DRAWINGS

FIG. 3 is an illustrative diagram showing an exemplary data structure of the disc structure information 1110 according to an embodiment of the present invention.

FIG. 11 is an illustrative diagram showing an exemplary data structure of the replacement management information 1010B according to an embodiment of the present invention.

FIG. 13A is an illustrative diagram showing a replacement recording according to an embodiment of the present invention.

FIG. 13B is an illustrative diagram showing a replacement management information according to an embodiment of the present invention.

FIG. 14A is an illustrative diagram showing a replacement recording according to an embodiment of the present invention.

FIG. 14B is an illustrative diagram showing a replacement management information according to an embodiment of the present invention.

FIG. 16A is an illustrative diagram showing a replacement recording according to an embodiment of the present invention.

FIG. 16B is an illustrative diagram showing a replacement management information according to an embodiment of the present invention.

FIG. 18 is an illustrative diagram showing an exemplary data structure of the DFL entry 2010 which is an example of the replacement management information according to an embodiment of the present invention.

FIG. 20A is an illustrative diagram showing a replacement recording according to an embodiment of the present invention.

FIG. 20B is an illustrative diagram showing a replacement management information according to an embodiment of the present invention.

FIG. 21A is an illustrative diagram showing a replacement recording according to an embodiment of the present invention.

FIG. 21B is an illustrative diagram showing a replacement management information according to an embodiment of the present invention.

FIG. 22A is an illustrative diagram showing a replacement recording according to an embodiment of the present invention.

FIG. 22B is an illustrative diagram showing a replacement management information according to an embodiment of the present invention.

FIG. 23A is an illustrative diagram showing a replacement recording according to an embodiment of the present invention.

FIG. 23B is an illustrative diagram showing a replacement management information according to an embodiment of the present invention.

FIG. 26A is an illustrative diagram showing a replacement recording according to an embodiment of the present invention.

FIG. 26B is an illustrative diagram showing a replacement management information according to an embodiment of the present invention.

FIG. 35 is an illustrative diagram showing a replacement management information according to an embodiment of the present invention.

Figure 1A:
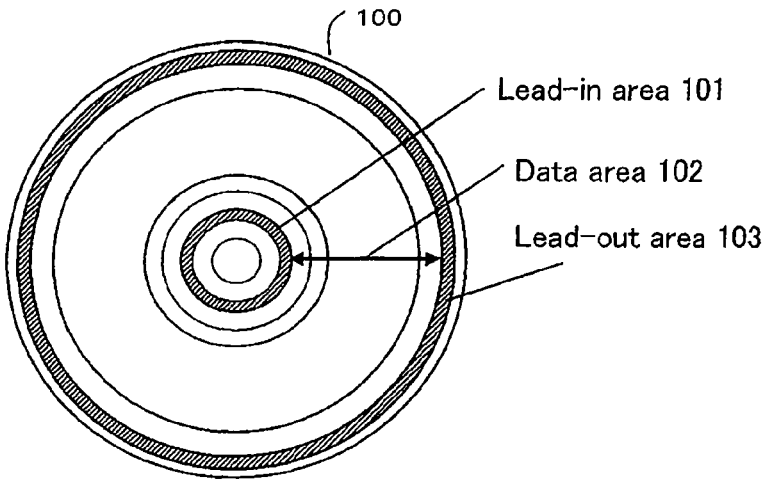
FIG. 1A is an illustrative diagram showing an appearance of information recording medium 100 according to an embodiment of the present invention.

100, 100b information recording medium
101 lead-in area
102, 102a data area
103 lead-out area
103b, 103c outer area
104, 105 disc management information area
104a, 105a disc management information area
106, 106a inner spare area
107, 107a outer spare area
108, 108a user data area
109 volume space
122 unrecorded area
120, 121 LRA
210 track management information
211 session start information
212 track start location information
213 last recorded address information within track (LRA)
300 information recording/reproduction apparatus
301 system control section
302 memory circuit 303 I/O bus
304 magnetic disc apparatus
310 drive apparatus
311 drive control section
312 memory circuit
314 recording/reproduction section
410 volume structure area
600, 800 AVDP
601 logical volume descriptor
602 partition map (type 2)
440 metadata file
450 metadata mirror file
500 image data
510, 511, 512, 513 error area
520, 521, 522 repair data
1000 replacement management information list
1010 replacement management information
1011 status information
1012 original location information
1013 replacement location information
1100 disc structure information
1103 user area start location information
1104 user area end location information
1105 spare area information

BEST MODE FOR CARRYING OUT THE INVENTION

Embodiment 1

1-1. Write-Once Recording Medium

FIG. 1A shows an appearance of information recording medium 100 according to an embodiment of the present invention.

A lead-in area 101 is located in an inner-most periphery of the information recording medium 100. A lead-out area 103 is located in an outer-most periphery of the information recording medium 100. A data area 102 is located between the lead-in area 101 and the lead-out area 103 of the information recording medium 100.

In the lead-in area 101, reference information necessary for an optical pickup included in the recording/reproduction section 314 which will be described below to access the information recording medium 100, information for identifying from other recording media, and the like are recorded. In the lead-out area 103, similar information as those in the lead-in area 101 is recorded.

A plurality of physical sectors are assigned to the lead-in area 101, the data area 102 and the lead-out area 103. Each physical sector is a minimum access unit. Each physical sector is identified by an address information such as a physical sector number (hereinafter, "PSN").

The data recording/reproduction is performed for each ECC cluster (or each ECC block) including a plurality of physical sectors. An ECC cluster (or an ECC block) is a minimum unit for the data recording/reproduction.

Figure 1B:
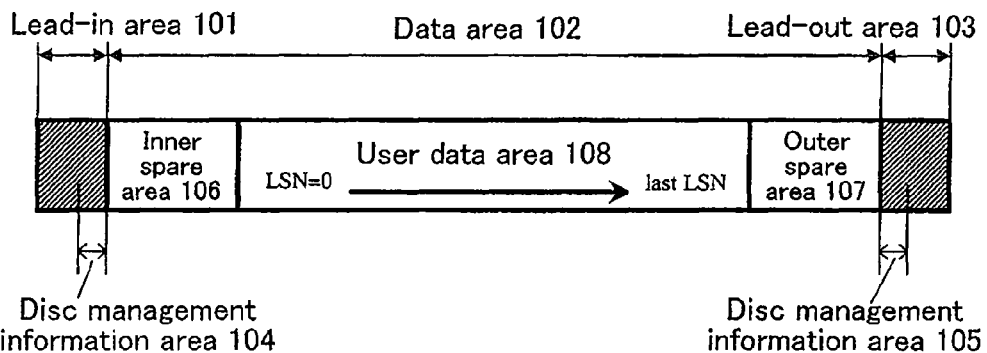
FIG. 1B is an illustrative diagram showing an exemplary data structure of the information recording medium 100 according to an embodiment of the present invention.

FIG. 1B shows a data structure of the information recording medium 100. In FIG. 1B, the lead-in area 101, the data area 102 and the lead-out area 103 are shown in a lateral arrangement, although they are actually arranged in a concentric circular manner as shown in FIG. 1A.

The lead-in area 101 includes a disc management information area 104. The lead-out area 103 includes a disc management information area 105. Disc management information is recorded in each of the disc management information areas 104 and 105. The disc management information includes replacement management information, session management information, and space bitmap management information.

This information will be described below. The disc management information areas 104 and 105 are used as an area for updating the disc management information. The area for updating the disc management information is also referred to as a temporal disc management information area.

In a case where the present invention is applied to the BD-R specification, the term "disc management information area" in the present specification should be read as a "Disc Management Area (DMA)", the term "temporal disc management information area" in the present specification should be read as a "Temporal Disc Management Area (TDMA)", the term "disc management information" in the present specification should be read as a "Disc Management Structure (DMS)" and the term "temporal disc management information" in the present specification should be read as a "Temporal Disc Management Structure (TDMS)".

The data area 102 includes an inner spare area 106, a user data area 108 and an outer spare area 107.

The user data area 108 is an area used for recording a user data.

Figure 1C:
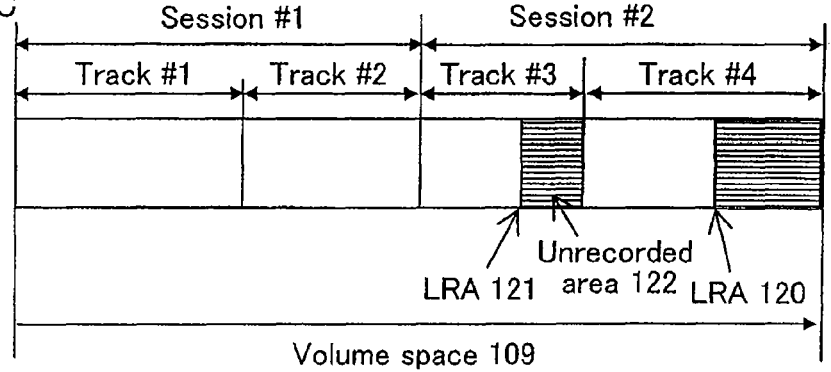
FIG. 1C is an illustrative diagram showing an exemplary data structure of the user data area 108 shown in FIG. 1B.

FIG. 1C shows a data structure of the user data area 108.

The user data area 108 includes a plurality of sessions. Each session includes a plurality of tracks.

Each track is a contiguous area on the information recording medium 100. Each track is managed by track management information which will be described below.

In a case where the present invention is applied to the BD-R specification, the term "track" in the present specification should be read as a "Sequential Recording Range" (hereinafter, "SRR").

Each session includes a plurality of tracks which are contiguously allocated on the information recording medium 100. Each session is managed by session management information which will be described below.

Figure 2A:
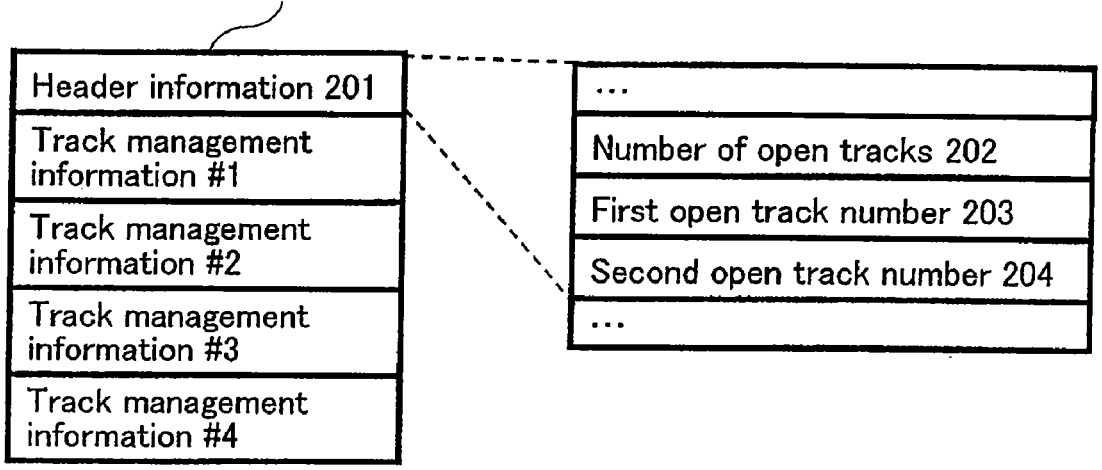
FIG. 2A is an illustrative diagram showing an exemplary data structure of the session management information 200 according to an embodiment of the present invention.

FIG. 2A shows a data structure of the session management information 200 for managing the session. The session management information 200 is included in the disc management information.

The session management information 200 includes header information 201 and a plurality of track management information.

Figure 2B:
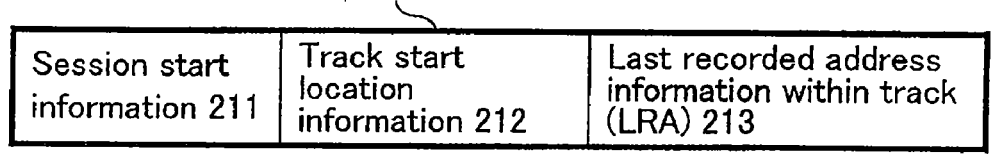
FIG. 2B is an illustrative diagram showing an exemplary data structure of the track management information 210 according to an embodiment of the present invention.

The header information 201 includes general information such as an identifier of the session management information 200 and the number of the track management information 210 shown in FIG. 2B.

The track management information #N contains information corresponding to the track #N shown in FIG. 1C, where N denotes an integer greater than or equal to 1.

FIG. 2B shows a data structure of the track management information 210 for managing the track. The track management information 210 is included in the disc management information.

The track management information 210 includes session start information 211 which indicates whether or not the track is a leading track of the session, track start location information 212 which indicates a start location of the track, and last recorded address information within track 213 which indicates a location at which data has been lastly recorded within the track. Hereinafter, the last recorded address information within track 213 is referred to as LRA 213.

If the track managed by the track management information is 210 located at a leading position of the session, a value (e.g. "1") indicating that the track is located at a leading position of the session is set to session start information 211. Otherwise, a different value (e.g. "0") is set to session start information 211.

The track start location information 212 includes a physical address indicating a start location of the track.

The LRA 213 includes a physical address indicating a location at which valid data has been lastly recorded within the track. Valid data may be, for example, user data supplied from the host apparatus 305. The LRA 120 and the LRA 121 shown in FIG. 1C are an example of the LRA 213.

In the case where the present invention is applied to the BD-R specification, the term "track management information" in the present specification should be read as a "Sequential Recording Range Entry (SRR Entry)" and the term "session management information" in the present specification should be read as a "Sequential Recording Range Information".

In the case where the data recording is performed for each ECC cluster as a minimum unit on the information recording medium 100, the location indicated by the LRA 213 does not always match the boundary of ECC clusters.

In general, the size of data specified by the recording instruction does not match multiple integral of the size of one ECC cluster. In this case, the LRA 213 indicates an address of the last physical sector among the physical sectors in which the data specified by the recording instruction is recorded.

If the location indicated by the LRA 213 does not match the boundary of ECC clusters, padding data is recorded after the valid data so that the end of the recorded data can match the boundary of ECC clusters.

In the present embodiment, the data recording can be performed for each track. In this case, the recording of new data is started from a leading position of each track, and the new data is contiguously recorded within the track (a sequential recording). When the data recording is performed for a track, the location at which the data has been lastly recorded within the track is reflected to the LRA 213.

When the data recording is re-started within the track, a value of the LRA 213 is checked. By checking the value of the LRA 213, it is possible to determine a next writable address within the track.

In the case where no data is recorded within the track (e.g. immediately after the track is allocated), a predetermined value (e.g. "0") indicating such a status can be set to the LRA 213.

In general, a next writable address (hereinafter, "NWA") indicates a location of a physical sector which is next to the physical sector indicated by the LRA 213. Alternatively, in the case where the data recording is performed for each ECC cluster as a minimum unit on the information recording medium 100, the NWA indicates a location of a leading position of an ECC cluster which is next to the ECC cluster including the physical sector indicated by the LRA 213. P The location of the NWA is calculated according to Expression (1) below.

(a) When LRA≠0

NWA=$N$×(Floor LRA/$N$)+1)

N: the number of the physical sectors included in each ECC cluster (for example, N=32).

(b) When LRA=0

NWA=(start location of the corresponding track)

where Floor(x) represents the largest integer number ≦x

Hereinafter, it is assumed that the NWA indicates a leading position of the ECC cluster.

A track where it is possible to record data is referred to as an open track.

The track number of the open track is included in the header information 201 of the session management information 200 shown in FIG. 2A (for example, a first open track number 203, a second open track number 204, etc.).

Any track other than the open track is referred to as a closed track.

For example, a track which does not include any unrecorded area or a track designated by a user can be a closed track.

Unlike the open track, the track number of the closed track is not stored in the header information 201 of the session management information 200.

The data recording to any closed track is prohibited.

In the case where the present invention is applied to the BD-R specification, the term "open track" in the present specification should be read as an "Open SRR" and the term "closed track" should be read as a "Closed SRR".

By checking the open track number and the LRA 213 in the track management information 210, it is possible to determine an unrecorded area on the information recording medium 100.

By managing the recorded clusters for the write-once type of the information recording medium 100, it is possible to perform a kind of random recording (i.e. recording data at an arbitrary location (physical address) on the information recording medium 100).

In order to realize such a random recording, it is necessary to manage unrecorded areas on the information recording medium 100 and to manage the last recorded address.

Figure 2C:
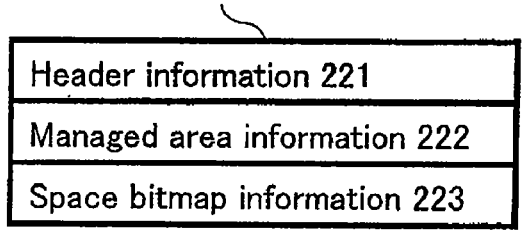
FIG. 2C is an illustrative diagram showing an exemplary data structure of the space bitmap management information 220 according to an embodiment of the present invention.

In the present embodiment, these managements are realized by utilizing the space bitmap management information 220 shown in FIG. 2C and the disc management information recorded in the disc management information area 104 and 105.

When the random recording is performed, the space bitmap management information 220 shown in FIG. 2C is recorded in the disc management information area 104.

FIG. 2C shows a data structure of space bitmap management information 220. The space bitmap management information 220 includes header information 221, managed area information 222 and space bitmap information 223.

The header information 221 includes general information such as an identifier of the space bitmap management information 220.

The managed area information 222 includes information which specifies an area in the user data area 108, wherein the recorded/unrecorded status of a sector included in the area is managed by the space bitmap management information 220. For example, the managed area information 222 includes a start location of the area and a length of the area.

The space bitmap information 223 includes information indicating whether each ECC cluster included in the area to be managed is a recorded ECC cluster or an unrecorded ECC cluster. For example, a single bit data is assigned to each ECC cluster, a predetermined value (e.g. "0") is set to the single bit data when the ECC cluster is an unrecorded ECC cluster, and a predetermined value (e.g. "1") is set to the single bit data when the ECC cluster is a recorded ECC cluster. This makes it possible to manage unrecorded areas for all ECC clusters in the area to be managed.

The disc management information recorded in the disc management information area 104 includes disc structure information 1100 shown in FIG. 3. The disc structure information 1100 includes last recorded address information 1107. The last recorded address information 1107 includes a physical address indicating a location at which data has been lastly recorded within the user data area 108.

The disc structure information 1100 further includes general information 1101 concerning an entire disc structure information 1100, replacement management information list location information 1102 which indicates location information of the latest replacement management information list 1000 within the disc management information area 104, 105, user area start location information 1103 which indicates a start location of the user data area 108, user area end location information 1104 which indicates an end location of the user data area 108, disc management information area size 1107*b*, and spare area information 1105 and spare area management information 1108 which indicates the size of the inner spare area 106 and the outer spare area 107 and an area available for replacement.

By using the disc management information area size 1107*b*, it is possible to change the size of the disc management information area for each information recording medium. Further, by using the disc management information area size 1107*b*, it is possible to change the temporal disc management information area described above in the inner spare area 106 and the outer spare area 107.

By using the spare area information 1105, it is possible to change the size of the spare area for each information recording medium. For example, it is possible to set the size of the inner spare area 106 or the size of the outer spare area 107 to zero.

The spare area management information 1108 includes next available location information indicating a next available location in the inner spare area 106 and the outer spare area 107.

In each spare area, a sequential recording is performed in the same way in each track. The next available location in each spare area performs the similar function as the NWA in each track. The recording of new data to each spare area is performed sequentially from the location indicated by the next available location information.

The disc structure information 1100 further includes session management information location information 1109 which indicates location information of the latest session management information 200 in the disc management information areas 104 and 105, and space bitmap management information location information 1110 which indicates location information of the latest space bitmap management information 220 in the disc management information areas 104 and 105.

As described above, by using the session management information 200 or the space bitmap management information 220, it is possible to manage the status of unrecorded physical sectors on the information recording medium 100. Accordingly, it is possible to selectively use one of the session management information 200 and the space bitmap management information 220 for its purposes. Alternatively, it is possible to use both information. The information concerning a method for managing unrecorded areas is included in the recording mode information 1106 of the disc structure information 1100.

The disc management information area 105 is an extended area which is used to record duplication of the disc management information recorded in the disc management information area 104 or is used to record the information which cannot be recorded in the disc management information area 104 in updating the disc management information. Hereinafter, the detailed description of the disc management information area 105 will be omitted. This is similar to the temporal disc management information recorded in the spare area.

In the example shown in FIG. 1C, the user data recorded in the user data area 108 is managed by a file system. A space managed by the file system is referred to as a volume space 109.

A plurality of logical sectors are assigned to the volume space 109. Each logical sector is identified by address information such as a logical sector number (hereinafter, "LSN").

In the description below, it is assumed that information recorded in the information recording medium 100 as the volume/file structure of the file system (e.g. descriptor, pointer, metadata partition and metadata file) has a data structure defined in the ISO/IEC 13346 standard or the UDF (Universal Disc Format) specification, unless it is explicitly described on the contrary. Of course, it is possible to use a file system other than those described above.

The information recording medium 100 shown in FIGS. 1A to 1C is described as an information recording medium having a single recording layer. However, the information recording medium 100 may have two or more recording layers.

Figure 4:
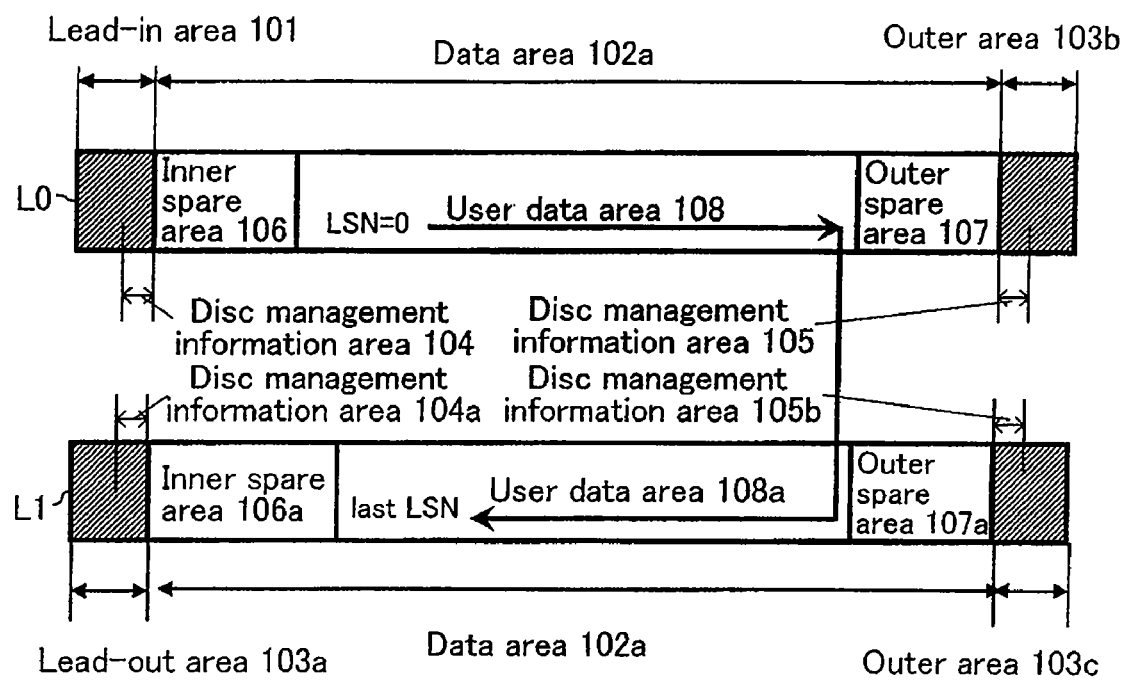
FIG. 4 is an illustrative diagram showing an exemplary data structure of the information recording medium 100b according to an embodiment of the present invention.

FIG. 4 shows a data structure of an information recording medium 100*b* having two recording layers.

In FIG. 4, L0 denotes a first layer and L1 denotes a second layer. Each of the first and second layers has almost the same structure as the information recording medium 100. Specifically, the lead-in area 101 is located in an inner-most periphery of the first layer and the lead-out area 103*a* is located in an inner-most periphery of the second layer. Further, the outer area 103*b* is located in an outer-most periphery of the first layer and the outer area 103*c* is located in an outer-most periphery of the second layer. The lead-in area 101, the outer area 103*b*, the lead-out area 103*a* and the outer area 103*c* includes a disc management information area 104, 105, 104*a* and 105*a*, respectively.

Further, as shown in FIG. 4, the spare areas 106, 106*a*, 107 and 107*a* are provided. As described above, it is possible to change the size of each spare area for each information recording medium. It is also possible to provide an additional temporal disc management information area in each spare area. The user data areas 108 and 108*a* are logically treated as a single volume space having contiguous logical addresses.

Thus, it is possible to logically treat an information recording medium having a plurality of recording layers as an information recording medium having a single recording layer. Hereinafter, an information recording medium having a single recording layer is described. It is possible to apply the description of the information recording medium having a single recording layer to an information recording medium having a plurality of recording layers. Therefore, an information recording medium having a plurality of recording layers is referred to only when a special description is required.

1-2. Pseudo-Overwrite Recording

The replacement information is described with reference to FIGS. 5A and 5B.

The replacement information is defined as a replacement management information list (or a defect list) including replacement management information (or a defect list entry). The replacement management information (or the defect list entry) includes original location information indicating a location of a cluster in which a defect occurs on the information recording medium (i.e. a defective cluster) and replacement location information indicating a location of a replacement cluster which is used instead of the defective cluster.

The present invention enables recording a replacement cluster in the user data area.

Further, the present invention realizes a pseudo-overwrite recording on a write-once information recording medium using the replacement information.

As shown in FIG. 1B, the data area 102 includes the inner spare area 106, the user data area 108 and the outer spare area 107.

At least a part of the inner spare area 106 and the outer spare area 107 is used as an area for replacement recording of the data to be recorded in the user data area 108.

For example, when there exists a defective cluster in the user data area 108, at least a part of the inner spare area 106 and the outer spare area 107 is used as an area for recording a replacement cluster with which the defective cluster is replaced.

Alternatively, at least a part of the inner spare area 106 and the outer spare area 107 can be used as an area for recording the updated data in the pseudo-overwrite recording described below.

The replacement recording, which is the combination of the replacement information with the spare area, is performed as well as a verify process.

The verify process is a process including the steps of reproducing data immediately after the data is recorded, comparing the reproduced data with the recorded data and determining whether or not the data is recorded correctly based on the comparison result. Such a process including these steps is called a verify-after-write process.

When an error occurs during the verify process (i.e. it is determined that the data is not recorded correctly), a replacement recording is performed. Specifically, the defective cluster is replaced by a replacement cluster and the data is recorded in the replacement cluster.

The replacement cluster is recorded in the inner spare area 106 (or the outer spare area 107) or the user data area 108.

The pseudo-overwrite recording is defined as a method for mapping a physical address at which the data is actually recorded to another physical address, such that it can be seen as if the logical address at which the data is recorded is not changed.

When the overwrite of new data is instructed to a logical address at which data is recorded, a physical address corresponding to the logical address is replaced by a separate physical address and the new data is written into an ECC cluster on the separate physical address. Then, the ECC cluster before overwrite is mapped to the ECC cluster (replacement cluster) in which the new data is recorded.

The replacement cluster used in the pseudo-overwrite recording is recorded in the spare area or the user data area.

Figure 5A:
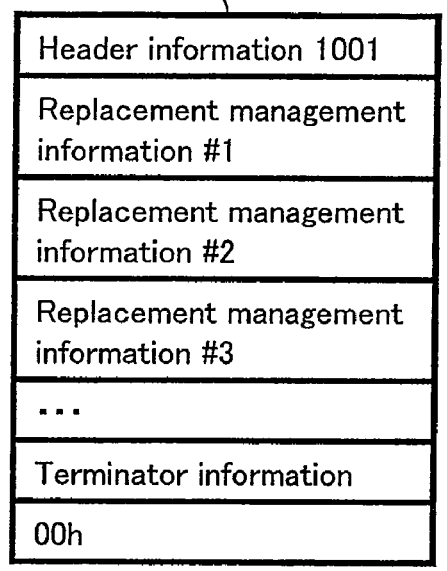
FIG. 5A is an illustrative diagram showing an exemplary data structure of the replacement management information list 1000 according to an embodiment of the present invention.

As the replacement information for performing such a mapping process, the replacement management information list 1000 shown in FIG. 5A is used.

By performing such a mapping process, it is possible to realize that it can be seen as if the data is overwritten, although the data is not actually overwritten. Hereinafter, this recording method is referred to as a pseudo-overwrite recording.

FIG. 5A shows a data structure of a replacement management information list 1000 which is replacement information according to the present invention. The replacement management information list 1000 is used to map the location of the defective cluster to the location of the replacement cluster. The replacement management information list 1000 includes header information 1001 and a plurality of replacement management information 1010 (e.g. replacement management information #1, #2, #3 . . . ).

The header information 1001 includes the number of the replacement management information included in the replacement management information list 1000. The replacement management information includes information indicating the mapping described above.

Figure 5B:
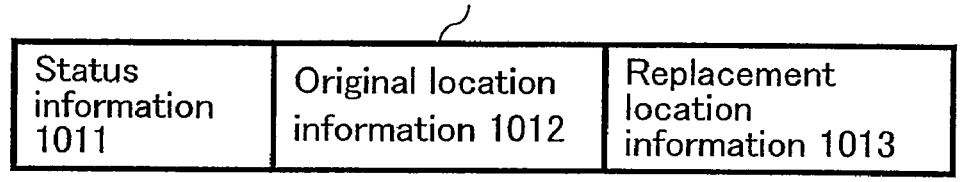
FIG. 5B is an illustrative diagram showing an exemplary data structure of the replacement management information 1010 according to an embodiment of the present invention.

FIG. 5B shows a data structure of the replacement management information 1010. The replacement management information 1010 includes status information 1011, original location information 1012 and replacement location information 1013.

The status information 1011 includes status information concerning the mapping described above. For example, the status information indicates a type or an attribute of the replacement management information 1010, the valid/invalid status of the original location information 1012 and the replacement location information 1013 and like.

The original location information 1012 indicates a location of original information (e.g. a defective cluster).

The replacement location information 1013 indicates a location of replacement information (e.g. a replacement cluster).

In the pseudo-overwrite recording, the location of the ECC cluster before overwrite is indicated by the original location information 1012, and the location of the ECC cluster after overwrite is indicated by the replacement location information 1013. Thus, the location of the ECC cluster before overwrite is mapped to the location of the ECC cluster after overwrite.

Herein, the original location 1012 and the replacement location information 1013 registered in the replacement management information 1010 may be represented by a physical address (e.g. PSN) of the first sector in the corresponding ECC cluster. This is because a mapping is performed as a unit of ECC cluster in the defective management and the pseudo-overwrite recording.

In the conventional linear replacement method, the replacement cluster is recorded in the spare area. Accordingly, in every case, the information indicating a location of the ECC cluster in the spare area is set to the replacement location information 1013.

On the other hand, in the present invention, the location at which the replacement cluster can be recorded is not limited to the location in the spare area. It is possible to record the replacement cluster in the user data area. Accordingly, the information indicating a location of the ECC cluster in the spare area or the information indicating a location of the ECC cluster in the user data area may be set to the replacement location information 1013.

Thus, the replacement location information 1013 may indicate a location of the ECC cluster recorded in one of two areas (i.e. the spare area and the user data area). In order to determine whether the replacement location information 1013 indicates a location of the ECC cluster in the spare area or a location of the ECC cluster in the user data area, information indicating one of the two cases may be defined. Such information may be incorporated into the status information 1011.

1-3. Recording/Reproduction Apparatus

Figure 6:
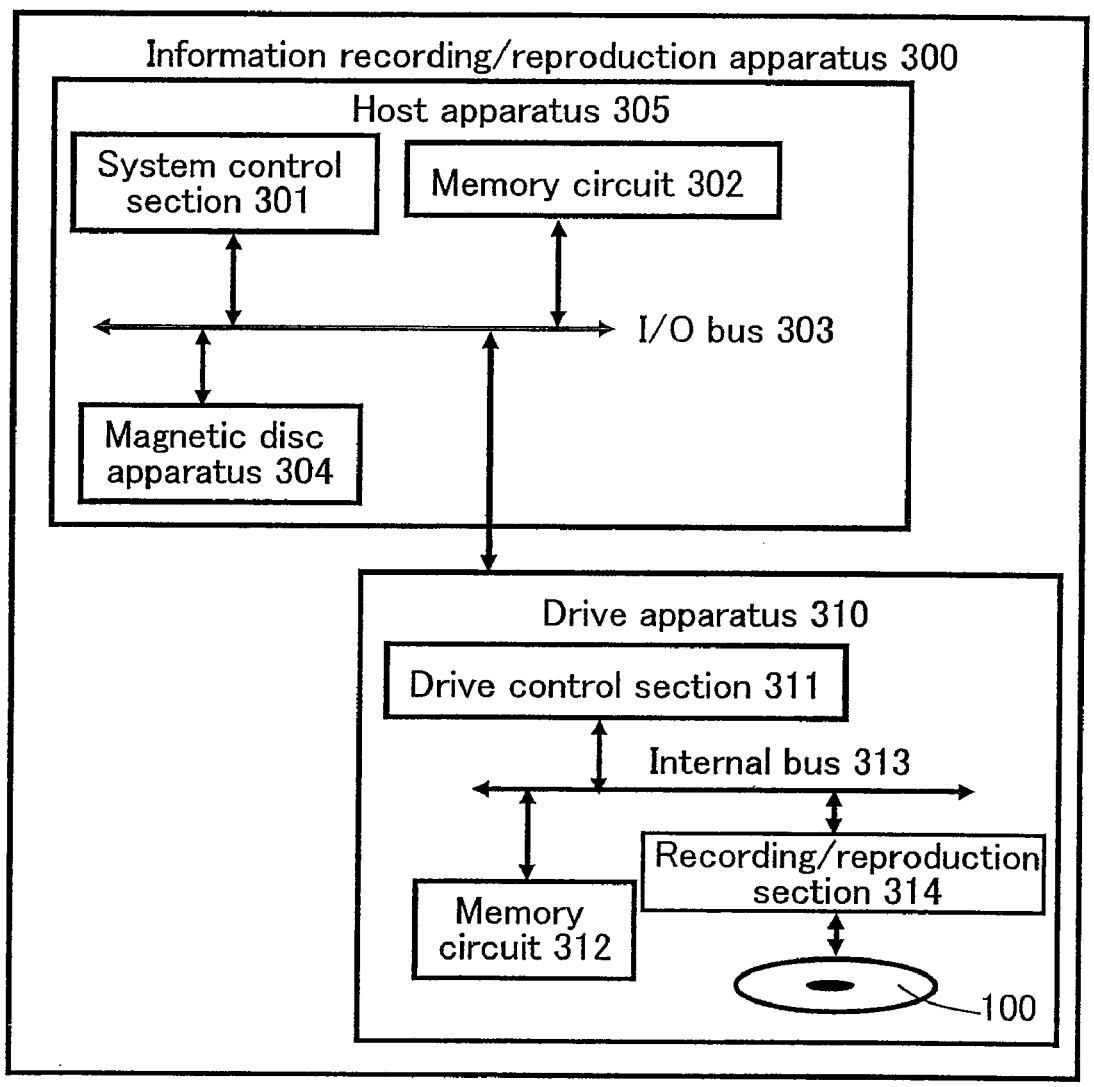
FIG. 6 is a block diagram showing an exemplary configuration of the information recording/reproduction apparatus 300 according to an embodiment of the present invention.

FIG. 6 shows a configuration of an information recording/reproduction apparatus 300 according to an embodiment of the present invention.

The information recording/reproduction apparatus 300 includes a host apparatus 305 and a drive apparatus 310.

The host apparatus 305 can be, for example, a computer system or a personal computer.

The drive apparatus 310 can be, for example, any one of a recording apparatus, a reproduction apparatus and a recording/reproduction apparatus. The information recording/reproduction apparatus 300 as a whole also can be called any one of a recording apparatus, a reproduction apparatus and a recording/reproduction apparatus.

The host apparatus 305 includes a system control section 301 and a memory circuit 302. The host apparatus 305 may further include magnetic disc apparatus 304 such as a hard disc drive. The components in the host apparatus 305 are connected to each other via an I/O bus 303.

The system control section 301 can be implemented, for example, by a microprocessor including a system control program and a memory for operation. The system control section 301 controls various processes and performs various operations such as recording/reproduction of a volume structure/file structure of a file system, recording/reproduction of a metadata partition/file structure described below, recording/reproduction of files and recording/reproduction of the lead-in/lead-out areas.

The memory circuit 302 is used to operate information such as a volume structure, a file structure, a metadata partition/file structure and files, and is used to temporarily store them.

The drive apparatus 310 includes a drive control section 311, a memory circuit 312, and a recording/reproduction section 314. The components in the drive apparatus 310 are connected to each other via an internal bus 313.

The drive control section 310 can be implemented, for example, by a microprocessor including a drive control program and a memory for operation. The drive control section 310 controls various processes and performs various operations such as recording/reproduction of the disc management information area and the spare area and the pseudo-overwrite recording/reproduction.

The system control section 301 and drive control section 310 shown in FIG. 6 can be implemented by a semiconductor integrated circuit such as an LSI. Alternatively, they can be implemented by a general processor and a memory (e.g. a ROM).

A program is stored in the memory (e.g. a ROM). The program is executable by a computer (e.g. a general processor). This program may represent a reproduction process and/or a recording process according to the present invention described above or described below. A computer (e.g. a general processor) performs the reproduction process and/or the recording process according to the present invention in accordance with the program.

The memory circuit 312 is used to operate data concerning the disc management information area and the spare area and data transferred to the drive apparatus 310, and is used to temporarily store them.

1-4. Procedure of Recording Process (1)

Figure 7:
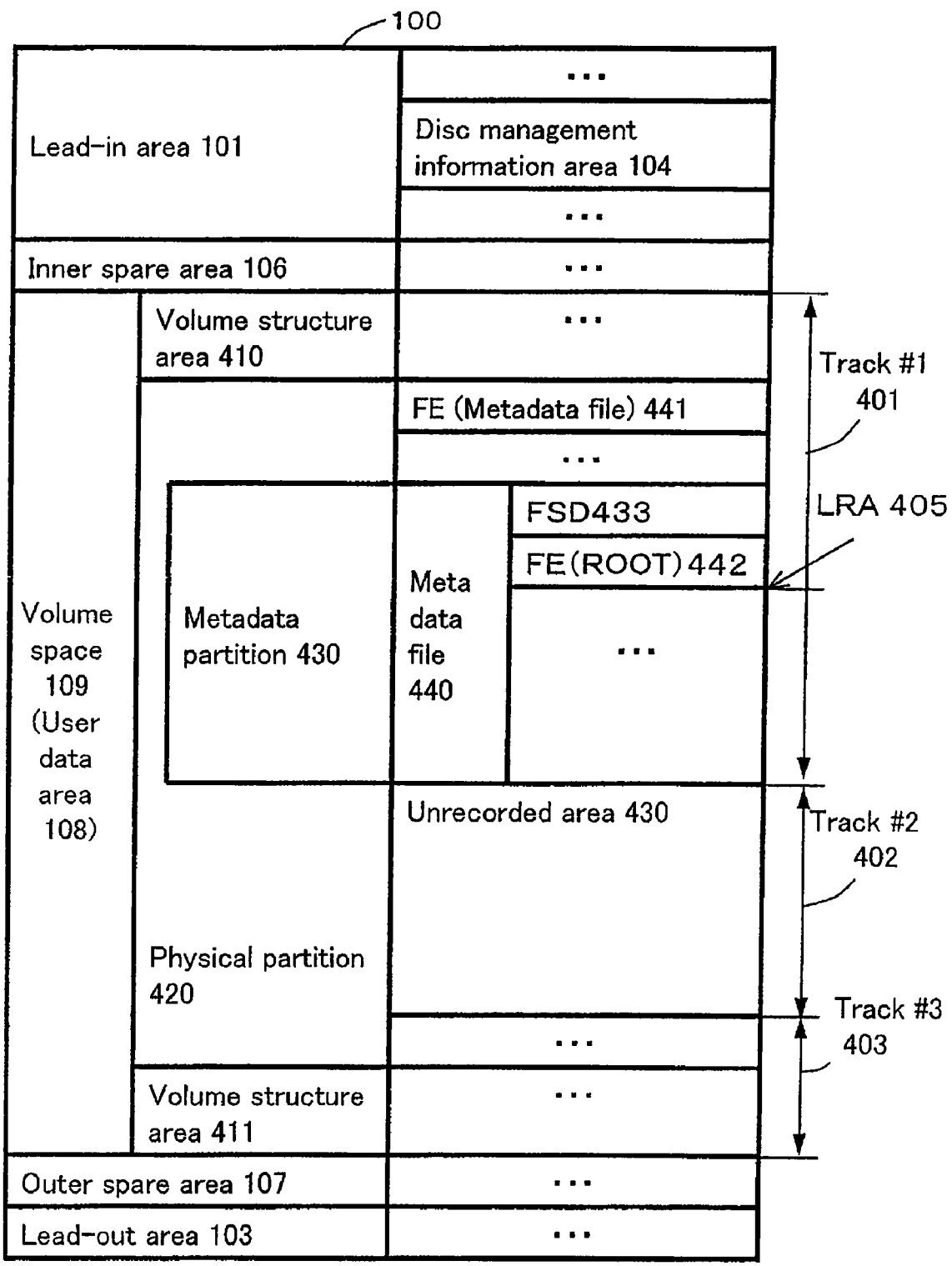
FIG. 7 is an illustrative diagram showing an exemplary data structure of the information recording medium after the formatting process according to an embodiment of the present invention.

With reference to FIG. 7, the data structure of the information recording medium 100 after performing a format process according to the present embodiment of the invention will be described below.

Track #1 401, track #2 402 and track #3 403 are allocated in the user data area 108.

A volume space 109 is allocated in the user data area 108. A volume structure area 410, a physical partition 420 and a volume structure area 411 are allocated in the volume space 109.

In the physical partition 420, a metadata partition 430 is included. The metadata partition 430 is defined in a pseudo-overwrite method in version 2.5 or higher version of the UDF specification.

In the metadata partition 430, a metadata file 440 is recorded. In order to simplify the description, the description of a metadata mirror file is omitted below. The metadata mirror file is a duplication of metadata file 440. The metadata mirror file can be also recorded.

A FE (Metadata file) 441 is recorded. The FE (Metadata file) 441 is a file entry (FE) indicating a recording location of the metadata file 440 in the physical partition 420.

The information on the file structure such as a file entry (FE) indicating a recording location of a user data file or a directory, is located in the metadata partition 430 (i.e. the metadata file 440).

In FIG. 7, only the ROOT directory is recorded. In the metadata file 440, only a file set descriptor 433 FE and an FE (ROOT) 442 are recorded. In order to simplify the description, it is assumed that a directory file is included in each FE.|

It is assumed that the state shown in FIG. 7 is a state in which any replacement recording has not been performed yet. The management of unrecorded areas in the metadata partition 430 may be performed using a metadata bitmap (not shown) as defined in version 2.5 of the UDF specification.

Alternatively, it is possible to perform the management of unrecorded areas in the metadata partition 430 by the LRA 405 in the track #1 while maintaining unrecorded areas in the metadata partition 430 unrecorded.

The method for allocating tracks is not limited to the method shown in FIG. 7. For example, more tracks can be allocated. It is possible to add a new track when it is required, while maintaining the state of the last track in the user data area such that the new track can be added to the last track.

Next, with reference to a flowchart shown in FIG. 8A, the procedure of the data recording process will be described below.

Herein, a case where a data file (File-a) is to be recorded in the information recording medium 100 is described as an example.

A plurality of physical addresses are assigned to the data area 102 of the information recording medium 100. A plurality of logical addresses are assigned to the user data area 108 of the information recording medium 100. It is assumed that a corresponding relationship between the plurality of logical addresses and the plurality of physical addresses is predetermined.

Each of the plurality of logical addresses is represented by a logical sector number (LSN) or a logical block address (LBA). Each of the plurality of physical addresses is represented by a physical sector number (PSN) or physical block address (PBA). Further, it is assumed that at least one track is allocated in user data area 108.

(Step S101) Prior to recording the data file (File-a), the drive control section 311 performs a preparation process for the data recording. Such a preparation process for the data recording is performed, for example, when the information recording medium 100 is loaded into the drive apparatus 310.

For example, the drive control section 311 reads the latest disc management information from the disc management information area 104 (or the disc management information area 105) of the information recording medium 100.

The drive control section 311 obtains the user area start location information 1103, the user area end location information 1104, the spare area information 1105 and like from the disc management information in order to determine a primary logical address-physical address mapping indicating the corresponding relationship between the plurality of logical addresses and the plurality of physical addresses assigned to the user data area 108.

Hereinafter, the drive control section 311 performs translation between the logical address and primary physical address in accordance with the primary logical address-physical address mapping.

The drive control section 311 obtains track management information included in the disc management information area 104.

(Step S102) The drive control section 311 receives a recording instruction from the host apparatus 305. The recording instruction includes a logical address indicating a location at which data is to be recorded. This logical address is represented, for example, by a logical sector number (LSN) or a logical block address (LBA). The recording instruction may include a single logical address indicating a location at which single data is to be recorded, or it may include a plurality of logical addresses indicating a plurality of locations at which a plurality of data are to be recorded respectively.

The logical address included in the recording instruction is determined, for example, by the host apparatus 305 based on a logical address indicating a location at which data is to be recorded the next time (i.e. a logical next writable address (a logical NWA)).

The logical NWA is output from the drive apparatus 310 to the host apparatus 305 in response to a request from the host apparatus 305 to the drive apparatus 310, for example.

The logical NWA is obtained by translating the NWA determined by Expression (1) described above in accordance with the primary logical address-physical address mapping. This translation is performed by the drive control section 311. The procedure for determining the NWA and the logical NWA will be described later in detail in embodiment 2 of the invention.

The system control section 301 of the host apparatus 305 generates and updates file system information as necessary in order to record data file (File-a). For example, the system control section 301 generates an FE (File-a) for the data file (File-a) and updates the ROOT directory which is a parent directory of the data file (File-a) using the memory circuit 302.

The generated FE (File-a) for the data file (File-a) and the updated ROOT directory are recorded in the information recording medium 100 by outputting the recording instruction from the host apparatus 305 to the drive apparatus 310. Thus, the latest file system information is reflected on the information recording medium 100.

If necessary, the host apparatus 305 inquires the drive apparatus 310 using a predetermined command as to whether or not there is any remaining unrecorded area for performing a replacement recording.

The instructions from the host apparatus 305 to the drive apparatus 310 may be a standardized command such as a SCSI multi-media command.

For example, a request for the logical NWA may be a READ TRACK INFORMATION command, and a recording instruction may be a WRITE command.

(Step S103) The drive control section 311 translates the logical address included in the recording instruction received in step S102 into a physical address in accordance with the primary logical address-physical address mapping.

(Step S104) The drive control section 311 determines a track (an open track) of the at least one track allocated in the user data area 108 based on the physical address corresponding to the logical address included in the recording instruction and the track management information 210 (FIG. 2B) included in the disc management information.

The drive control section 311 determines a physical address indicating a location at which data is to be recorded the next time (i.e. NWA) within the determined track, based on LRA 213 within the determined track. This NWA is a next writable address determined in accordance with Expression (1) described above.

The NWA may be determined in step S104. Alternatively, the NWA may be determined in other steps other than step S104 (e.g. in the preparation process for the data recording described above).

By calculating the NWA using the LRA, it is not necessary to hold the information on the NWA in the track management information. As a result, it is possible to simplify the data structure of the track management information.

(Step S105) The drive control section 311 determines whether or not the physical address corresponding to the logical address included in the recording instruction is less than the NWA.

When it is determined that the physical address corresponding to the logical address included in the recording instruction is less than the NWA, the recording instruction is determined as a recording instruction for the recorded area in the user data area 108. In this case, the process proceeds to step S106. Otherwise, the process proceeds to step S108.

(Step S106) The drive control section 311 determines data to be recorded. When the data recording is performed as a unit of ECC cluster in the information recording medium 100, the drive control section 311 determines the data specified by the recording instruction as the data to be recorded. For example, if the recording location and the size of the data specified by the recording instruction match a boundary of the ECC clusters, then an entire ECC cluster is rewritten. In this case, the drive control section 311 determines the data itself specified by the recording instruction as the data to be recorded.

If it does not match any boundary of the ECC clusters, then the drive control section 311 performs a read-modify-write process described below. In this case, the drive control section 311 determines the data as a unit of ECC cluster which is obtained during the read-modify-write process as the data to be recorded.

(Step S107) The drive control section 311 determines the recording location of the data determined in step S106. Specifically, the drive control section 311 determines a specific location in the user data area 108, which is other than the location indicated by the physical address corresponding to the logical address included in the recording instruction, as the recording location of the data determined in step S106.

The specific location may be the NWA within the track determined in step S104.

Alternatively, the specific location may be a location indicated by an NWA within an open track which is different from the track determined in step S104. In this case, it is preferable that the NWA within the open track is an NWA which indicates a location which is closest to the location indicated by the physical address corresponding to the logical address included in the recording instruction.

(Step S108) The drive control section 311 determines whether or not the physical address corresponding to the logical address included in the recording instruction is equal to the NWA.

When it is determined that the physical address corresponding to the logical address included in the recording instruction is equal to the NWA, the recording instruction is determined as a recording instruction to the location indicated by the NWA. That is, the data recording instructed by the recording instruction is determined as an appending recording (a new recording). In this case, the process proceeds to step S109. Otherwise, the process proceeds to step S111.

(Step S109) The drive control section 311 determines data to be recorded. Specifically, the drive control section 311 determines the data specified by the recording instruction as the data to be recorded.

Then, the drive control section 311 determines whether or not the end of the data specified by the recording instruction matches a boundary of the ECC clusters. If it does not match the boundary of the ECC clusters, padding data (e.g. data consisting of one or more "00"h) is inserted such that the end of the data after insertion matches the boundary of the ECC clusters. In this case, the drive control section 311 determines the data after insertion as the data to be recorded.

(Step S110) The drive control section 311 determines the recording location of the data determined in step S106. Specifically, the drive control section 311 determines the location indicated by the physical address corresponding to the logical address included in the recording instruction (i.e. the location indicated by the NWA), as the recording location of the data determined in step S106.

(Step S111) The drive control section 311 performs an error process.

(Step S112) The drive control section 311 performs a recording process for the determined recording location.

When the determination result in step S105 is "Yes", the drive control section 311 controls the recording/reproduction section 314 to record the data determined in step S106 at the recording location determined in step S107.

When the determination result in step S108 is "Yes", the drive control section 311 controls the recording/reproduction section 314 to record the data determined in step S109 at the recording location determined in step S110.

Further, the drive control section 311 performs a verify process for the recorded data to determine whether or not the data recording has succeeded. If the data recording has succeeded, then the process proceeds to step S113.

If the data recording has failed, then an unrecorded area in the spare area (e.g. the inner spare area 106) or the user data area 108 is allocated as a replacement cluster, and the data is recorded in the replacement cluster.

After the data recording has finally succeeded, the process proceeds to step S113.

For example, the processes of step S106 and step S112 described above is performed as a read-modify-write process (hereinafter RMW process).

According to the RMW process, firstly, the drive control section 311 controls the recording/reproduction section 314 to reproduce the data recorded in the ECC cluster including a physical sector at a location indicated by the physical address corresponding to the logical address included in the recording instruction, and it stores the data reproduced from the ECC cluster in the memory circuit 312 (i.e. "read" process).

There is a possibility that the ECC cluster to be reproduced is replaced with a replacement cluster at the time when the reproduction process is performed. The drive control section 311 refers to the replacement management information list 1000, and, if necessary, it controls the recording/reproduction section 314 to reproduce the data recorded in the replacement cluster. The procedure of the data reproduction referring to the replacement management information list 1000 will be described later.

Secondly, the drive control section 311 replaces the data recorded in the physical sector at the location indicated by the physical address corresponding to the logical address included in the recording instruction among the data reproduced from the ECC cluster with the data included in the recording instruction (i.e. "modify" process). As a result, the data to be recorded in the replacement cluster is obtained.

The drive control section 311 performs a read process and a modify process in step S106.

Figure 8A:
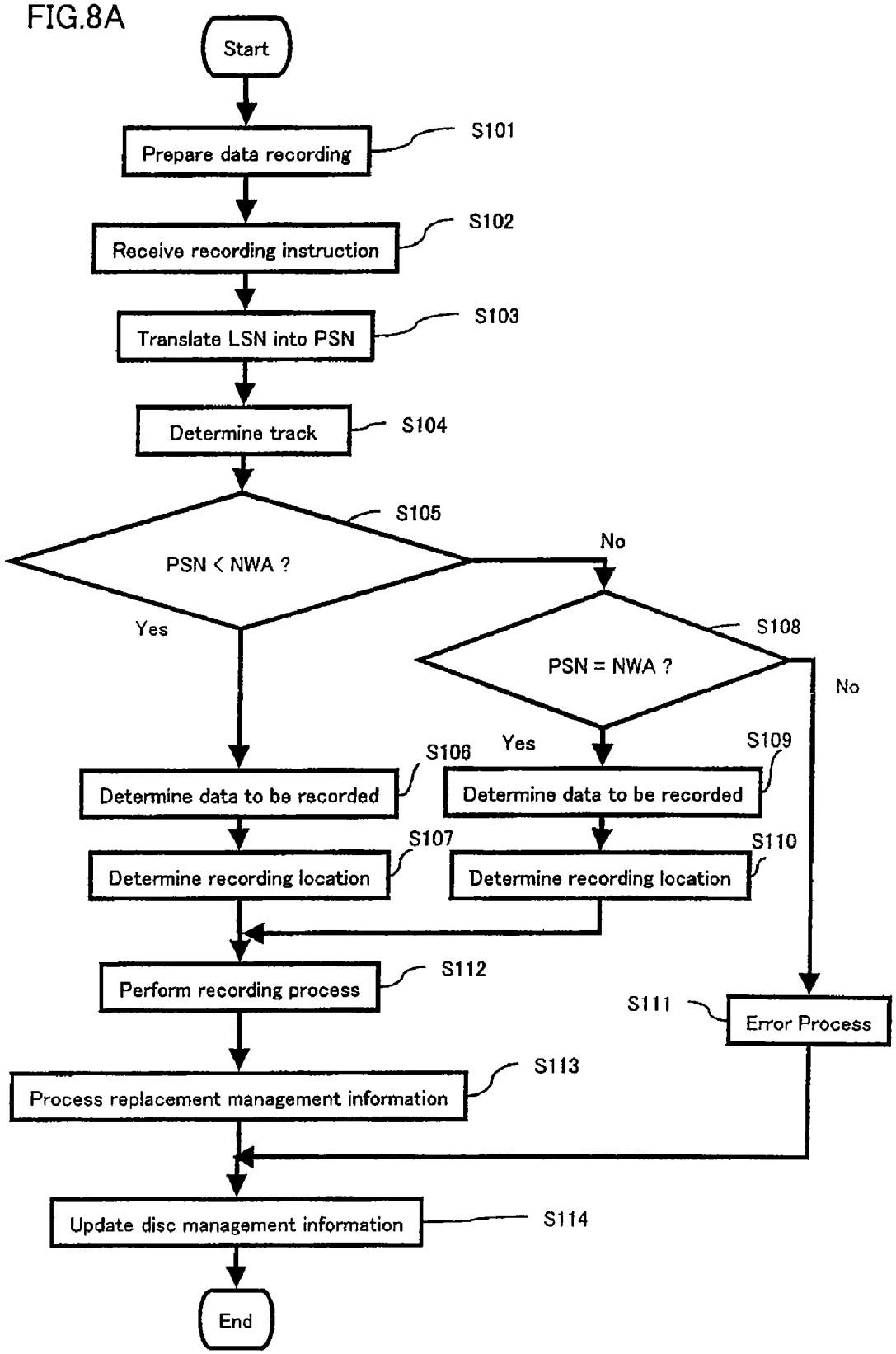
FIG. 8A is a flowchart showing a recording process according to an embodiment of the present invention.
Figure 8B:
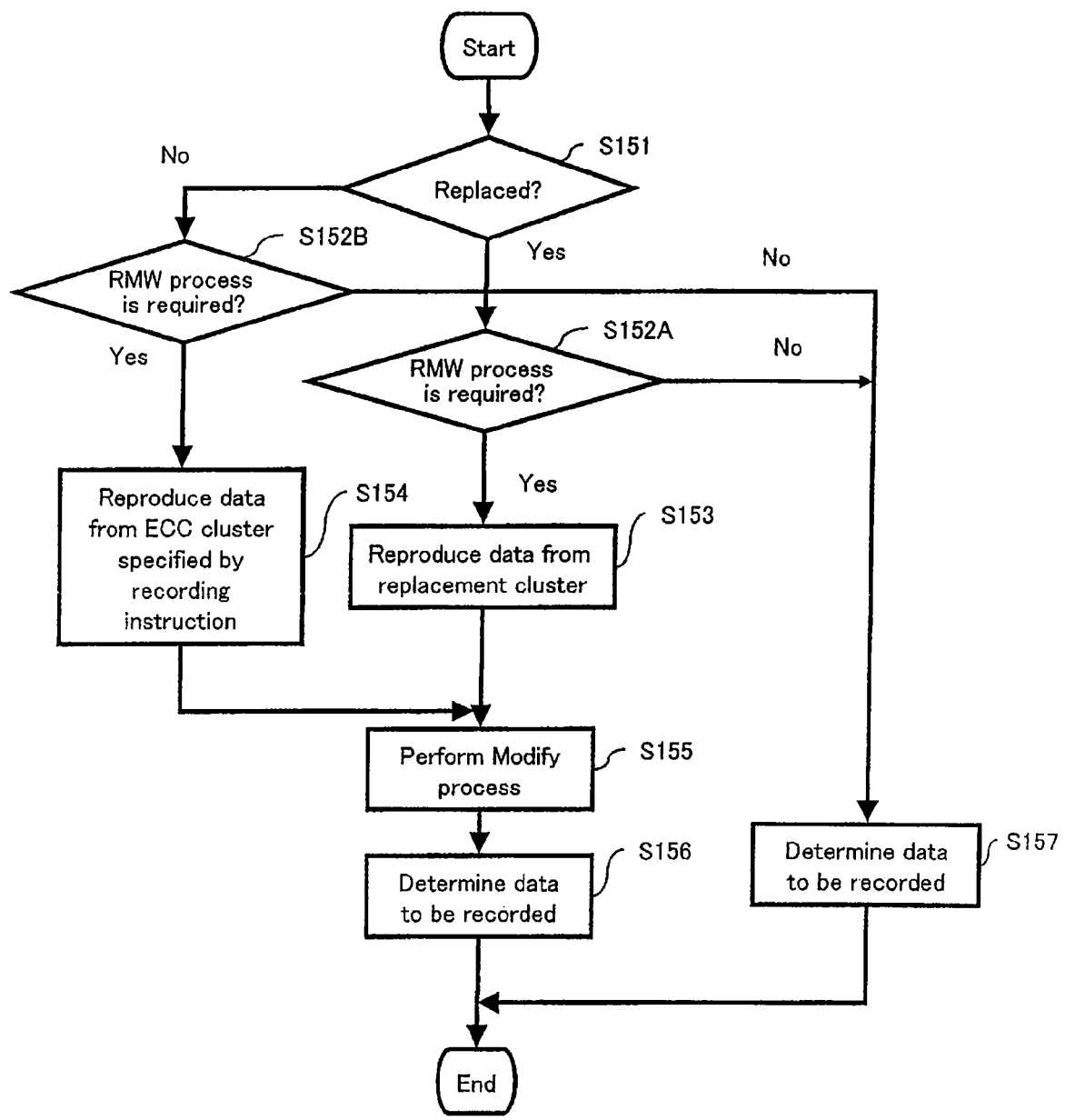
FIG. 8B is a flowchart showing a RMW process according to an embodiment of the present invention.

FIG. 8B shows the steps performed when the read process and the modify process are performed in step S106 shown in FIG. 8A. Each step shown in FIG. 8B is performed by the drive control section 311 of the drive apparatus 310.

(Step S151) The drive control section 311 determines whether or not the ECC cluster including the location specified by the recording instruction has been already replaced by a replacement cluster. Such a determination is made, for example, by retrieving the replacement management information list 1000.

If the replacement management information 1010 which indicates the location specified by the recording instruction as original location is found, it is determined that the ECC cluster has been already replaced by the replacement cluster and the process proceeds to step S152A. Otherwise, the process proceeds to step S152B.

By holding the determination result of step S151 as a value of the internal variable, it is possible to refer to the value of the internal variable. By referring to the value of the internal variable, if necessary, in the steps other than step S151, it is possible to determine whether or not the ECC cluster including the location specified by the recording instruction has been already replaced by a replacement cluster. This makes it possible to avoid repeatedly performing the same process. For example, if the determination result of step S151 is "Yes", then the value of "1" may held as the value of the internal variable, and if the determination result of step S151 is "No", then the value of "0" may held as the value of the internal variable.

(Step S152A) The drive control section 311 determines whether or not the RMW process is required. For example, if the location and the size specified by the recording instruction matches a boundary of the ECC clusters, then drive control section 311 determines that the RMW process is not required. If the location and the size specified by the recording instruction do not match any boundary of the ECC clusters, then drive control section 311 determines that the RMW process is required.

If it is determined that the RMW process is required, then the process proceeds to step S153. Otherwise, the process proceeds to step S157.

Similar to step S151, by holding the determination result of step S152A as a value of the internal variable, it is possible to refer to the value of the internal variable. By referring to the value of the internal variable, if necessary, in the steps other than step S152A, it is possible to determine whether or not the RMW process is required.

(Step S152B) The drive control section 311 determines whether or not the RMW process is required. The process of step S152B is the same as the process of step S152A.

If it is determined that the RMW process is required, then the process proceeds to step S154. Otherwise, the process proceeds to step S157.

(Step S153) The drive control section 311 controls the recording/reproduction section 314 to reproduce the data recorded in the replacement cluster indicated by the replacement management information 1010 found in step S151, instead of the ECC cluster including the location specified by the recording instruction, and stores the reproduced data in the memory circuit 312.

(Step S154) The drive control section 311 controls the recording/reproduction section 314 to reproduce the data recorded in the ECC cluster including the location specified by the recording instruction, and stores the reproduced data in the memory circuit 312.

(Step S155) The drive control section 311 replaces the reproduced data by the data specified by the recording instruction so as to generate a modified data.

(Step S156) The drive control section 311 determines the modified data as the data to be recorded in the information recording medium 100.

(Step S157) The drive control section 311 determines the data specified by the recording instruction as the data to be recorded in the information recording medium 100.

Thus, the read process and the modify process are completed.

Thirdly, the drive control section 311 controls the recording/reproduction section 314 to record the data obtained as a result of the modify process (i.e. the data to be recorded in the replacement cluster) in a location of the original ECC cluster (i.e. "write" process). The drive control section 311 performs write process in step S112.

However, in the present invention, since the information recording medium is a write-once recording medium, it is not possible to actually record the data in a location of the original ECC cluster.

Accordingly, in the present invention, an unrecorded area in the spare area such as the inner spare area 106 or the user data area 108 is allocated as a replacement cluster, and the updated data is recorded in the replacement cluster.

Further, the drive control section 311 performs a verify process to determine whether or not the data recording has succeeded. When it is determined that the data recording has succeeded, the process proceeds to step S113.

When it is determined that the data recording has failed, an unrecorded area in the spare area such as the inner spare area 106 or the user data area 108 is allocated as a further replacement cluster, and the data is recorded in the further replacement cluster.

After the data recording has finally succeeded, the process proceeds to step S113.

When the area specified by the recording instruction corresponds to an entire ECC cluster, the entire ECC block is rewritten. In this case, the read process described above is not required.

(Step S113) The drive control section 311 generates replacement management information 1010 in accordance with the process in step S112, and stores the replacement management information 1010 in memory circuit 312. For example, in step S112, when the drive control section 311 controls the recording/reproduction section 314 to record data at a specific location in the user data area 108 wherein the specific location is any location other than the location indicated by the physical address corresponding to the logical address included in the recording instruction, the drive control section 311 generates replacement management information 1010 which maps the physical address corresponding to the logical address included in the recording instruction to a physical address indicating the specific location.

It is possible to determine whether or not the replacement management information 1010 having the original location information 1012, which indicates the same location as the physical address corresponding to the logical address included in the recording instruction, is found in the existing replacement management information list 1000 by retrieving the existing replacement management information list 1000.

If it is found, the drive control section 311 updates the replacement management information 1010 so as to set the physical address indication of the specific address as a new replacement location information 1013.

If it is not found, the drive control section 311 generates new replacement management information 1010 and adds the new replacement management information 1010 to the replacement management information list 1000.

Next, the drive control section 311 sorts the replacement management information list 1000. For example, the drive control section 311 sorts the replacement management information list 1000 by the status information 1011, and then sorts it by the physical address indicated by the original location information 1012.

Thus, a new replacement management information list 1000 including the replacement management information 1010 which maps the physical address corresponding to the logical address included in the recording instruction to the physical address indicating the specific location is generated.

(Step S114) The drive control section 311 updates the disc management information to reflect the recording process described above. For example, the drive control section 311 updates the last recorded address information 1107. In addition, the drive control section 311 updates the LRA 213 in each track management information 210 corresponding to the tracks in which data have been recorded to reflect the latest recording status.

Further, the drive control section 311 generates the new disc management information including the updated information such as the new replacement management information list 1000 and track management information 210. In addition, the drive control section 311 sets the replacement management information list location information 1102 and the session management information location information 1109 included in the new disc management information to indicate the latest recording location of the new replacement management information list 1000 and track management information 210 on the information recording medium 100.

The drive control section 311 controls the recording/reproduction section 314 to record the new disc management information in a predetermined area (e.g. a temporal disc management information area) on the information recording medium 100. Thus, the disc management information is updated to reflect the latest status.

When the data recording is completed, the drive apparatus 310 can notify the host apparatus 305 of the result of the recording process. The result of the recording process is, for example, information indicating that the data recording has succeeded or failed.

Such a notification can be sent to the host apparatus 305 at a predetermined timing. For example, it is possible to send this notification to the host apparatus 305 at the timing of the end of step S108 or at the timing when an error occurs in step S112. Alternatively, it is possible to send this notification before the data recording is actually completed. For example, it is possible to send a notification indicating that the data recording is completed to the host apparatus 305 at the timing when the interpretation of the received record instruction is completed correctly.

In the replacement recording process, it is possible to retrieve an unrecorded area in a direction along which the PSNs are increased from the location of the original ECC cluster. If the unrecorded area is found during the retrieval, the unrecorded area is allocated as a replacement cluster.

Alternatively, it is possible to first retrieve an unrecorded area in a track including the original ECC cluster, and then retrieve an unrecorded area for each track in a direction along which the PSNs are increased from the track.

When the retrieval for the unrecorded area reaches the end of the user data area 108 without finding any unrecorded area, it is possible to retrieve an unrecorded area in the outer spare area 107 following the user data area 108.

Further, the retrieval for the unrecorded area reaches the end of the outer spare area 107 without finding any unrecorded area, it is possible to retrieve an unrecorded area in a direction along which the PSNs are increased from a predetermined location at the inner side of the information recording medium 100 (e.g. a leading position of the inner spare area 106 or a leading position of the user data area 108 or a location apart from its leading position by a predetermined distance).

In steps S105 and S108 of the procedure of the recording process, it is determined whether the data recording is a pseudo-overwrite recording or an appending recording by comparing the physical address corresponding to the logical address included in the recording instruction with the NWA.

The reason why it is determined whether the data recording is a pseudo-overwrite recording or an appending recording based on such a comparison is that the information recording medium 100 is a write-once recording medium and that a sequential recording is performed for the write-once recording medium.

The replacement recording method using the user data area described above according to the present invention is applicable to any rewritable optical disc. However, in order to determine whether the data recording is a overwrite recording or an appending recording (or a new recording) for the rewritable optical disc, a more complex process is required. This is because, in the case of the rewritable optical disc, it is possible to randomly rewrite data at an arbitrary location on the optical disc.

When the drive apparatus manages an unrecorded area on the rewritable optical disc as described in the embodiment above, it is necessary to manage replacement management information corresponding to all ECC clusters on the rewritable optical disc using the SDL, as described in the background art of the present specification, for example. Further, in order to determine whether the data recording for recording data at a certain location in the user data area is an overwrite recording or a new recording, it is necessary to retrieve an entire replacement management information list 1000, for example. Similarly, in order to determine whether or not an ECC cluster is used as a replacement cluster, it is necessary to retrieve an entire replacement management information list 1000. The amount of such a retrieving process is increased as the size of the replacement management information list 1000 is increased. This should be a problem since the capacity of the optical disc is being increased more and more.

On the other hand, in the present invention, since the information recording medium 100 is a write-once recording medium, it is ensured that every area in a track which has an address less than the NWA is an unrecorded area.

Accordingly, by performing the comparison described in steps S105 and S108, it is possible to easily determine whether the data recording is a pseudo-overwrite recording or an appending recording, regardless of the size of the replacement management information list 1000. Further, it is possible to easily select a replacement cluster since the replacement cluster can be selected from any location after the NWA.

The pseudo-overwrite recording in a random recording method for a write-once optical disc is performed in a similar way as the rewritable optical disc.

Further, in order to perform the random recording method for the write-once optical disc, a special structure such as the space bitmap management information 220 is required. The management of the unrecorded area for the random recording method using the space bitmap management information 220 requires significantly greater processing load to the drive control section 311, compared to the management of the unrecorded area for the sequential recording method.

In particular, in the sequential recording method, it is possible to limit the number of open tracks to a predetermined number (for example, four at maximum) so that the utilization of a file system is not reduced.

In this case, the number of open tracks depends on the structure of the file system, and it is independent from the capacity of the optical disc. On the other hand, the size of the space bitmap management information 220 is increased as the capacity of the optical disc is increased. As a result, the processing load is also increased.

Thus, the effect of the present invention for performing a pseudo-overwrite in the sequential recording method is very significant for the optical disc, since the capacity of the optical disc is being increased more and more.

One feature of the present invention is to determine an NWA in accordance with LRA 213 included in the latest track management information 210 and expression (1) in order to determine whether the data recording is a pseudo-overwrite recording or an appending recording.

By recording the LRA 213, which has been updated as a result of the data recording, on the disc, it is possible to reduce the time required to find the latest LRA 213 when the information recording medium 100 is loaded into the drive apparatus 310.

By calculating the NWA using the LRA 213, it is not necessary to hold information on the NWA in the track information. As a result, it is possible to simplify the data structure of the track management information.

In order to determine whether the data recording is a pseudo-overwrite recording or an appending recording without using a method according to the present invention, the following procedure is required, for example.

Specifically, the procedure includes the steps of determining a track including a physical address corresponding to the logical address included in the recording instruction, sequentially checking ECC clusters from a leading position of the determined track, and determining whether or not each of the ECC clusters is recorded.

If the ECC cluster is in a recorded state at a location indicated by the recording instruction, then it is determined that the data recording is a pseudo-overwrite recording.

However, it is not preferable to perform such a procedure since the amount of the required processing is increased as the size of the track is increased.

On the other hand, according to the present invention, it is possible to easily determine whether the data recording is a pseudo-overwrite recording or an appending recording, regardless of the size of the track.

Further, since LRA 213 is included in the track management information 210, it is possible to easily determine an NWA as well as the determination of a track in which the data is to be recorded when the drive apparatus 310 receives the recording instruction.

Figure 9:
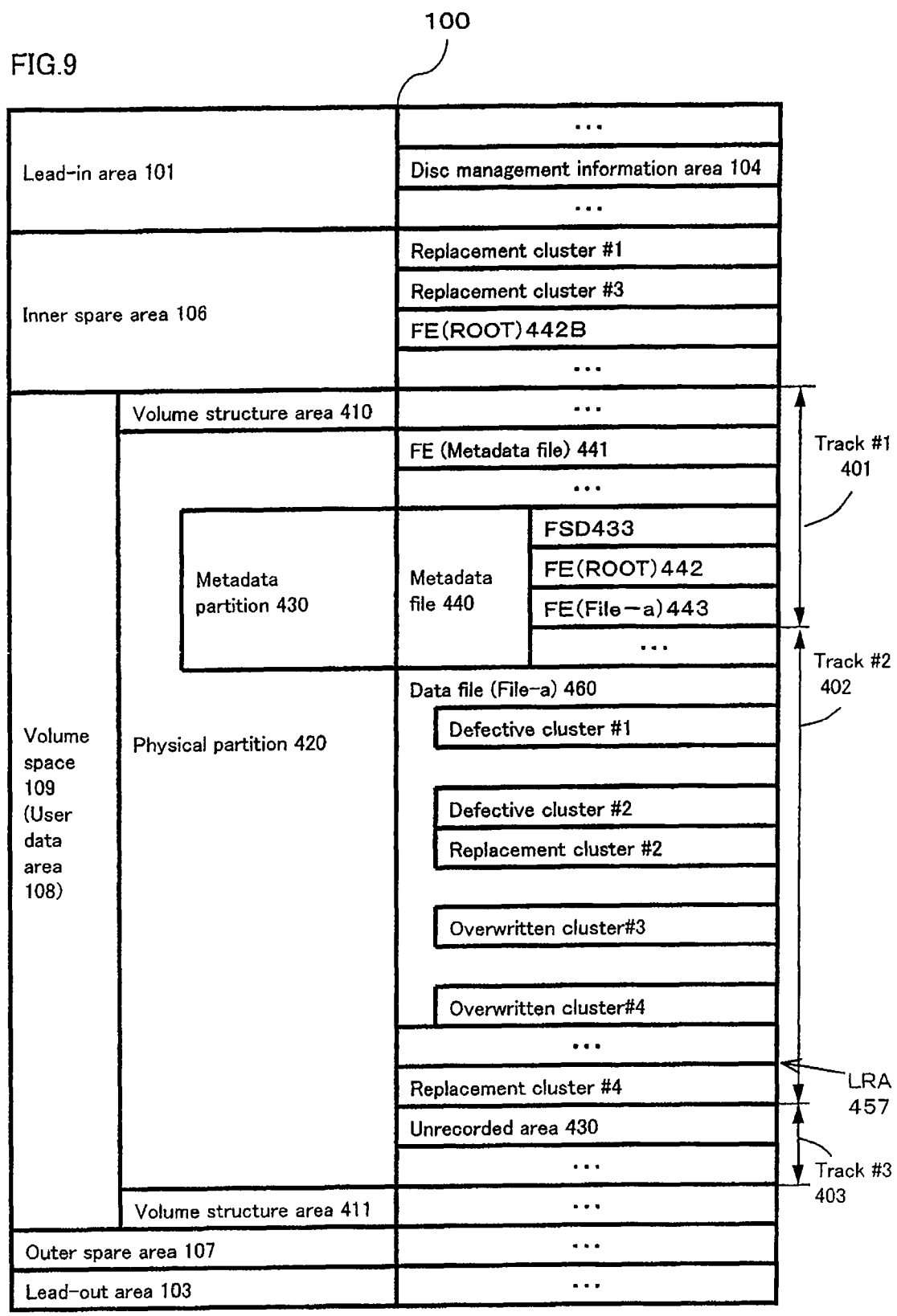
FIG. 9 is an illustrative diagram showing an exemplary data structure of the information recording medium after the recording process according to an embodiment of the present invention.

FIG. 9 shows a data structure on the information recording medium 100 after the data file has been recorded in accordance with the procedure of the data recording.

Referring to FIG. 9, data file (File-a) 460 is described as an example of the data file. It is assumed that a defective cluster #1 and a defective cluster #2 are detected in the data file (File-a) 460 in the procedure of the data recording.

The disc management information including replacement management information indicating a replacement of the defective cluster #1 with a replacement cluster #1 and a replacement management information indicating a replacement of the defective cluster #2 with a replacement cluster #2 is recorded in the disc management information area 104.

As shown in FIG. 9, the replacement cluster #1 is recorded in the inner spare area 106 and the replacement cluster #2 is recorded in the user data area 108.

The content of the data file (File-a) 460 is updated by the pseudo-overwrite recording. Specifically, an overwritten cluster #3 and an overwritten cluster #4 correspond to the updated portions of the data file (File-a) 460 according to the pseudo-overwrite recording.

The new data updated by the pseudo-overwrite recording is recorded in a replacement cluster #3 assigned as the substitute for the overwritten cluster #3 and is recorded in a replacement cluster #4 assigned as the substitute for the overwritten cluster #4. The corresponding replacement information is recorded in the disc management information area 104.

As shown in FIG. 9, the replacement cluster #3 is assigned in the inner spare area 106 and the replacement cluster #4 is assigned in the user data area 108.

1.5 Procedure of Reproduction Process (1)

Figure 10:
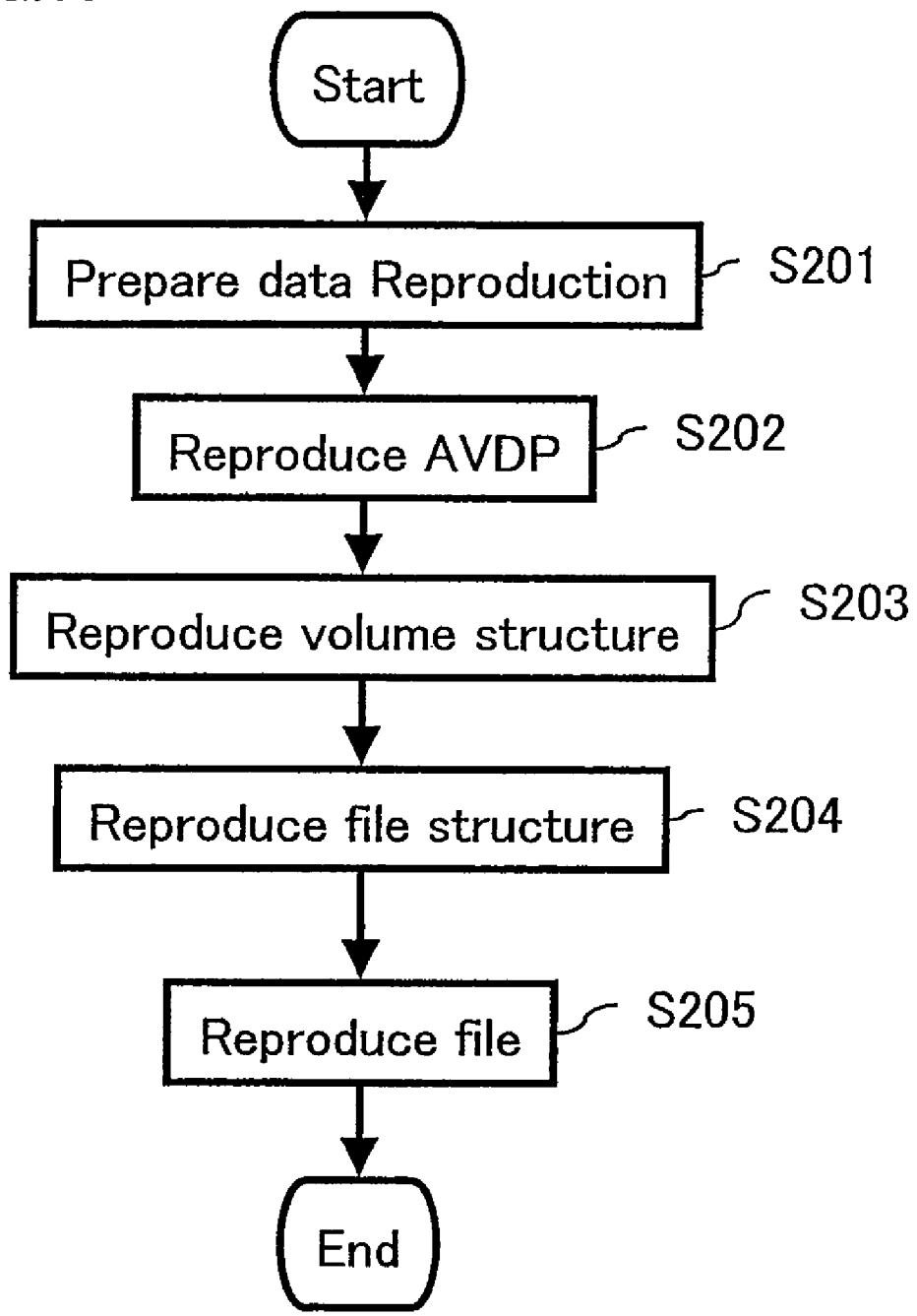
FIG. 10 is a flowchart showing a reproduction process according to an embodiment of the present invention.

With reference to a flowchart shown in FIG. 10, a reproduction process for a file is described. Herein, a reproduction process for the data file (File-a) 460 shown in FIG. 9 is described as an example.

(Step S201) Prior to performing a reproduction process, the drive control section 311 performs a preparation process for the data reproduction. Such a preparation process for the data reproduction is performed, for example, when the information recording medium 100 is loaded into the drive apparatus 310.

For example, the drive control section 311 reads disc management information from the disc management information area 104 (or the disc management information area 105) of the information recording medium 100.

The drive control section 311 obtains user area start location information 1103, user area end location information 1104, spare area information 1105 and like from the disc management information to generate a primary logical address-physical address mapping indicating the corresponding relationship between the plurality of logical addresses and the plurality of physical addresses assigned to the user data area 108.

Hereinafter, the drive apparatus 310 performs translation between the logical address and the primary physical address in accordance with primary logical address-physical address mapping.

(Step S202) The system control section 301 outputs a reproduction instruction to the drive apparatus 310 to reproduce an AVDP recorded at a predetermined location (e.g. LSN=256) of the information recording medium 100.

The AVDP is a data structure defined by the UDF specification as an anchor point of the file system information. The AVDP is recorded in the volume structure area 410 and the volume structure area 411.

(Step S203) The system control section 301 obtains location information of a main volume descriptor sequence 410A recorded in the volume structure area 410 from the AVDP. The system control section 301 outputs an instruction to the drive apparatus 310 to reproduce the main volume structure 410A.

Further, the system control section 301 obtains location information (LSN) of an FE (metadata file) 441 by retrieving the data structure from the reproduced main volume descriptor sequence 410A in steps.

(Step S204) The system control section 301 reproduces a file structure. In order to reproduce the file structure, the system control section 301 outputs a reproduction instruction to the drive apparatus 310 based on the obtained location information (LSN) of the FE (metadata file) 441 to reproduce the FE (metadata file) 441.

The system control section 301 obtains location information of a metadata file 440 from the reproduced FE (metadata file) 441. As a result, it is possible to access the metadata file 440.

(Step S205) In accordance with the procedure of the data reproduction based on the UDF specification, the FDS 433, the FE (ROOT) 442, the FE (File-a) 443 and the data file (File-a) 460 are reproduced in this order. The description of the reproduction of the directory file is omitted.

In each step in the reproduction process described above, a reproduction instruction is output from the host apparatus 305 to the drive apparatus 310. The drive control section 311 of the drive apparatus 310 receives the reproduction instruction from the host apparatus 305, and performs a reproduction process in accordance with the reproduction instruction.

The reproduction instruction includes a logical address indicating a location from which data is to be reproduced. The logical address is, for example, represented by a logical sector number (LSN). Alternatively, the logical address may be represented by a logical block address (LBA). The reproduction instruction is, for example, a READ command.

Figure 12:
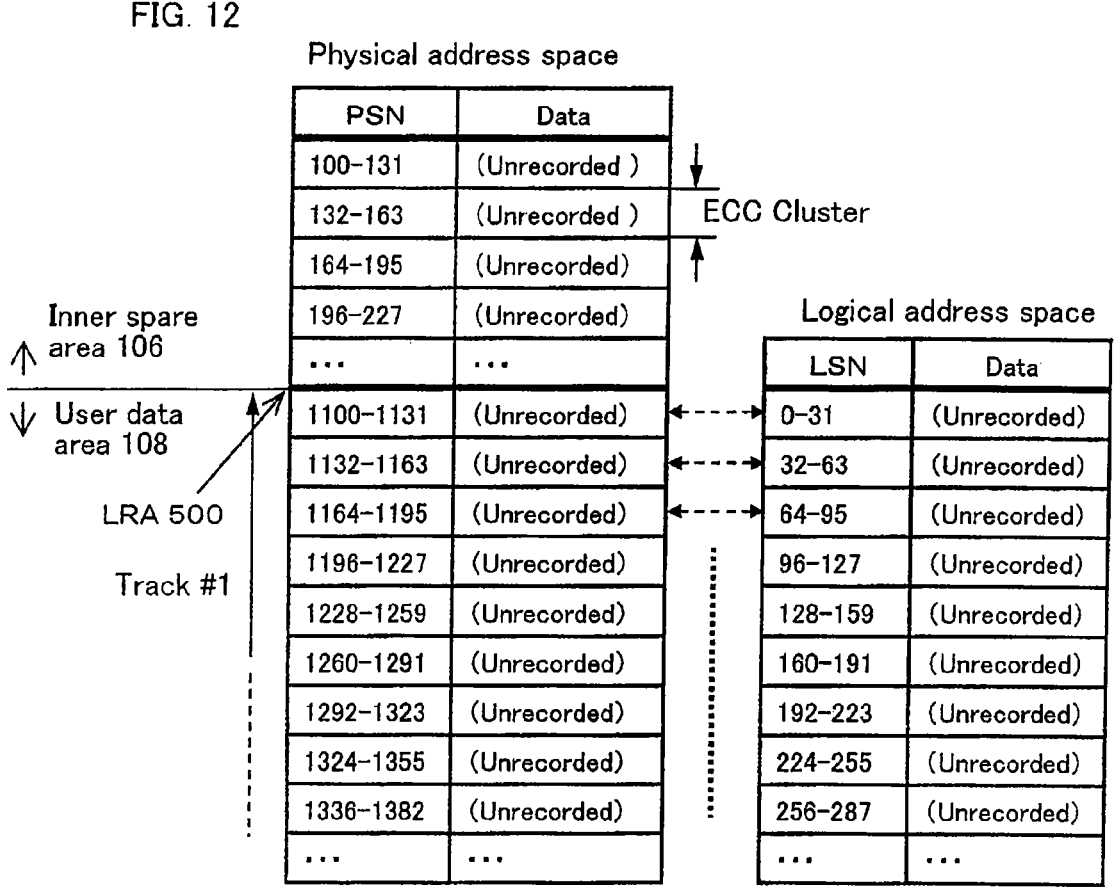
FIG. 12 is an illustrative diagram showing an exemplary data structure of the physical address space and the logical address space according to an embodiment of the present invention.

The drive control section 311 translates the logical address included in the reproduction instruction into a physical address in accordance with the primary logical address-physical address mapping (for example, see FIG. 12).

The drive control section 311 determines whether or not the replacement management information 1010 having the original location information 1012, which indicates the same location as the physical address corresponding to the logical address included in the reproduction instruction, is found in the replacement management information list 1000 by retrieving the replacement management information list 1000.

If it is found, the drive control section 311 refers to the replacement location information 1013 of the replacement management information 1010 and controls the recording/reproduction section 314 to reproduce data from the location indicated by the replacement location information 1013.

If it is not found, the drive control section 311 controls the recording/reproduction section 314 to reproduce data from the location indicated by the physical address corresponding to the logical address included in the reproduction instruction. The reproduced data is sent back to the host apparatus 305.

1-6. Procedure of Recording Process (2)

FIG. 11 shows a data structure of the replacement management information 1010B. The replacement management information 1010B is a different embodiment of the replacement management information 1010 shown in FIG. 5B.

As shown in FIG. 11, the status information 1011 of the replacement management information 1010B includes three information, i.e. Flag1, Flag2 and Flag3.

Flag1 is information for classifying the replacement management information 1010B. Flag1 includes information indicating whether the replacement information is for the purpose of the replacement recording or for the purpose of the designation of the defective cluster.

Flag2 is information on the recording location of the replacement cluster managed by the replacement management information 1010B. Flag2 includes information indicating whether the recording location of the replacement cluster is in the spare area (or there is no replacement cluster) or the recording location of the replacement cluster is in the user data area.

Flag3 is information on the number of the clusters managed by the replacement management information 1010B. Flag3 includes information indicating whether the replacement information corresponds to a single cluster or a plurality of contiguous clusters. When the replacement information corresponds to a plurality of contiguous clusters, Flag3 further includes information indicating whether the replacement information corresponds to a start location of the contiguous range or an end location of the contiguous range.

Hereinafter, with reference to FIG. 11, the procedure of the data recording according to the present invention will be described in detail.

The symbols at the right side of FIG. 11 represent the respective types of the replacement management information. These symbols are referred to in the description below, if necessary. For example, the replacement management information (type (1)) includes the status information 1011 such that Flag1=1 (for the purpose of the replacement recording), Flag2=0 (for the replacement in the spare area) and Flag3=00 (for a single cluster). This replacement management information (type (1)) may be denoted by the replacement management information (1).

FIG. 12 shows an example of the data structure of the physical address space and the logical address space on the information recording medium 100 according to the present invention.

FIG. 12 also shows a corresponding relationship between the logical sector number (LSN) and the physical sector number (PSN) in a primary state. The logical sector number (LSN) is a logical address indicating a location which is seen from the host apparatus 305 on the information recording medium 100. The physical sector number (PSN) is a physical address indicating an actual location on the information recording medium 100. This corresponding relationship is referred to as a primary logical address-physical address mapping. This mapping is represented by broken line arrows in FIG. 12 (or other figures).

Each row shown in FIG. 12 corresponds to one ECC cluster. In FIG. 12, a physical address (PSN) and a logical address (LSN) corresponding to the physical address (PSN) are shown in the same row.

In FIG. 12, the values of the PSNs and the LSNs are shown as the values of the PSNs and the LSNs from the first sector to the last sector in the corresponding ECC cluster.

Herein, it is assumed that one ECC cluster consists of 32 sectors. However, one ECC cluster may be any other configuration.

The PSNs are assigned to the inner spare area 106, the outer spare area 107 and the user data area 108.

The tracks are allocated from a leading position of the user data area 108. In the state shown in FIG. 12, since no data is recorded, the LRA 500 designates a leading position of the user data area 108.

The LSNs are assigned to only the user data area 108 (or the volume space 109).

The host apparatus 305 instructs a recording process or a reproduction process. These instructions specify a specific logical sector on the information recording medium 100 using the LSN.

The drive apparatus 310 translates the LSN received from the host apparatus 305 into a PSN using the primary logical address-physical address mapping, and accesses a physical sector or ECC cluster in accordance with the PSN.

In the replacement recording described hereinafter, the primary logical address-physical address mapping is basically used. When the logical address-physical address mapping other than the primary logical address-physical address mapping is required, the replacement management information 1010 is used.

The values of the PSNs and the LSNs are only examples for explanation. These values can be varied depending on the structure and the capacity of the information recording medium 100.

As described above, the size of the disc management information and the spare area can be changed. The size of these is determined at the time when the format process is performed in response to an instruction from the host apparatus 305.

After the format process, the start location and the end location of the user data area 108 is not changed.

In this case, it is possible to determine a relationship of the primary logical address-physical address mapping uniquely (e.g. by a predetermined calculation) from information of the disc structure information 1100 (e.g. in more detail, user area start location information 1103, user area end location information 1104, spare area information 1105 and like) included in the disc management information.

With reference to FIGS. 12 to 17B, an exemplary use of the replacement management information 1010B shown in FIG. 11 will be described.

Firstly, the transition from the state shown in FIG. 12 to the state shown in FIG. 13A is described.

The host apparatus 305 instructs to record data "A" at a location of LSN=0.

Upon the receipt of the recording instruction, the drive apparatus 310 translates LSN=0 into PSN=1100 in accordance with the primary logical address-physical address mapping and records data "A" at a location of PSN=1100.

Next, the drive apparatus 310 performs a verify process for the recorded data. Herein, it is assumed that the recording of data "A" has succeeded.

The host apparatus 305 instructs to record data "A1" at a location of LSN=0.

Upon the receipt of the recording instruction, the drive apparatus 310 translates LSN=0 into PSN=1100 in accordance with the primary logical address-physical address mapping and performs a RMW process at a location of PSN=1100. Then, the drive apparatus 310 records data "A1" at a location of PSN=100 in the inner spare area 106.

The drive apparatus 310 generates replacement management information 511. The location of PSN=1100 at which data "A" is recorded is set to the original location of the replacement management information 511. The location of PSN=100 at which data "A1" is recorded is set to the replacement location of the replacement management information 511. The status information 1011 of the replacement management information 511 is set in accordance with FIG. 11.

The replacement management information 511 corresponds to solid line arrows shown in FIG. 13A. The tail of each arrow represents the original location of the replacement management information 511 and the head of each arrow represents the replacement location of the replacement management information 511. Hereinafter, a similar notation will be used.

In the state shown in FIG. 13A, the host apparatus 305 instructs to record data "B" at a location of LSN=2. Herein, it is assumed that the recording of data "B" has failed. Then, the data "B" is recorded at a location of PSN=132 in the inner spare area 106.

The replacement management information 512 is generated in response to this replacement recording. The location of PSN=1032 is set to the original location of the replacement management information 512. The location of PSN=132 is set to the replacement location of the replacement management information 512. The status information 1011 of the replacement management information 512 is set in accordance with FIG. 11.

The data allocation and the replacement management information list after the data recording described above is completed are shown in FIG. 13A and FIG. 13B, respectively. In the replacement management information list 1000A shown in FIG. 13B, the replacement management information (1) is used.

With reference to FIGS. 14A and 14B, the cases where the replacement management information (4) and (7) are used will be described.

The host apparatus 305 instructs to record data "C" at a location of LSN=64. In accordance with the recording instruction, the drive apparatus 310 records data "C" at a location of PSN=1164. Herein, it is assumed that the recording of data "C" has failed. Then, a recorded area in the user data area 108 (PSN=1196) is allocated and the data "C" is recorded at a location of PSN=1196 instead of the location of PSN=1164.

The replacement management information 513 is generated in response to this replacement recording.

The host apparatus 305 instructs to record data "D" at a location of LSN=128. Then, the host apparatus 305 instructs to record data "D1". Herein, it is assumed that the recording of data "D1" has failed. Then, the data "D1" is recorded at a location of PSN=1292.

The replacement management information 514 is generated in response to this replacement recording.

PSN=1260 indicates a location of a defective cluster, wherein there is no replacement cluster corresponding to the defective cluster. Then, the replacement management information 515 is generated.

The host apparatus 305 instructs to record data "D2" at a location of LSN=128. Then, the data "D2" is recorded at a location of PSN=1324.

The replacement management information 514A is generated in response to this replacement recording. The replacement management information 514 becomes unnecessary. Accordingly, the replacement management information 514 is deleted from the replacement management information list 1000.

After the recording process described above is completed, the location of the LRA is updated to a location indicated by 500B.

The replacement management information list 1000B (FIG. 14B) is sorted by Flag1 of the status information 1011, and then it is sorted by the value of PSN indicated by the original location information 1012.

Figures 15A, 15B:
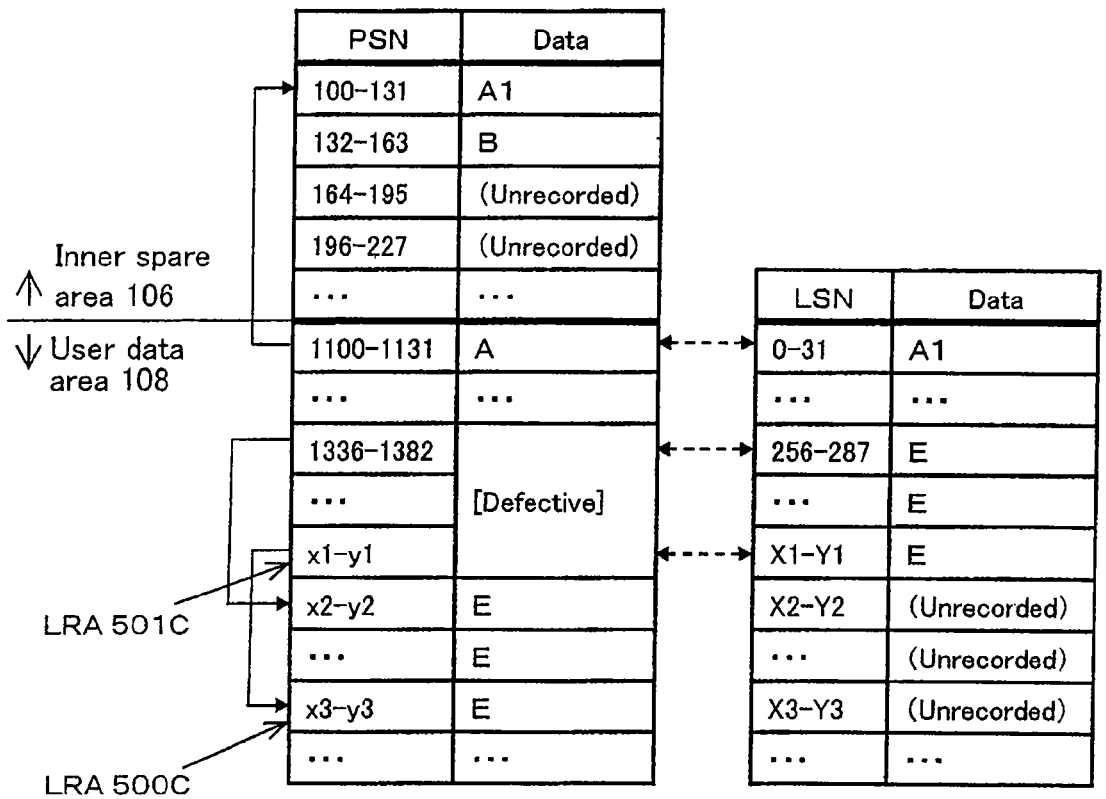
FIG. 15A is an illustrative diagram showing a replacement recording according to an embodiment of the present invention.
FIG. 15B is an illustrative diagram showing a replacement management information according to an embodiment of the present invention.

With reference to FIGS. 15A and 15B, the cases where the replacement management information (5) and (6) are used will be described.

The host apparatus 305 instructs to record data "E" at a location of LSN=256~X1. Herein, it is assumed that the recording of data "E" has failed. Then, the data "E" is recorded at a location of PSN=x2~x3. The replacement management information 516 and the replacement management information 517 are generated. Each of the replacement management information 516 and 517 indicates the first PSN of the ECC cluster corresponding to a start location of the replacement recording and the first PSN of the ECC cluster corresponding to an end location of the replacement recording.

In the state shown in FIGS. 16A and 16B, the host apparatus 305 instructs to record data "E1" at a location of LSN=256~X1. Then, the data "E1" is recorded at a location of PSN=x4~x5, which are an recorded area in the state shown in FIG. 15A.

The replacement management information 516A is generated as information indicating a start point of the replacement recording. The replacement management information 517A is generated as information indicating an end point of the replacement recording.

At this time, the replacement management information 516 and 517 become unnecessary. Accordingly, the replacement management information 516 and 517 are deleted from the replacement management information list 1000.

In the examples shown in FIGS. 15A and 16A, all of data are recorded in the user data area 108 as a result of the replacement recording. However, it is possible to record these data in the inner spare area 106. In this case, the replacement management information (2) and (3) are used.

As described in reference with FIG. 8A, the updated replacement management information list is recorded in the disc management information area.

1-7. Procedure of Reproduction Process (2)

In order to reproduce the recorded data, the following reproduction process is performed.

Prior to performing a reproduction process, the drive control section 311 performs a preparation process for the data reproduction. Such a preparation process for the data reproduction is performed, for example, in a manner similar to step S201 described above.

For example, in the state shown in FIG. 13A, the host apparatus 305 outputs a reproduction instruction to the drive apparatus 310 to reproduce data "B" at a location of LSN=32. The drive apparatus 310 translates the location of LSN=32 into a location of PSN=1132 in accordance with the primary logical address-physical address mapping.

The drive apparatus 310 retrieves the replacement management information having a location of PSN=1132 as an original location in the latest replacement management information list 1000.

In this case, the replacement management information 512 is found, the drive apparatus 310 obtains a location of PSN=132 as a replacement location.

The drive apparatus 310 reproduces data "B" from the location of PSN=132 and sends the reproduced data back to the host apparatus 305.

Even if the LSN specified by the host apparatus 305 is changed, the drive apparatus 310 performs the same reproduction process. Specifically, the drive apparatus 310 translates the received LSN into a PSN in accordance with the primary logical address-physical address mapping, and determines whether or not the replacement management information corresponding to the PSN is found in the replacement management information list 1000. If it is found, then the data is reproduced from the replacement cluster. If it is not found, then the data is reproduced from the PSN.

As described above, it is possible to use the user data area 108 as an area for a replacement location without any loss in the pseudo-overwrite recording for the information recording medium 100.

1-8. Procedure of Recording Process (3)

FIG. 18 shows a data structure of a DFL entry 2010. The DFL entry 2010 is a different embodiment of the replacement management information 1010 and the replacement management information 1010B described above.

The DFL entry 2010 includes status 1 2011A, status 2 2011B, a defective cluster first PSN 2012 and a replacement cluster leading PSN 2013. The status 1 2011A and the status 2 2011B correspond to the status information 1011 described above. The defective cluster first PSN 2012 corresponds to the original location information 1012 described above. The replacement cluster first PSN 2013 corresponds to the replacement location information 1013 described above.

Herein, similar to the explanation with reference to FIG. 5B, the defective cluster first PNS 2012 and the replacement cluster first PSN 2013 may be represented by a physical address (e.g. PSN) of the first sector in the corresponding ECC cluster. This is because a mapping is performed as a unit of ECC cluster in the defective management and the pseudo-overwrite recording.

The status 1 2011A includes at least information corresponding to Flag1 and Flag2 in the replacement management information 1010B. For example, when the status 1 2011A has a value of "1000", it is determined that there is no replacement cluster for the replacement information. This corresponds to a case where Flag2=0 and there is no replacement cluster. In this case, a value of "0" is set to the replacement cluster first PSN 2013.

On the other hand, when there exists a replacement cluster, a value of "0000" is set to the status 1 2011A. This corresponds to a case where Flag2=0 and there is a replacement cluster.

The status 2 2011B includes at least information corresponding to Flag3 in the replacement management information 1010B. For example, when the status 2 2011B has a value of "0000", it is determined that the replacement information corresponds to a single cluster. This corresponds to a case where Flag3=00.

When the status 2 2011B has a value of "0001", it is determined that the replacement information corresponds to a location of the first sector of a start cluster of a contiguous range including a plurality of clusters. This corresponds to a case where Flag3=01. When the status 2 2011B has a value of "0010", it is determined that the replacement information corresponds to a location of the last sector of an end cluster of a contiguous range including a plurality of clusters. This corresponds to a case where Flag3=10.

The DFL entry 2010 can be applied to all embodiments.

With reference to the data structure of the DFL entry 2010 shown in FIG. 18 and the flowchart shown in FIG. 19A, an exemplary process for the replacement management information in step S113 of FIG. 8A will be described in detail.

Herein, it is assumed that the replacement recording for the pseudo-overwrite recording is performed in step S112 shown in FIG. 8A and then the process proceeds to step S113.

(Step S301) It is determined whether the pseudo-overwrite recording is a first time replacement recording or a second time or more replacement recording.

This determination is performed, for example, by retrieving a DFL entry 2010 having a value of the first PSN of the ECC cluster including the physical address corresponding to the logical address included in the recording instruction as a value of the defective cluster first PSN 2012 in the latest replacement management information list. The physical address corresponding to the logical address included in the recording instruction is obtained in step S103 shown in FIG. 8A.

This latest replacement management information list is reproduced from the disc management information area and is stored in the memory circuit 312 in step S101 (FIG. 8A), for example.

When the corresponding replacement management information (e.g. the DFL entry 2010) is not found in the replacement management information list, it is determined that the pseudo-overwrite recording is a first time replacement recording. As a result, the process proceeds to step S302.

When the corresponding replacement management information is found in the replacement management information list, it is determined that the pseudo-overwrite recording is a second time or more replacement recording. As a result, the process proceeds to step S304.

Whether the pseudo-overwrite recording is a first time replacement recording or a second time or more replacement recording may be predetermined in another step. For example, it may be predetermined in step S106. The determination result in step S106 may be held and may be used in step S301.

(Step S302) The first time replacement recording is performed as follows.

The drive control section 311 creates a new DFL entry 2010 and stores it in the memory circuit 312.

(Step S303) The drive control section 311 sets values to the DFL entry 2010.

An appropriate value is set to the status 1 2011A of the DFL entry 2010. For example, when the replacement recording is performed with the replacement cluster, the value of "0000" is set to the status 1 2011A of the DFL entry 2010.

A value of a first PSN of the ECC cluster located at the physical address corresponding to the logical address included in the recording instruction is set to the defective cluster first PSN 2012 of the DFL entry 2010.

A value of a first PSN of the replacement cluster in which the data is actually recorded in the replacement recording is set to the replacement cluster first PSN 2013 of the DFL entry 2010.

An appropriate value is set to the status 2 2011B of the DFL entry 2010. For example, when the replacement recording is performed for the single cluster, the value of "0000" is set to the status 2 2011B of the DFL entry 2010.

(Step S304) The second time or more replacement recording is performed as follows.

The process proceeds to step S305 in order to update the DFL entry 2010 which has been found in step S301.

(Step S305) The status 1 2011A of the DFL entry 2010 is updated to an appropriate value. For example, when the replacement recording is performed and there exists a replacement cluster, the value of "0000" is set to the status 1 2011A of the DFL entry 2010.

The replacement cluster first PSN 2013 of the DFL entry 2010 is updated to a value of a first PSN of the replacement cluster in which the data is actually recorded in the replacement recording. That is, the location of a new replacement cluster is set.

It is not necessary to update the defective cluster first PSN 2012 of the DFL entry 2010, since the second time or more replacement recording is performed for the same ECC cluster. The defective cluster first PSN 2012 of the DFL entry 2010 maintains the same value.

The status 2 2011B of the DFL entry 2010 is updated to an appropriate value. For example, when the replacement recording is performed for the single cluster, the value of "0000" is set to the status 2 2011 B of the DFL entry 2010.

(Step S306) According to the process mentioned above, the replacement management information list is updated. That is, a new DFL entry 2010 is added to the replacement management information list or the existing DFL entry 2010 in the replacement management information list is updated.

Then, the replacement management information list is sorted. For example, the replacement management information list is sorted by the status 1 2011A. Further, the replacement management information list is sorted by the defective cluster first PSN 2012, the status 2 2011B and the replacement cluster first PSN 2013, in this order.

The process of step S113 shown in FIG. 8A is terminated. The latest replacement management information list obtained in the process is additionally recorded in the (temporary) disc management information area.

In the exemplary process, a case is described where the replacement recording for the pseudo-overwrite recording is performed. However, the process can be also applied to the replacement recording due to the occurrence of the defective cluster.

Figure 33A:
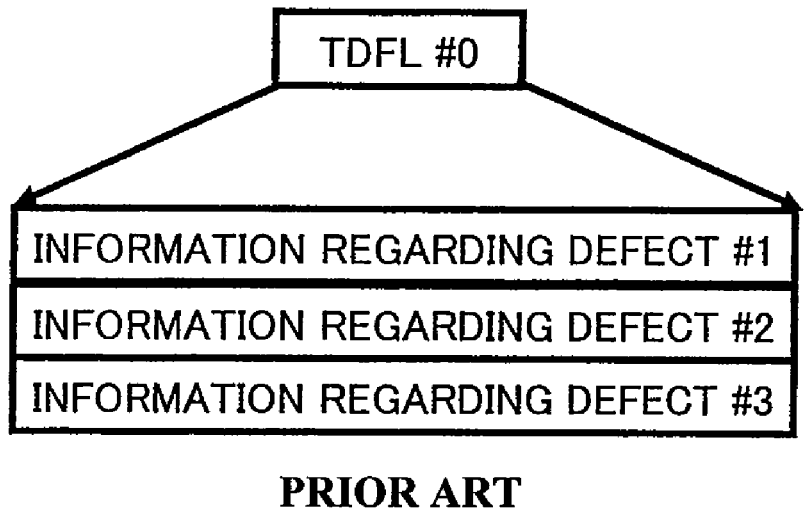
FIG. 33A is an illustrative diagram showing an exemplary data structure of the TDFL according to the conventional technique.
Figure 33B:
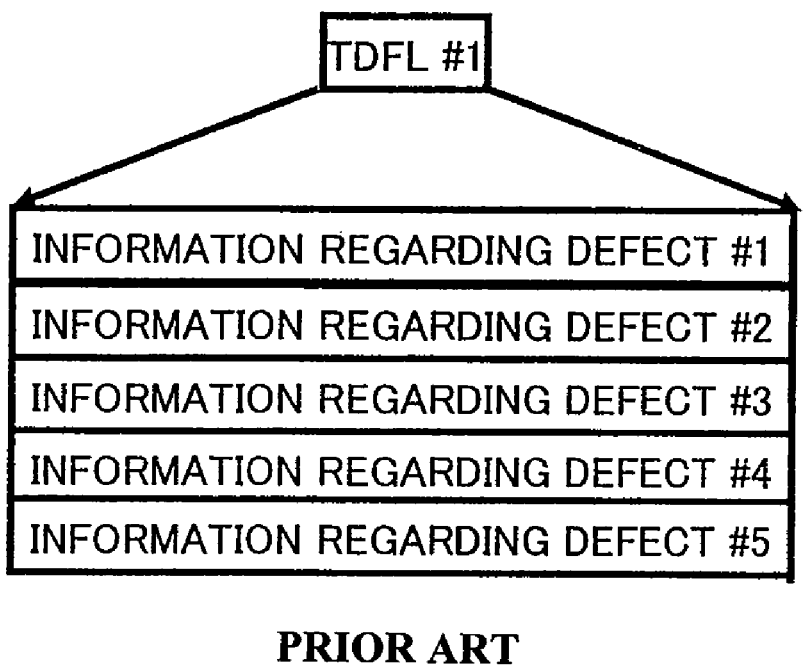
FIG. 33B is an illustrative diagram showing an exemplary data structure of the TDFL according to the conventional technique.

As described in the background art with reference to FIGS. 33A and 33B, in the conventional defective management for the write-once optical discs, new replacement management information is added to the replacement management information list each time the replacement recording is performed, while maintaining the existing replacement management information in the replacement management information list.

When such a method is applied to a recording method in which the user data area is used as an area for recording a replacement cluster as described in the present embodiment, the number of the replacement management information is increased each time the replacement recording is performed, and the size of the replacement management information list is increased each time the replacement recording is performed. This is not preferable in implementing the drive apparatus and the like.

In particular, in the conventional defective management for the write-once optical discs, the cluster which has been replaced with another cluster is not further replaced. However, in the pseudo-overwrite recording as described in the present embodiment, it is possible to further replace the cluster which has been replaced with another cluster. Accordingly, there is a possibility that the size of the replacement management information list is much increased.

Further, it is possible that there exists a plurality of replacement management information in the replacement management information list, wherein each of the plurality of replacement management information has the same value as the defective cluster first PSN 2012. Accordingly, an additional process and/or structure are required to obtain the latest replacement management information.

In the defective management for the rewritable optical discs, the replacement management information is provided for every replacement cluster, regardless of whether or not the replacement cluster is actually used.

When such a method is applied to a recording method in which the user data area is used as an area for recording a replacement cluster as described in the present embodiment, a large amount of replacement management information is required from an initial state. This is not preferable in implementing the drive apparatus and the like.

Figure 19A:
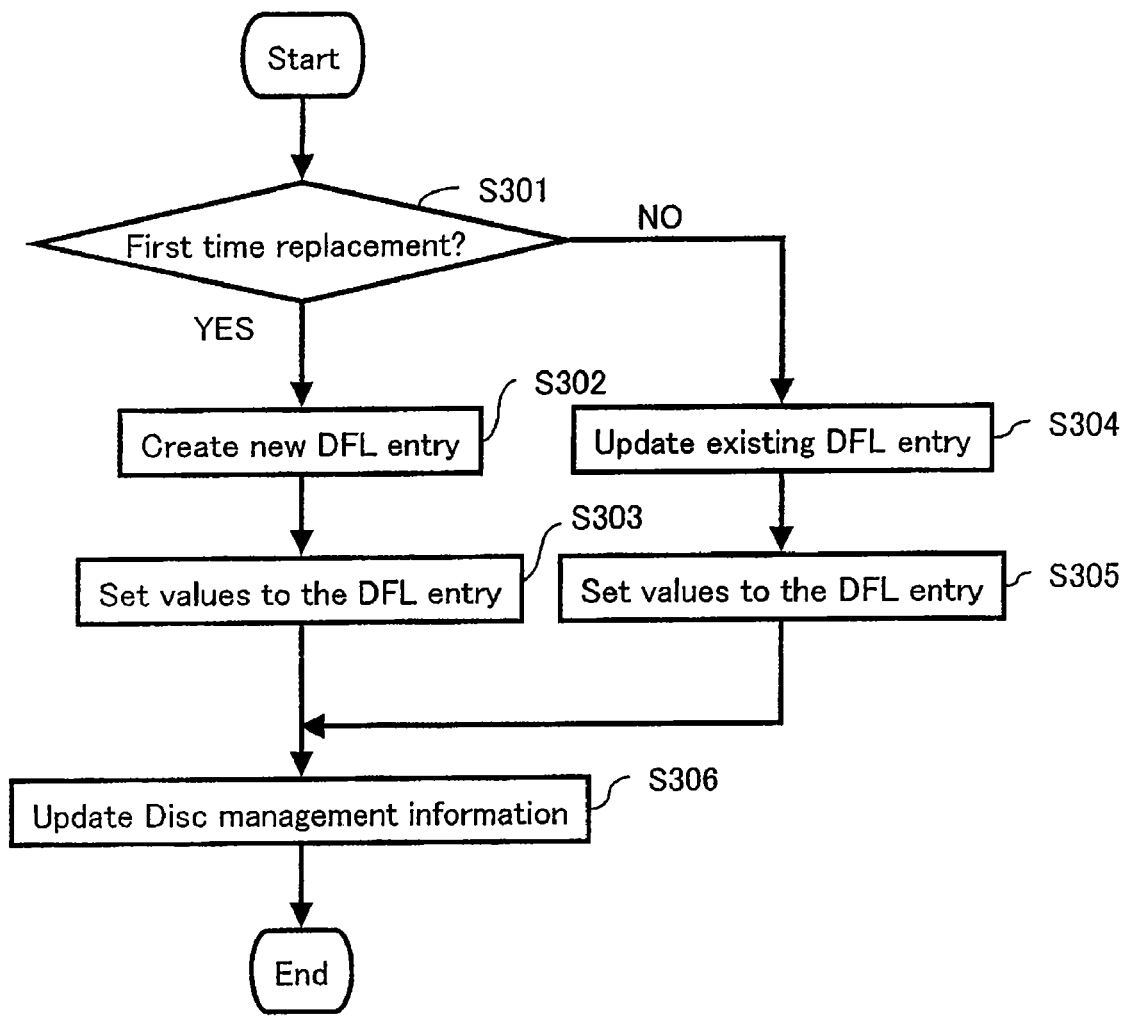
FIG. 19A is a flowchart showing a recording process according to an embodiment of the present invention.

According to the method shown in FIG. 19A, it is sufficient to generate and manage the minimum number of replacement management information. It is possible to easily find the latest replacement management information.

1-9. Procedure of Recording Process (4)

Figure 19B:
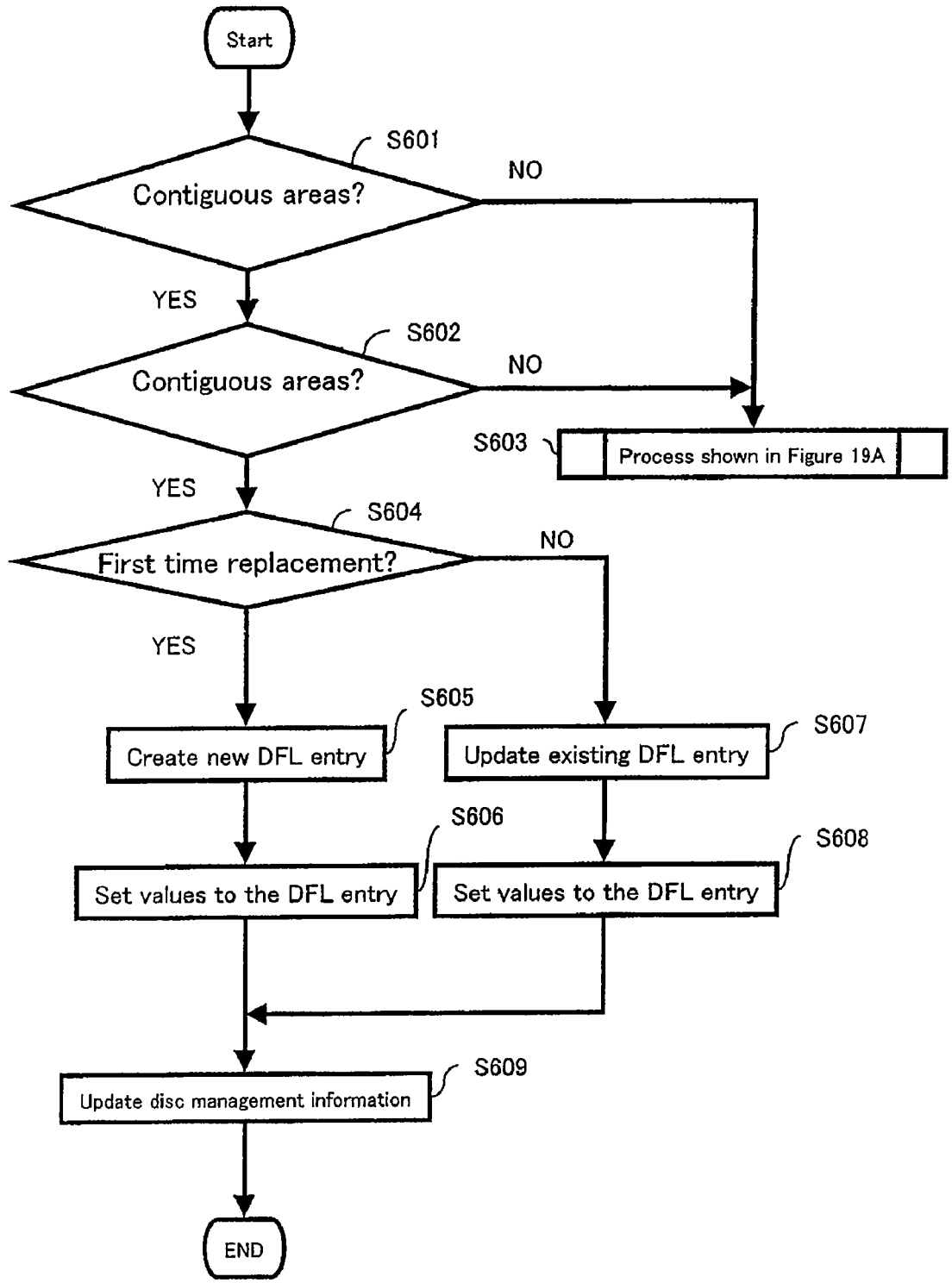
FIG. 19B is a flowchart showing a recording process according to an embodiment of the present invention.

With reference to FIG. 19B, an exemplary process of the replacement management information in the procedure of the recording process will be described in more detail.

The respective steps shown in FIG. 19B are included in step S113 shown in FIG. 8A. The following description refers to a data structure of the DFL entry 2010 which is an example of the replacement management information shown in FIG. 18.

Herein, it is assumed that the replacement recording for the pseudo-overwrite recording is performed in step S112 shown in FIG. 8A and then the process proceeds to step S113.

(Step S601) The drive control section 311 determines whether or not the area specified by the recording instruction is a contiguous range in the physical address space.

For example, the drive control section 311 determines the size of the area on the physical address space based on the recording location specified by the recording instruction and the size of the data to be recorded specified by the recording instruction. When the size of the area on the physical address space which is thus determined is greater than the size of one ECC cluster, the drive control section 311 determines that the area specified by the recording instruction is a contiguous range in the physical address space.

If the determination result in step S601 is "Yes", then the process proceeds to step S602. If the determination result in step S601 is "No", then the process proceeds to step S603.

(Step S602) The drive control section 311 determines whether or not the area in which the data is actually recorded in step S112 is a contiguous range in the physical address space.

For example, the size of the area in which the data is actually recorded in step S112 is equal to the size of the area specified by the recording instruction, the drive control section 311 determines that the area in which the data is actually recorded in step S112 is a contiguous range in the physical address space.

If the determination result in step S602 is "Yes", then the process proceeds to step S604. If the determination result in step S602 is "No", then the process proceeds to step S603.

(Step S603) The drive control section 311 performs the process described with reference to FIG. 19A, for example.

(Step S604) The drive control section 311 determines whether the pseudo-overwrite recording is a first time replacement recording or a second time or replacement recording.

Such a determination is performed, for example, by retrieving the latest replacement management information list to determine whether or not a first DFL entry 2010 (status 2 2011B="0001") and a second DFL entry 2010 (status 2 2011B="0010"), each of which having original location information indicating the same area as the contiguous range determined in step S601, are found in the replacement management information list.

When the first DFL entry 2010 and the second DFL entry 2010 are not found in the replacement management information list, it is determined that the pseudo-overwrite recording is a first time replacement recording. As a result, the process proceeds to step S605.

When the first DFL entry 2010 and the second DFL entry 2010 are found in the replacement management information list, it is determined that the pseudo-overwrite recording is a second time or more replacement recording. As a result, the process proceeds to step S607.

(Step S605) The drive control section 311 creates new first DFL entry 2010 and a new second DFL entry 2010 and stores them in the memory circuit 312.

(Step S606) The drive control section 311 sets values to the first DFL entry 2010 and the second DFL entry 2010.

A value of "0000" indicating that the replacement recording is performed and there exists a replacement cluster is set to the status 1 2011A of the first DFL entry 2010.

A value of a first PSN of the ECC cluster including a start location of the area specified by the recording instruction is set to the defective cluster first PSN 2012 of the first DFL entry 2010.

A value of a first PSN of the ECC cluster including a start location of the contiguous range in which the data is actually recorded is set to the replacement cluster first PSN 2013 of the first DFL entry 2010.

A value of "0001" indicating a start location of the contiguous range is set to the status 2 2011B of the first DFL entry 2010.

A value of "0000" indicating that the replacement recording is performed and there exists a replacement cluster is set to the status 1 2011A of the second DFL entry 2010.

A value of a first PSN of the ECC cluster including an end location of the area specified by the recording instruction is set to the defective cluster first PSN 2012 of the second DFL entry 2010. The end location of the area specified by the recording instruction is calculated, for example, by the physical address corresponding to the logical address and the length of the data to be recorded, which are specified by the recording instruction.

A value of a first PSN of the ECC cluster including an end location of the contiguous range in which the data is actually recorded is set to the replacement cluster first PSN 2013 of the second DFL entry 2010.

A value of "0010" indicating an end location of the contiguous range is set to the status 2 2011B of the second DFL entry 2010.

(Step S607) The drive control section 311 performs an update process for the first DFL entry 2010 and the second DFL entry 2010 found in step S604. Specifically, the update process is performed by setting values to the first DFL entry 2010 and the second DFL entry 2010 in step S608.

(Step S608) The drive control section 311 sets values to the first DFL entry 2010 and the second DFL entry 2010.

A value of a first PSN of the ECC cluster including a start location of the contiguous range in which the data is actually recorded is set to the replacement cluster first PSN 2013 of the first DFL entry 2010. That is, the start location of a new replacement range is set.

It is not necessary to update the defective cluster first PSN 2012 of the first DFL entry 2010, since the second time or more replacement recording is performed for the same ECC cluster. The defective cluster first PSN 2012 of the first DFL entry 2010 maintains the same value.

A value of a first PSN of the ECC cluster including an end location of the contiguous range in which the data is actually recorded is set to the replacement cluster first PSN 2013 of the second DFL entry 2010. That is, the end location of a new replacement range is set.

It is not necessary to update the defective cluster first PSN 2012 of the second DFL entry 2010, since the second time or more replacement recording is performed for the same ECC cluster. The defective cluster first PSN 2012 of the second DFL entry 2010 maintains the same value.

(Step S609) According to the process mentioned above, the replacement management information list is updated. That is, a new first DFL entry 2010 and a new second DFL entry 2010 are added to the replacement management information list or the existing first DFL entry 2010 and the existing second DFL entry 2010 in the replacement management information list are updated.

Then, the replacement management information list is sorted. For example, the replacement management information list is sorted by the status 1 2011A. Further, the replacement management information list may be sorted by the defective cluster first PSN 2012, the status 2 2011B and the replacement cluster first PSN 2013, in this order.

The process of step S113 shown in FIG. 8A is terminated. The latest replacement management information list obtained in the process is additionally recorded in the (temporary) disc management information area.

In the exemplary process, a case is described where the replacement recording for the pseudo-overwrite recording is performed. However, the process can be also applied to the replacement recording due to the occurrence of the defective cluster.

With reference to FIGS. 20A to 24B, the procedure of the data recording will be further described.

FIG. 20A shows a physical address space and a logical address space on the information recording medium 100, which is similar to FIG. 13A and the like. FIG. 20A shows a state in which data "A0" is recorded at the location of LSN=0 immediately after the formatting process. In the physical space, data "A0" is recorded in the location of PSN=1000.

The location of LSN=0 and the location of PSN=1000 maintain the relationship of the primary logical address-physical address mapping.

FIG. 20B shows a replacement management information list corresponding to FIG. 20A. The replacement management information list includes header information 1001 only and does not include any replacement management information.

In the state shown in FIG. 20A, it is assumed that the drive apparatus 310 is instructed by the host apparatus 305 to record data "A1" at the location of LSN=0.

FIG. 21A shows a state in which the recording of data "A1" is completed.

As shown in FIG. 21A, data "A1" is recorded at the location of PSN=1132 in the user data area 108 instead of the location of PSN=1000 in the user data area 108, for example. This is because the data has been already recorded at the location of PSN=1000.

This replacement recording is a first time replacement recording. Accordingly, in accordance with step S302 and the subsequent steps shown in FIG. 19A, the process for the first time replacement recording is performed. As a result, the DFL entry 2100A shown in FIG. 21B is added to the replacement management information list.

Next, in the state shown in FIG. 21A, it is assumed that the drive apparatus 310 is instructed by the host apparatus 305 to record data "A2" at the location of LSN=0.

FIG. 22A shows a state in which the recording of data "A2" is completed.

As shown in FIG. 22A, data "A2" is recorded at the location of PSN=1164 in the user data area 108 instead of the location of PSN=1000 in the user data area 108, for example. This is because the data has been already recorded at the location of PSN=1000.

This replacement recording is a second time or more replacement recording. Accordingly, in accordance with step S304 and the subsequent steps shown in FIG. 19A, the process for the second time or more replacement recording is performed. As a result, the DFL entry 2100A is updated to the DFL entry 2100B shown in FIG. 22B. That is, any DFL entry is not added to the replacement management information list.

Next, in the state shown in FIG. 22A, it is assumed that the drive apparatus 310 is instructed by the host apparatus 305 to record data "B0" at the location of LSN=96 and to record data "C0" at the location of LSNs=128 to 192.

FIG. 23A shows a state in which the recording of data "B0" and data "C0" is completed.

As shown in FIG. 23A, it is assumed that an error occurs during the verify process for verifying the recording of data "B0" at the location of PSN=1192.

In this case, data "B0" is recorded at the location of PSN=x10 in the outer spare area 107 instead of the location of PSN=1193 in the user data area 108, for example.

This replacement recording is a first time replacement recording. Accordingly, in accordance with step S302 and the subsequent steps shown in FIG. 19A, the process for the first time replacement recording is performed. As a result, the DFL entry 2101A shown in FIG. 23B is added to the replacement management information list.

It is assumed that the verify process for verifying the recording of data "C0" has been successfully completed. In this case, the replacement management information list is maintained without any change.

Next, in the state shown in FIG. 23A, it is assumed that the drive apparatus 310 is instructed by the host apparatus 305 to record data "C1" at the location of LSNs=128 to 192.

Figures 24A, 24B:
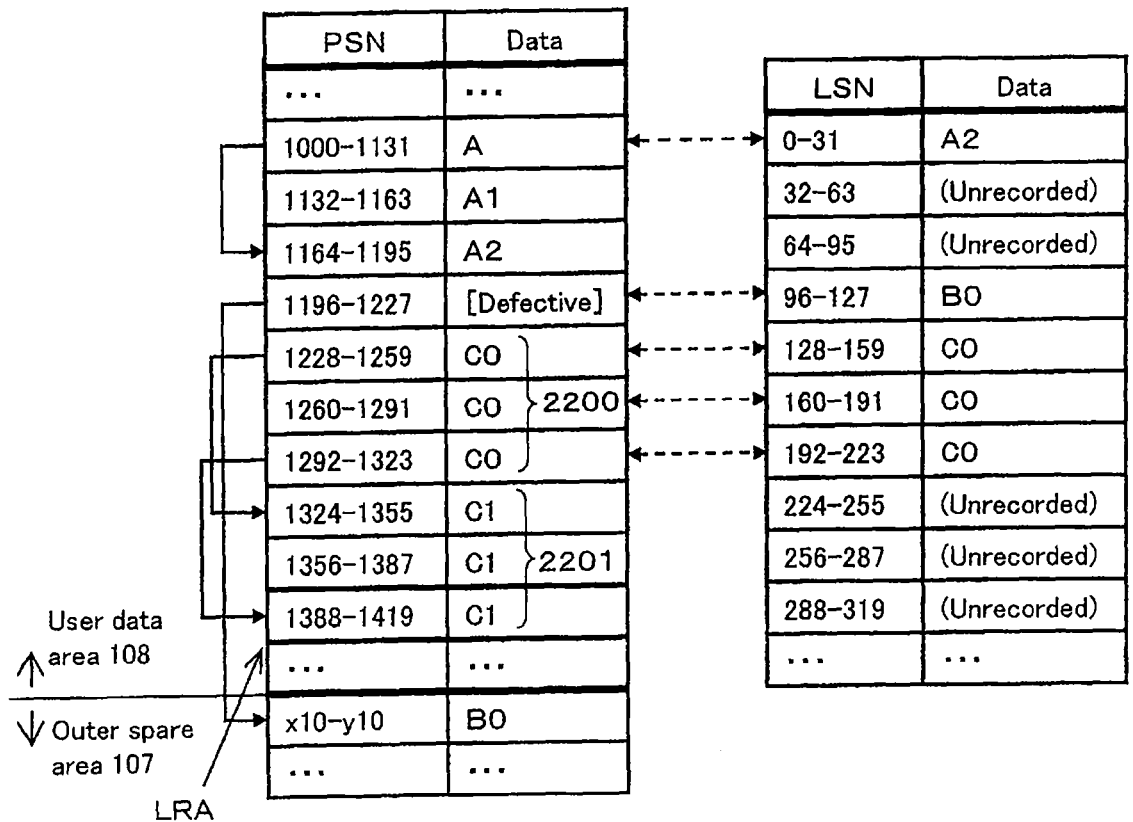
FIG. 24A is an illustrative diagram showing a replacement recording according to an embodiment of the present invention.
FIG. 24B is an illustrative diagram showing a replacement management information according to an embodiment of the present invention.

FIG. 24A shows a state in which the recording of data "C1" is completed.

As shown in FIG. 24A, data "C1" is recorded at the location of PSNs=1324 to 1388 in the user data area 108 instead of the location of PSNs=1288 to 1292 in the user data area 108, for example. This is because the data has been already recorded at the location of PSNs=1288 to 1292.

This replacement recording is a first time replacement recording. Accordingly, in accordance with step S302 and the subsequent steps shown in FIG. 19A, the process for the first time replacement recording is performed. As a result, the DFL entry 2102A and the DFL entry 2103A shown in FIG. 24B are added to the replacement management information list.

This replacement recording is based on a replacement of the contiguous range 2200 (PSNs=1228 to 1292) with the contiguous range 2201 (PSNs=1324 to 1388). The replacement is represented using the DFL entry 2012A indicating start location of the replacement range and the DFL entry 2103A indicating end location of the replacement range.

Thus, in the pseudo-overwrite recording which replaces the contiguous range 2200 with the contiguous range 2201 in the user data area 108, the drive apparatus 310 generates a first replacement management information (DFL entry 2102A) for mapping the start location of the contiguous range 2200 to the start location of the contiguous range 2201 and a second replacement management information (DFL entry 2103A) for mapping the end location of the contiguous range 2200 to the end location of the contiguous range 2201.

Although the replacement recording is performed for the contiguous range including three ECC clusters, only two DFL entries are added to the replacement management information list. This is an effect obtained by using the DFL entry 2102A and the DFL entry 2103A which map the contiguous range 2200 to the contiguous range 2201 in the user data area 108.

Regarding the replacement of the contiguous range, when the pseudo-overwrite recording is a second time or more replacement recording, it is needless to say that the existing DFL entries are updated.

Embodiment 2

2-1. Procedure of NWA Determining Process

Hereinafter, a method for determining a next writable address represented by a logical address (hereinafter, "logical NWA") will be described. The drive device 310 returns the logical NWA back to the host apparatus 305 in response to a request from the host apparatus 305.

The logical NWA is determined in accordance with the following procedure in the present invention.

An ECC cluster which is next to the ECC cluster including the physical sector indicated by the LRA is determined. This ECC cluster is a next writable ECC cluster. The first physical sector of the next writable ECC cluster is a next writable address. The next writable address represented by a physical address is the NWA described above.

The logical NWA has a value which is obtained by translating the value of the PSN indicated by the NWA into a value of the LSN in accordance with the primary logical address-physical address mapping.

Several specific examples will be described below.

In the state shown in FIG. 12, the LRA 500 indicates a leading position of the user data area 108. In this state, the NWA in the physical address space is PSN=1100. The LSN corresponding to PSN=1000 is LSN=0. Therefore, the logical NWA=0.

In FIG. 13A, the host apparatus 305 obtains the logical NWA from the drive apparatus 310 and instructs the drive apparatus 310 to record data "A" at the location of LSN=0.

In the state immediately after the recording of data "A" is completed, the LRA of the track #1 indicates an ECC cluster including the location of PSN=1132. In this state, the NWA is PSN=1132. Accordingly, the logical NWA is LSN=32. The host apparatus 305 can instruct the drive apparatus 310 to record data "B" at the logical NWA (i.e. LSN=32).

In the state immediately after the recording of data "B" is completed, the LRA of the track #1 indicates a physical sector within an ECC cluster including the location of PSN=1132. In this state, the NWA is PSN=1164. Accordingly, the logical NWA is LSN=64.

The feature of the method for determining a logical NWA described above is to determine the logical NWA to maintain the relationship of the primary logical address-physical address mapping. Specifically, the NWA is determined from the LRA within a track and then the logical NWA is obtained in accordance with the primary logical address-physical address mapping. As a result, the replacement management information 1010B is not required for the new data recording.

In FIG. 14A, it is possible that the host apparatus 305 erroneously holds a value corresponding to the LRA 501B as the logical NWA, even through the actual latest logical NWA should correspond to the LRA 500B.

For example, such a state may be caused when the drive apparatus 310 performs a recording operation for recording data at the location after PSN=1292 as an operation independent of the host apparatus 305 and the host apparatus 305 does not obtain the latest logical NWA from the drive apparatus 310.

In this state, when the host apparatus 305 instructs the drive apparatus 310 to record new data, the host apparatus 305 outputs a recording instruction for recording data at the logical NWA corresponding to the LRA 501B. However, the drive apparatus 310 records the data at the location of PSN=1336.

This recording causes a replacement recording. Accordingly, new replacement management information is required.

On the other hand, when the host apparatus 305 instructs the drive apparatus 310 to record new data, after it obtains the logical NWA corresponding to the latest LRA 500B from the drive apparatus 310, the recording does not cause any replacement recording. Accordingly, any new replacement management information is not required.

In FIGS. 15A and 16A, a similar state may be caused. In FIGS. 15A and 16A, it is possible that the host apparatus 305 erroneously holds a value corresponding to the LRA 501C as the logical NWA, even through the actual latest logical NWA should correspond to the LRA 500C and the LRA 500D.

Therefore, it is desirable that the host apparatus 305 obtains the latest logical NWA before recording a new data.

In summary, when the host apparatus 305 instructs the drive apparatus 310 to record new data, the host apparatus 305 outputs a request to the drive apparatus 310 immediately before step S102 shown in FIG. 8A, for example, in order to obtain the latest logical NWA from the drive apparatus 310. Upon receipt of the request, the drive apparatus 310 determines the logical NWA from the LRA and the NWA in accordance with the process described above and returns the logical NWA back to the host apparatus 305.

Upon receipt of the logical NWA, the host apparatus 305 generates a next recording instruction based on the logical NWA and outputs the next recording instruction to the drive apparatus 310.

By performing the operations described above, the replacement management information 1010B is not required for recording new data. The replacement management information 1010B is required for performing the replacement recording only.

As a result, it is possible to restrict increasing the data amount of the replacement management information list 1000. This provides an effect such as the reduction of the amount of processing in the data recording/reproduction, the reduction of the size of the memory, the reduction of the data size on the information recording medium 100 and the like.

Embodiment 3

3-1. Procedure of Recording Process (1)

A method for determining NWA described in the embodiment 2 causes a state in which a particular LSN is not used.

For example, in FIG. 14A, the logical sector at the location of LSN=96 is a logical sector in which any data has not been recorded when it is seen from the host apparatus 305 or the file system.

Such a logical sector is referred to as an unrecorded logical sector or a unused logical sector, an orphan logical sector and the like.

A logical cluster consisting of the unrecorded logical sectors is referred to as an unrecorded logical cluster. For example, in FIG. 14A, the logical cluster corresponding to the location of LSNs=96 to 127 is an unrecorded logical cluster.

Similarly, in FIG. 15A, the logical sector corresponding to the location of LSN=X2 is an unrecorded logical sector.

As shown in FIG. 14A and the like, the LSNs are assigned to the unrecorded logical sectors in the same manner as other normal logical sectors. Further, it is the feature of the method for determining logical NWA according to the present embodiment that the LSNs of the logical sectors subsequent to the unrecorded logical sector are not changed.

When it is instructed to record data at the unrecorded logical sector, the pseudo-overwrite recording is performed in a similar manner as the embodiments described above. For example, the following process is performed.

Herein, in the state shown in FIG. 14A, it is assumed that it is instructed to record data "F" at the location of LSN=96.

In this case, the drive apparatus 310 translates LSN=96 into PSN=1196 in accordance with the primary logical address-physical address mapping.

By comparing the location of PSN=1196 with the location indicated by the NWA, it is recognized that the data is recorded at the location of PSN=1196.

Then, the pseudo-overwrite recording is performed in a similar manner as the other embodiments described above.

In this case, the drive apparatus 310 records data "F" at the location indicated by the NWA (e.g. the location of PSN=1336) and generates replacement management information 518.

Thus, the data recording is performed for the location of LSN=96. As a result, a logical cluster corresponding to the location of LSN=96 changes from the unrecorded logical cluster to the normal logical cluster.

A logical cluster corresponding to the location of LSNs=256 to 287 associated with the location of PSN=1336 in accordance with the primary logical address-physical address mapping newly becomes an unrecorded cluster.

Figures 17A, 17B:
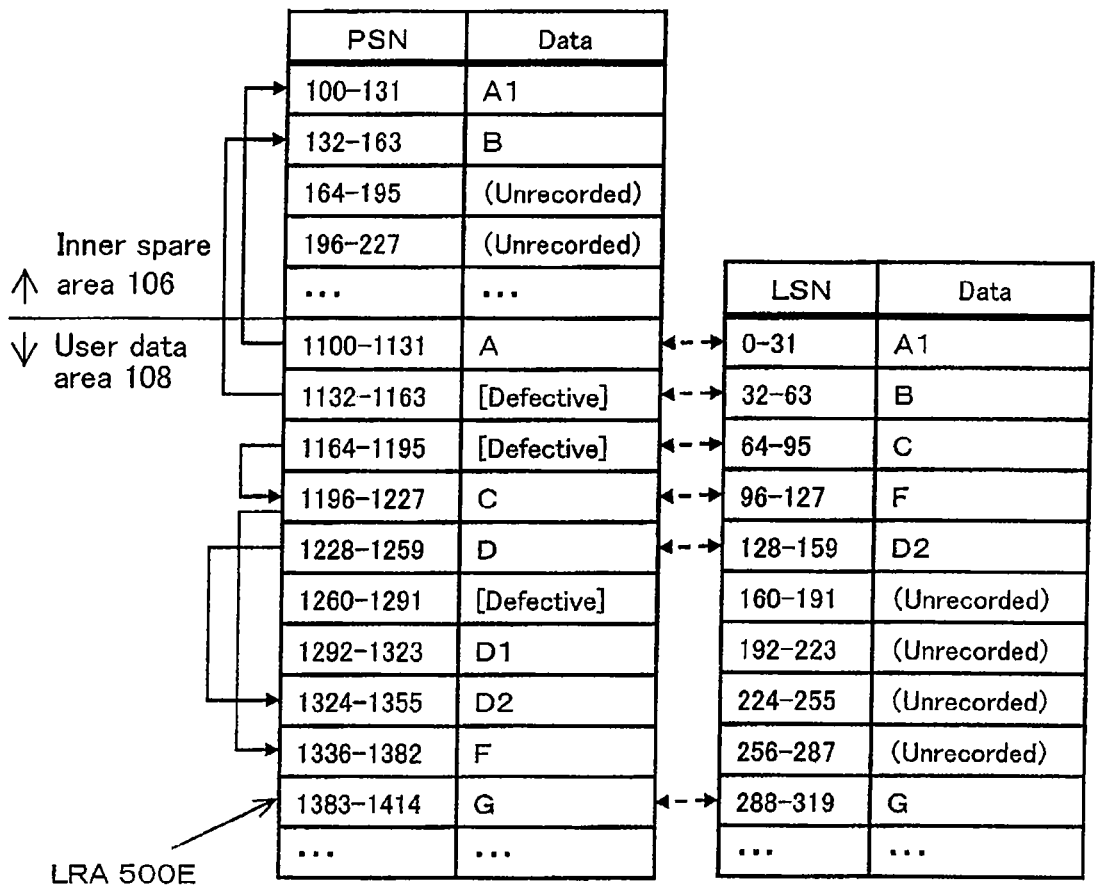
FIG. 17A is an illustrative diagram showing a replacement recording according to an embodiment of the present invention.
FIG. 17B is an illustrative diagram showing a replacement management information according to an embodiment of the present invention.

FIGS. 17A and 17B show a state after the recording of data "G" is completed.

3-2. Procedure of Reproduction Process (1)

In FIG. 14A, the logical cluster at the location of LSN=224 is an unrecorded logical cluster.

The physical cluster corresponding to the unrecorded logical cluster at the location of LSN=243 is a physical cluster at the location of PSN=1324. The relationship between the LSNs and the PSNs are predetermined in accordance with the primary logical address-physical address mapping.

The physical cluster at the location of PSN=1324 is related to the physical cluster at the location of PSN=1228 by the replacement management information 514.

The physical cluster at the location of PSN=1228 is mapped to the logical cluster at the location of LSN=128 in accordance with the primary logical address-physical address mapping.

Thus, the physical cluster at the location of PSN=1228 is assigned to the logical cluster at the location of LSN=128 and the unrecorded logical cluster at the location of LSN=224.

The procedure of the reproduction process will be described in a case where two logical clusters are assigned to one physical cluster.

The host apparatus 305 outputs a reproduction instruction for the location of LSN=128 to the drive apparatus 310. Upon the receipt of the reproduction instruction, the drive apparatus 310 translates the LSN into the PSN in accordance with the primary logical address-physical address mapping. The PSN is referred to as a reproduction PSN.

In this case, the reproduction PSN is PSN=1228. Replacement management information having the location of PSN=1228 as the replacement location is retrieved in the replacement management information list. As a result, the replacement management information 514A is found.

The replacement cluster indicated by the replacement management information 514A is a physical cluster at the location of PSN=1324. The data recorded in the physical cluster at the location of PSN=1324 is reproduced.

The host apparatus 305 outputs a reproduction instruction for the location of LSN=224 to the drive apparatus 310. Upon the receipt of the reproduction instruction, the drive apparatus 310 translates the LSN into the reproduction PSN in accordance with the primary logical address-physical address mapping.

In this case, the reproduction PSN is PSN=1324. Replacement management information having the location of PSN=1324 as the replacement location is retrieved in the replacement management information list. However, such replacement management information is not found.

The drive apparatus 310 reproduces data recorded in the physical cluster at the location of PSN=1324.

According to the reproduction process described above, when the host apparatus 305 outputs a reproduction instruction for the location of an unrecorded logical sector in which any data has not been logically recorded, it is possible to reproduce data recorded in the physical sector corresponding to the unrecorded logical sector.

As a result, it is seen from the file system and the like at the side of the host apparatus 305 that there is no exceptional area on the information recording medium 100. Further, it is not necessary to implement a complex error process in the system structure. It is possible to configure the system with a simplified implementation.

Upon the receipt of a reproduction instruction for an unrecorded logical sector, if the drive apparatus 310 reproduces data recorded in the physical cluster corresponding to the unrecorded logical sector, then the data which should not be essentially reproduced is reproduced. If such a reproduction is inconvenient for the system configuration, it is possible to adopt the following procedure for the reproduction process.

The drive apparatus 310 translates the LSN specified by the reproduction instruction into a PSN in accordance with the primary logical address-physical address mapping, and retrieves the replacement management information 1010B having the original location information 1012 corresponding to the translated PSN in the replacement management information list 1000.

If the replacement management information 1010B having the original location information 1012 corresponding to the translated PSN is found, the data is reproduced from the ECC cluster at the replacement location indicated by the replacement location information 1013 of the replacement management information 1010B in a similar manner as the other embodiments described above.

If it is not found, the drive apparatus 310 retrieves the replacement management information 1010B having the replacement location information 1013 corresponding to the translated PSN in the replacement management information list 1000.

If the replacement management information 1010B having the replacement location information 1013 corresponding to the translated PSN is found, the ECC cluster indicated by the replacement location information 1013 is determined as the replacement cluster in which the data has been already recorded.

Then, the drive apparatus 310 does not reproduce the data from the replacement cluster. Instead, the drive apparatus 310 returns a predetermined data (e.g. data having a value of "00 . . . 0") as the reproduced data back to the host apparatus 305.

According to the reproduction process described above, when it is instructed to reproduce data from the unrecorded logical sector, the data can be reproduced appropriately from the physical sector corresponding to the unrecorded logical sector.

Such a reproduction process can be performed when the drive apparatus 310 receives the reproduction instruction from the host apparatus 305 in each step of the reproduction process described with reference to FIG. 10.

3-3. Comparison Between Procedures of NWA Determining Process

Unlike the embodiment described above, a method for determining a logical NWA will be described. In this method, any unrecorded logical sector does not occur.

In this method, the logical LRA is managed, and a new data is recorded at the logical NWA which is adjacent to the logical LRA.

The LSN indicating the logical NWA is translated into a PSN in accordance with the primary logical address-physical address mapping. The translated PSN is referred to as "PSN-1".

The data is actually recorded at the NWA within an ECC cluster which is next to the ECC cluster including the PSN indicated by the LRA 213. The PSN indicated by the NWA is referred to as "PSN-2".

The replacement recording is performed with the original location of PSN-1 and the replacement location of PSN-2.

Figure 25:
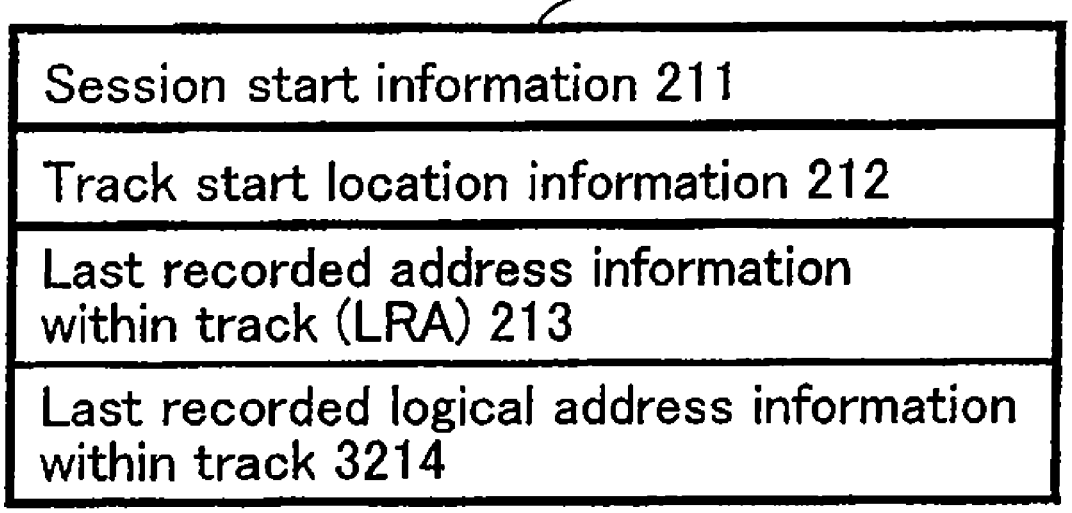
FIG. 25 is an illustrative diagram showing an exemplary data structure of the track management information according to an embodiment of the present invention.

FIG. 25 shows a data structure of the track management information 3210 according to the present embodiment. The track management information 3210 is used to manage the logical NWA.

In the track management information 3210 shown in FIG. 25, last recorded logical address information within track 3214 is newly defined.

The last recorded logical address information within track 3214 is used to manage the last recorded address represented by LSN in the logical address space, whereas the last recorded address information within track (LRA) 213 is used to manage the last recorded address represented by PSN in the physical address space.

The drive apparatus 310 can determine the logical NWA for each track by referring to the last recorded logical address information within track 3214.

The last recorded logical address information within track 3214 is updated in the following manner.

The value of "0" is set to the last recorded logical address information within track 3214 as an initial value. The drive apparatus 310 receives a recording instruction including a LSN. When the LSN in the recording instruction is greater than the last recorded logical address information within track 3214, the drive apparatus 310 updates the last recorded logical address information within track 3214 to the LSN.

According to the update process described above, it is possible to maintain the last recorded logical address information within track 3214 as being a maximum value.

FIG. 26A shows a data structure after the recording of data "A", "B", "C", "D", "F" and "G" are completed in the same order as in FIGS. 13A, 14A and 17A in accordance with the procedure of NWA determining process described above.

In FIG. 26B, all of defective clusters are registered as the replacement management information (7). However, it is possible to delete these replacement management information (7) from the replacement management information list 1000F. By deleting these, the size of the replacement management information list 1000F can be reduced.

By comparing the replacement management information list 1000E shown in FIG. 17B with the replacement management information list 1000F shown in FIG. 26B, it is understood that the number of the replacement management information in the replacement management information list 1000E is smaller than the number of the replacement management information in the replacement management information list 1000F.

By comparing these lists after deleting replacement management information (7), it is also understood that the number of the replacement management information in the replacement management information list 1000E is much smaller than the number of the replacement management information in the replacement management information list 1000F.

Accordingly, the method for determining NWA while allowing the occurrence of the unrecorded logical sector as described in embodiment 1 and embodiment 2 is more desirable rather than the method which refers to FIG. 26A while not allowing the occurrence of the unrecorded logical sector in that the size of replacement management information list can be reduced.

By maintaining the replacement management information (7) in the replacement management information list 1000F, it is possible to recognize the distribution of the defective clusters on the information recording medium 100. The distribution of the defective clusters can be used to optimize the reproduction process. Such an optimization is made, for example, by reading data in advance without reading data from the defective sectors.

Embodiment 4

The procedure of the data recording according to the present embodiment will be described.

Figure 27:
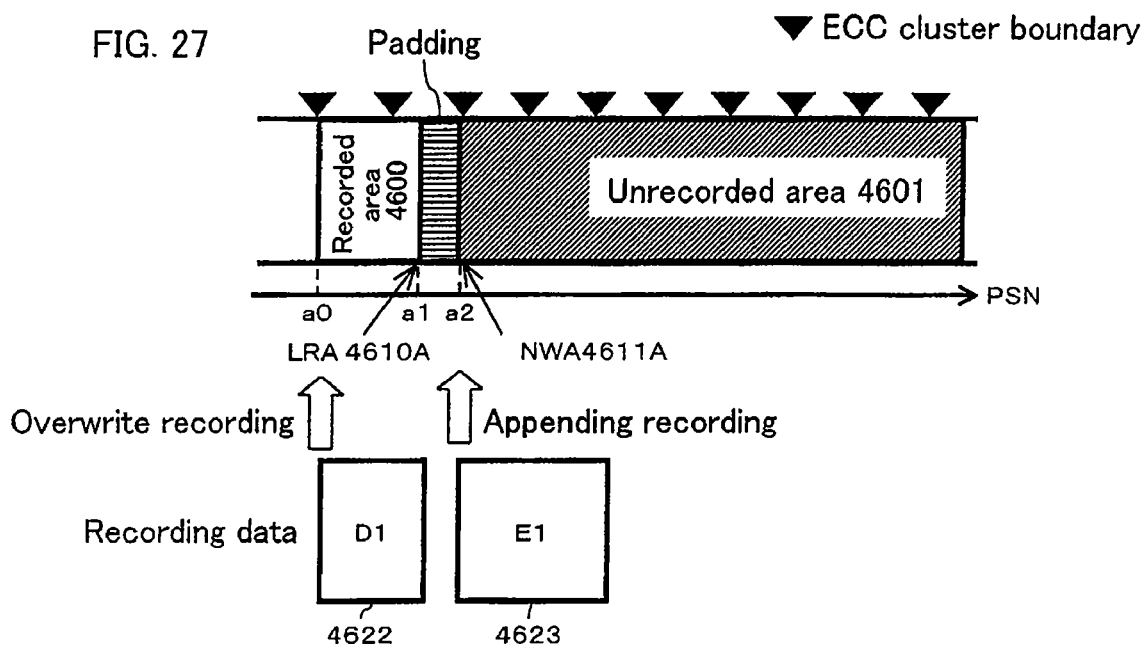
FIG. 27 is an illustrative diagram showing a replacement recording according to an embodiment of the present invention.

FIG. 27 shows an exemplary data structure of the information recording medium 100 before performing the data recording according to the present embodiment. In FIG. 27, each symbol of triangle indicates a boarder between the ECC clusters. Hereinafter, even in other figures, each symbol of triangle has the same meaning.

In the state shown in FIG. 27, it is assumed that the host apparatus 305 outputs a recording instruction for data "D1" 4622 and data "E1" 4623 to the drive apparatus 310. In this case, the procedure of the recording process will be described.

The data recording for data "D1" 4622 is determined as the pseudo-overwrite recording at the location of PSN=a0 in the recorded area 4600, for example.

Prior to outputting the recording instruction, the host apparatus 305 outputs a request for the logical NWA to the drive apparatus 310.

Upon the receipt of the request for the logical NWA, the drive apparatus 310 determines NWA 4611A from LRA 4610A and returns the logical NWA corresponding to the NWA 4611A back to the host apparatus 305.

The host apparatus 305 outputs a recording instruction for recording data "D1" 4622 at the location of LSN=A0 corresponding to PSN=a0 to the drive apparatus 310, and then outputs a recording instruction for recording data "E1" 4623 at the location of LSN=A2 corresponding to NWA 4611A (PSN=a2) to the drive apparatus 310.

Figure 28:
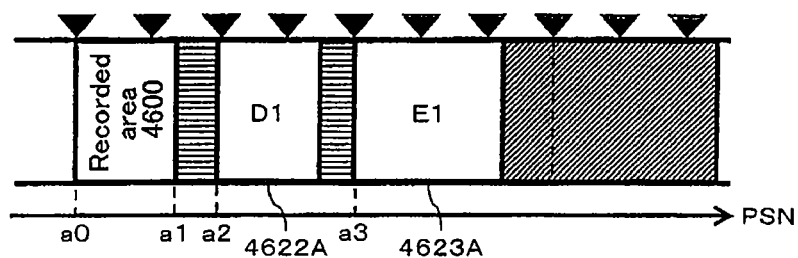
FIG. 28 is an illustrative diagram showing a replacement recording according to an embodiment of the present invention.

FIG. 28 shows a recording result after the drive apparatus 310 performs a recording process for data "D1" 4622 and a recording process for data "E1" 4623 in accordance with the order of the recording instructions as instructed by the host apparatus 305.

In this case, the data recording for data "D1" 4622 is determined as the pseudo-overwrite recording for the recorded area 4600. As a result, data "D1" 4622 is recorded at the location of NWA 4611A (PSN=a2) instead of the location of PSN=a0. Then, the NWA 4611A is updated to the NWA 4611B (PSN=a3).

As a result of this replacement recording, data "D1" 4622 is recorded at the location of PSN=a2. As a result, data "E1" 4623 is recorded at the location of NWA 4611B (PSN=a3) instead of the location of PSN=a2.

Thus, although the host apparatus 305 outputs a recording instruction for recording data "E1" 4623 at the location of LSN=A2 corresponding to NWA 4611A (PSN=a2) as described above, data "E1" 4623 is recorded at the location of PSN=a3 which is deferent from the location as instructed.

In this case, the replacement management information 1010 for data "D1" 4622 is generated, and the replacement management information 1010 for data "E1" 4623 is also generated. This causes a problem that the size of the replacement management information list 1000 is increased.

This problem is caused by the drive apparatus 310 performing the replacement recording which is not expected by the host apparatus 305.

After performing the replacement recording by the drive apparatus 310, it is necessary to perform further replacement recording as the host apparatus 305 outputs a recording instruction. This results in increasing the size of the replacement management information list 1000.

Hereinafter, a method according to the present embodiment will be described. In this method, the replacement management information 1010 for data "E1" 4623 is not generated during the recording process.

In the present embodiment, in the state shown in FIG. 27, the host apparatus 305 first outputs a recording instruction for the appending recording. Then, the host apparatus 305 outputs a recording instruction for the pseudo-overwrite recording after outputting the recording instruction for the appending recording.

Figure 29:
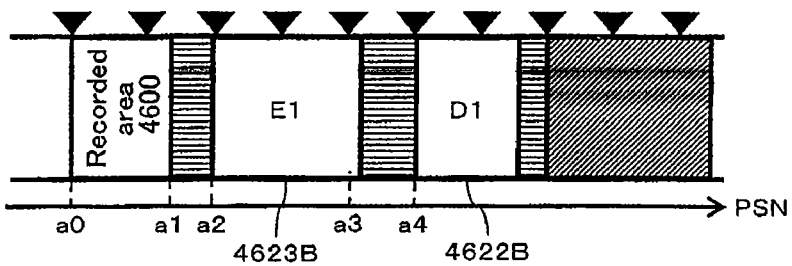
FIG. 29 is an illustrative diagram showing a replacement recording according to an embodiment of the present invention.

FIG. 29 shows a recording result after the drive apparatus 310 performs recording processes in accordance with the order of the recording instructions as instructed by the host apparatus 305.

The file system operating on the host apparatus 305 can determine the order of the recording instructions, since it manages updating all existing files and creating new files.

In FIG. 29, data "E1" 4623B is recorded at the location of NWA 4611A (PSN=a2), and data "D1" 4622B is recorded at the location of PSN=a4.

The host apparatus 305 outputs a recording instruction for recording data "E1" 4623B at the location of NWA 4611A (PSN=a2) as described above. In the present embodiment, data "E1" 4623B is recorded at the location of PSN=a2 which is the same as the location as instructed. This data recording is not a replacement recording.

Thus, the replacement management information 1010 for data "E1" 4623B is not generated. As a result, it is possible to avoid increasing the size of the replacement management information list 1000.

In either case shown in FIG. 28 or the case shown in FIG. 29, the same number of the replacement management information 1010 is required in order to record data "D1" 4622. Although the recording location (i.e. replacement location) of data "D1" 4622 are different from each other in FIGS. 28 and 29, the required number of the replacement management information 1010 is maintained.

As described above, when the host apparatus 305 instructs the drive apparatus 310 to perform both of the pseudo-overwrite recording and the appending recording, the host apparatus 305 outputs a recording instruction for the appending recording to the drive apparatus 310 prior to outputting a recording instruction for the pseudo-overwrite recording to the drive apparatus 310. This makes it possible to avoid generating the replacement management information 1010, thereby reducing the size of the replacement management information list 1000.

Embodiment 5

Herein, it is assumed the host apparatus 305 divides data having a size into a plurality of portions, such that each of the plurality of portions has a size of one ECC cluster. It is also assumed that the host apparatus 305 sequentially outputs a recording instruction for each portion of the data as a recording unit to the drive apparatus 310.

The drive apparatus 310 records the respective portions of the data contiguously. It is assumed that a defective cluster including the recording location is detected, and a cluster which is adjacent to the defective cluster is used as a replacement cluster in order to replace the defective cluster with the replacement cluster.

In this case, the replacement recording is required for each recording unit after the recording location. In the replacement recording, each cluster is replaced by an adjacent cluster which is located in a direction along which the PSNs increase.

In this case, the replacement management information is required for each recording unit. Accordingly, when the size of data to be recorded is very large, the large number of replacement management information is required, thereby increasing the size of the replacement management information list 1000.

Hereinafter, a method according to the present embodiment will be described with reference to FIG. 30. This method is effective to reduce the size of the replacement management information list 1000.

Figure 30:
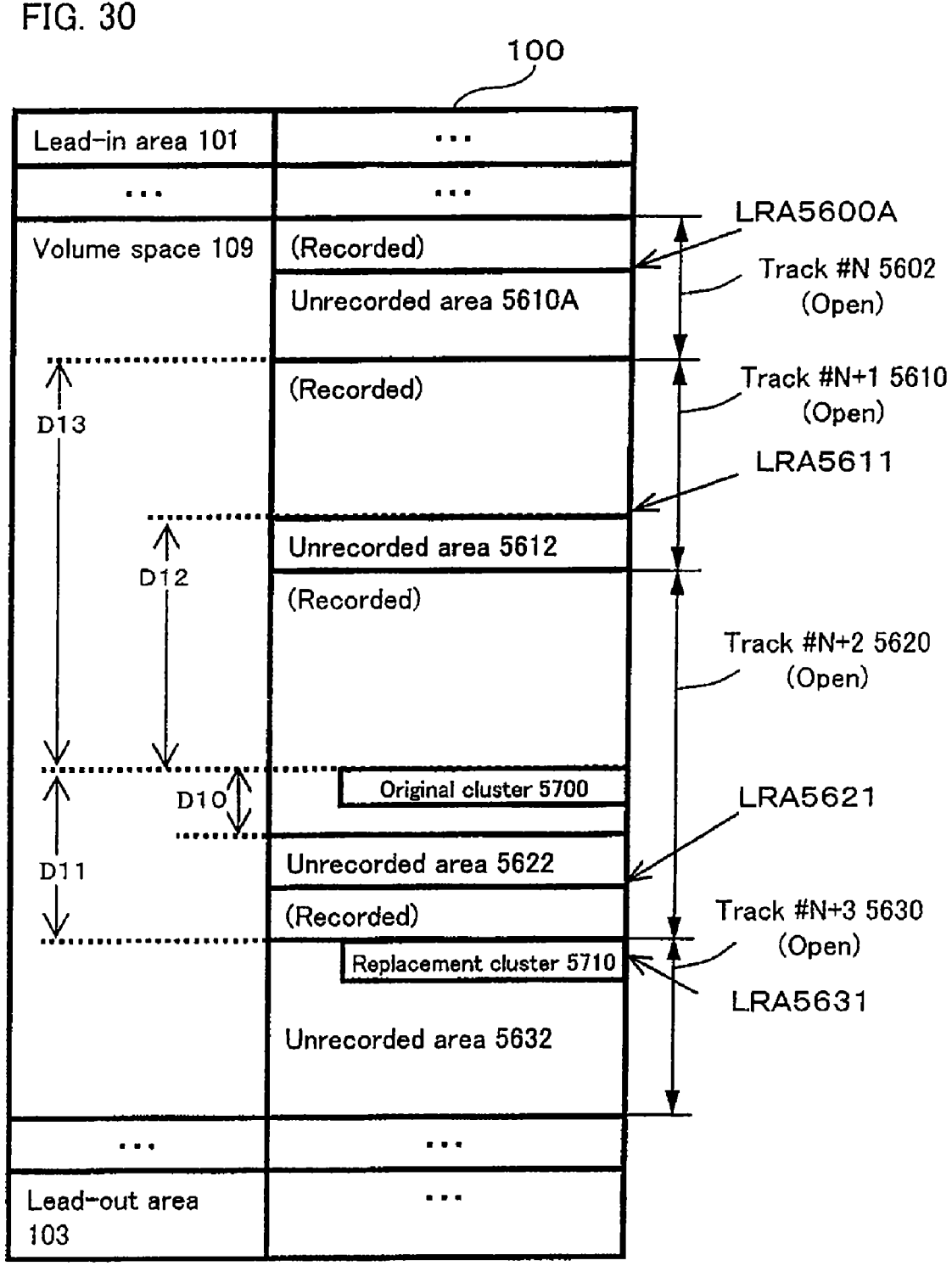
FIG. 30 is an illustrative diagram showing a replacement recording according to an embodiment of the present invention.
Figure 31:
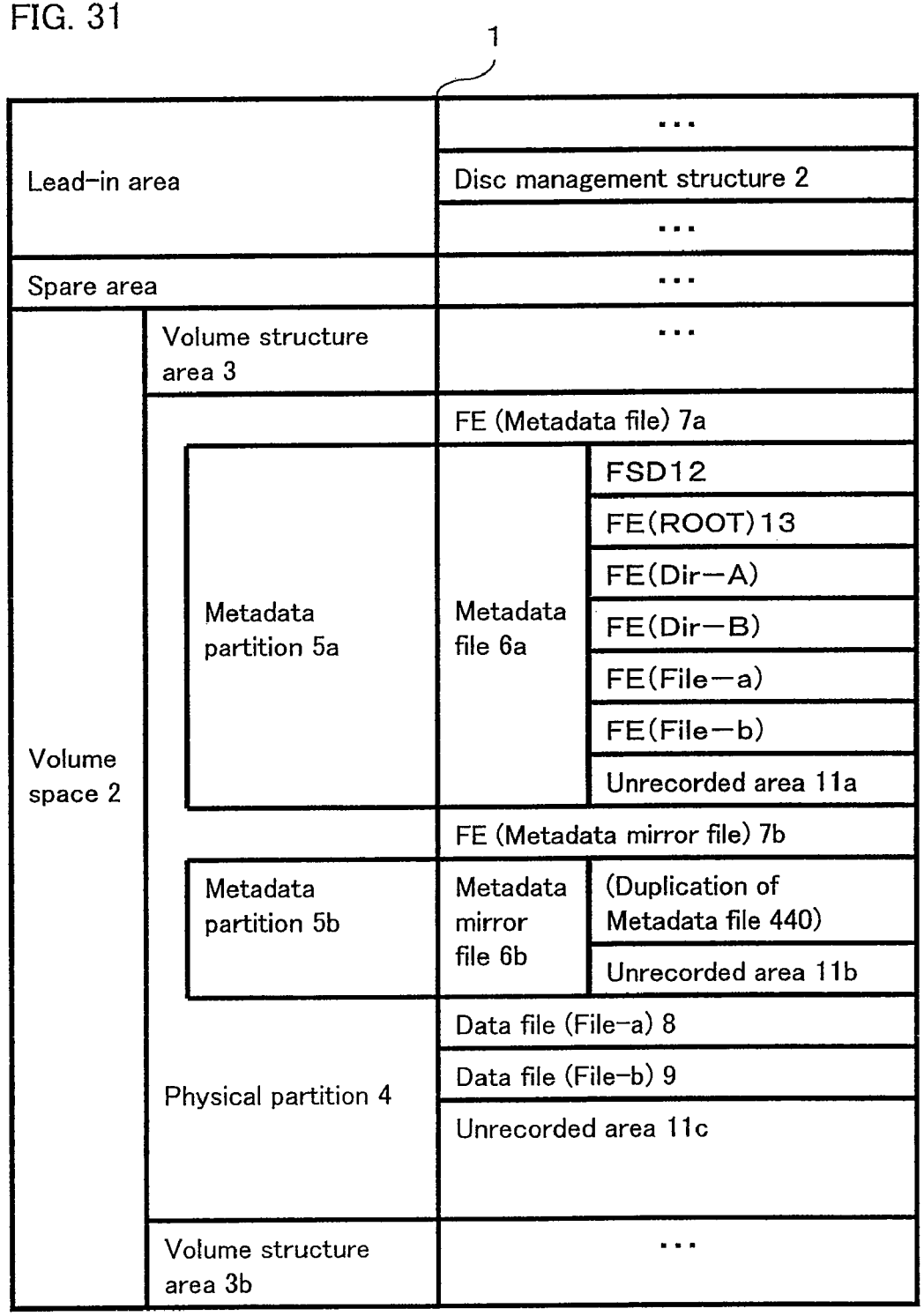
FIG. 31 is an illustrative diagram showing an exemplary data structure of the information recording medium according to the conventional technique.
Figure 32:
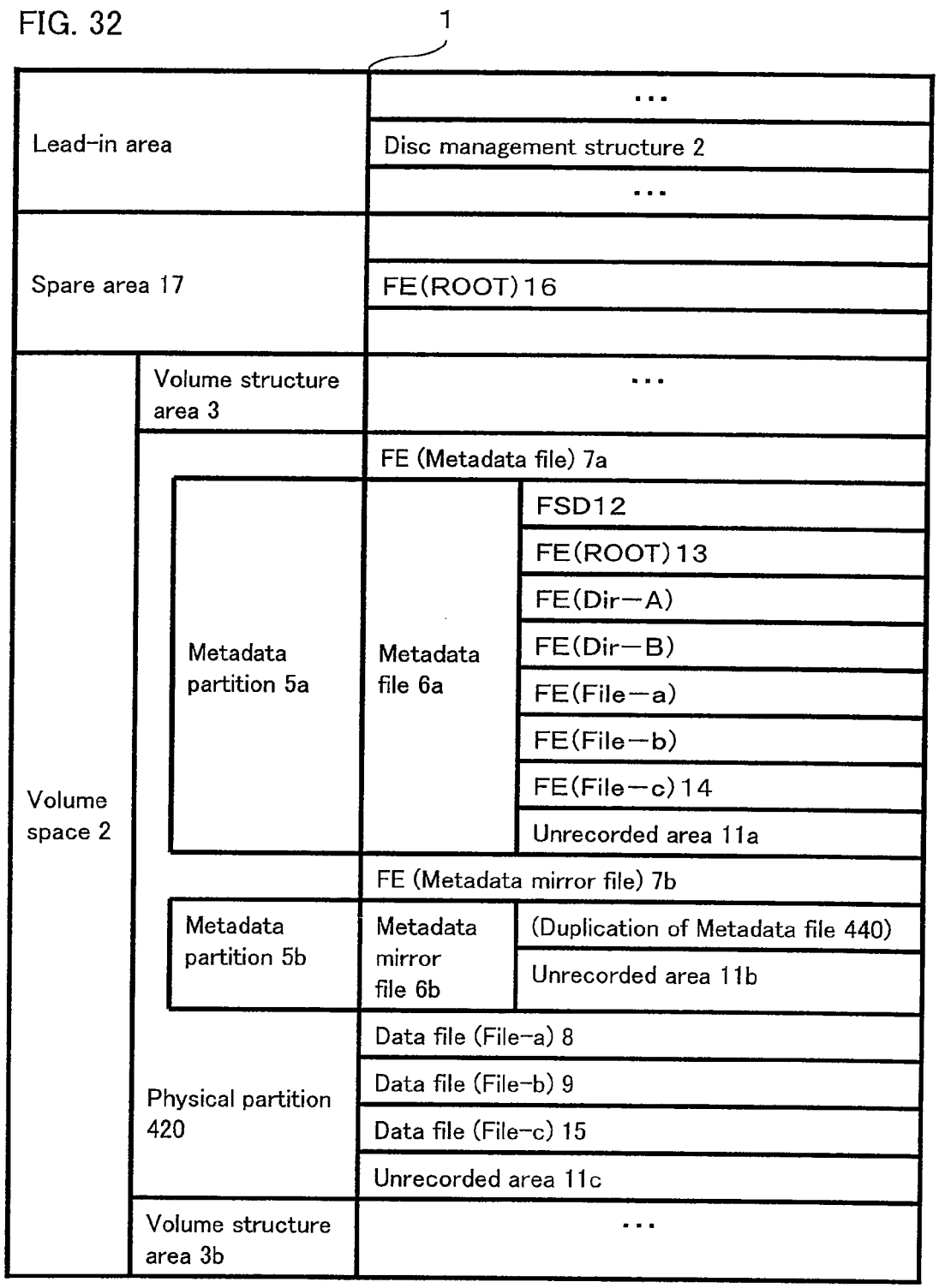
FIG. 32 is an illustrative diagram showing an exemplary data structure of the information recording medium after the file recording process according to the conventional technique.

In FIG. 30, a replacement recording is performed in accordance with the recording instruction from the host apparatus 305. In the replacement recording, it is assumed that the original location is original cluster 5700.

The replacement location of the replacement recording is determined in the following manner.

In FIG. 30, the replacement cluster may be allocated in one of the unrecorded area 5601A (in track #N 5602), the unrecorded area 5612 (in track #N+1 5610), the unrecorded area 5622 (in track #N+2 5620) and the unrecorded area 5632 (in track #N+3 5630). Each of these unrecorded areas is a candidate area for the replacement cluster.

Herein, a distance between the location of the original cluster 5700 (e.g. the location of the first physical sector in the original cluster 5700) and the location of the candidate area for the replacement cluster (e.g. the location of the NWA in the open track) is evaluated. The respective distances with respect to the respective candidate areas for the replacement cluster are D13, D12, D10 and D11, as shown in FIG. 30.

It is assumed that the respective distances satisfy the relationship of D13>D12>D11>D10.

By selecting the unrecorded area 5622 which has a minimum distance D10 as an area for the replacement cluster, it is possible to minimize a distance between the original cluster and the replacement cluster. As a result, it is possible to minimize an access time in the data reproduction.

However, the unrecorded area 5622 is included in the same track #N+2 5620 as the original cluster 5700. Accordingly, when the unrecorded area 5622 is selected as an area for the replacement cluster, it may cause a problem that the size of the replacement management information list 1000 is increased in the case where the drive apparatus 310 sequentially receives a plurality of recording instructions from the host apparatus 305 as described above.

According to the present embodiment, an unrecorded area which has a minimum distance from the original cluster is selected as an area for the replacement cluster. However, during the selection process, an unrecorded area included in the same track as the original cluster is excluded from the selection.

In FIG. 30, the unrecorded area 5622 which has a minimum distance D10 is excluded from the selection. The unrecorded area 5632 which has the next minimum distance D11 is selected as an area for the replacement cluster.

Thus, upon receipt of the recording instruction for the original cluster 5700 from the host apparatus 305, the drive apparatus 310 allocates the replacement cluster 5710 at the location of NWA in the unrecorded area 5632 and records data in the replacement cluster 5710.

The drive apparatus 310 generates the replacement management information which maps the original cluster 5700 to the replacement cluster 5710 and records the replacement management information.

As described in steps S107 and S112 (FIG. 8A), when the drive control section 311 according to the present invention performs the pseudo-overwrite recording, it controls the recording/reproduction section 314 to record data at a specific location in the user data area 108, which is other than the location indicated by the physical address corresponding to the logical address included in the received recording instruction.

In the present embodiment, the specific location is the NWA within an open track which is different from the track determined in step S104 (FIG. 8A).

Further, the NWA within the open track indicates a location which is the closest to the location indicated by the physical address corresponding to the logical address included in the recording instruction.

According to the procedure of the recording process, even if the host apparatus 305 further outputs a recording instruction to the drive apparatus 310, the data recording for the unrecorded area 5622 does not cause any replacement recording. The addition of the replacement management information is not required.

A distance between the original location and the replacement location becomes minimum, except for a case where the original location and the replacement location are included in the same track. As a result, it is possible to reduce an access time in the data reproduction.

The drive apparatus 310 may determine the location of the replacement cluster by evaluating a distance between the original cluster and an unrecorded area which has PSNs greater than the PSNs of the original cluster. In the write-once recording mediums, a sequential recording is performed in a direction along which the PSNs increase. Accordingly, it is possible to efficiently access data by replacing the original cluster with the replacement cluster which has PSNs greater than the PSNs of the original cluster.

In this case, if there is no remaining unrecorded area which has PSNs greater than the PSNs of the original cluster, then the drive apparatus 310 may determine the location of the replacement cluster by evaluating a distance between the original cluster and an unrecorded area which has PSNs smaller than the PSNs of the original cluster.

When there are a plurality of unrecorded areas which have the same distance from the original cluster, it is desirable to select one of the plurality of unrecorded areas, which has PSNs greater than the PSNs of the original cluster. In the write-once recording mediums, a sequential recording is performed in a direction along which the PSNs increase. Accordingly, it is possible to efficiently access data by replacing the original cluster with the replacement cluster which has PSNs greater than the PSNs of the original cluster.

The distance between the original location and the replacement location may be determined from a difference between a PSN indicating the original location and a PSN indicating the replacement location. Alternatively, the distance may be determined from a physical distance between the original location and the replacement location. This is because the difference between the PSNs does not necessarily correspond to the physical distance, since the PSNs increase from the inner side to the outer side in a spiral manner in the information recording medium 100. For example, with respect to ECC clusters which are adjacent to each other in a radius direction, even if the physical distance is close to zero, the difference between the PSNs does not become minimum.

Embodiment 6

In the present embodiment of the invention, a procedure of data-recording process will be further described.

5-1. Data Structure

The description has been already made regarding a case in which a user data area 102 of an information recording medium 100 according to the present invention is divided into physical sectors which are a minimum access unit, and a data recording/reproduction is performed for each ECC cluster including a plurality of physical sectors, wherein an ECC cluster is a minimum unit for the data recording/reproduction.

Each ECC cluster and physical sector includes address information, various control information and attribute information (user control data) in addition to user data.

Some of these information may be set in a unit of physical sector and others may be set in a unit of ECC cluster.

The user data and the user control data are interleaved or scrambled in a unit of ECC cluster in order to improve the reliability of data to be recorded and they are then recorded on the information recording medium 100.

In the present embodiment, several attribute information included in an ECC cluster will be described.

Figure 34:
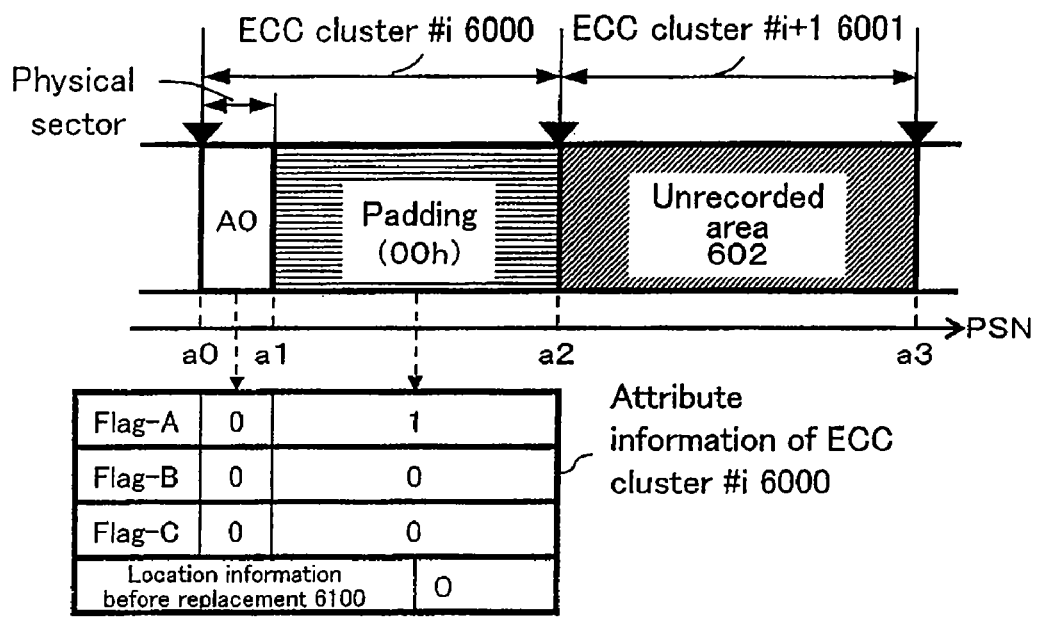
FIG. 34 is an illustrative diagram showing a replacement recording according to an embodiment of the present invention.

As shown in FIG. 34, attribute information such as Flag-A, Flag-B and Flag-C is set in each physical sector included in an ECC cluster according to the present invention.

Flag-A is a padding flag and indicates whether data recorded in a physical sector is valid data given from a host apparatus 305 (Flag-A=0) or padding data (e.g. dummy data only including 0) recorded by a drive apparatus 310 in order to fill up to a boundary of the ECC cluster (Flag-A=1). The padding data is an example of invalid data.

When the size of data which is instructed by the host apparatus 305 for recording is not a multiple integral of the size of one ECC cluster, the drive apparatus 310 inserts the padding data such that the size of data to be recorded matches the boundary of the ECC cluster.

Flag-B is a validity flag and indicates whether the data recorded in a physical cluster is valid data (Flag-B=0) or invalid data (Flag-B=1).

Normally, a physical cluster which does not include padding data includes valid data and thus Flag-B=0. However, for example, when an RMW process is performed, there are cases in which Flag-B=1.

In other words, in the RMW process for a replacement recording, a certain physical sector may not be reproduced.

When there is such a physical sector which can not be reproduced, there is no data to be recorded for its corresponding replacement physical sector.

As described with reference to FIG. 8B, in the RMW process, it is necessary to write data back again after the data is reproduced from a physical sector. Accordingly, in step S153 shown in FIG. 8B, if a reproduction from a certain physical sector fails, it is impossible to write data back, which results in a recording error.

In the present embodiment, a drive control section 311 of the drive apparatus 310 records invalid data (e.g. dummy data only including 00h) in a replacement physical sector where there is no data to be recorded.

The drive control section 311 sets Flag-B=1 in the physical sector where the dummy data has been recorded. Flag-B=1 indicates that valid data is not recorded.

Owing to such a procedure of the data-recording process, it is possible to avoid an occurrence of error in the RMW process.

Flag-C is an update flag and is set for each physical sector in a replacement cluster.

When the data included in each physical sector in a replacement cluster has been changed from the data included in an original cluster, Flag-C=0 is set to indicate that an update has been made. On the other hand, when the data in the original cluster is recorded without any change, Flag-C=1 is then set to indicate that an update has not been made.

Further, each ECC cluster according to the present embodiment has location information before replacement as one of its attribute information. A procedure of setting the location information before replacement will be described later in detail.

In the present embodiment, flag information is further added to status information 1011 which has been described with reference to FIG. 11.

Herein, in replacement management information 1010C shown in FIG. 35, Flag4 is set so as to determine a type of data, which is included in an ECC cluster indicated by original location information 1012.

The type of data herein is information which is determined by the relationship between data included in the cluster indicated by the original location information 1012 and data included in the cluster indicated by the replacement location information 1013.

Specifically, a first data type corresponds to a case in which the original location information 1012 indicates a defective cluster. The value of Flag4 in this case is, for example, "00".

A second data type corresponds to a case in which data included in the cluster indicated by the original location information 1012 is updated and the updated data is then recorded in the cluster indicated by the replacement location information 1013 by pseudo-overwriting. The value of Flag4 in this case is, for example, "01".

A third data type corresponds to a case in which data is recorded in the cluster indicated by the replacement location information 1013 by pseudo-overwriting irrespective of data included in the cluster indicated by the original location information 1012. The value of Flag4 in this case is, for example, "10".

For example, using the embodiments described above, replacement management information 512 shown in FIG. 13B corresponds to Flag4=00. Replacement management information 514A shown in FIG. 14B and replacement management information 6200 shown in FIG. 39B correspond to Flag4=01, respectively. Replacement management information 518 shown in FIG. 17B corresponds to Flag4=10.

As in the case of the replacement management information 6200, when information similar to Flag4 is included in DFL entry 2010 shown in FIG. 18 described above, this information can be included in status 2 2011B, for example. For example, when the value of status 2 2011 B is "1000", this corresponds to Flag4=01.

This Flag4 is set at the time of recording data. For example, in step S113 shown in FIG. 8A, information of Flag4 is set. Alternatively, status 2 2011B equivalent to Flag4 is set. A procedure of setting Flag4 will be described later in detail.

5-2. Procedure of Recording Process

A procedure of data-recording according to the present embodiment will be described with reference to FIGS. 36A, 36B and 36C. Herein, it is assumed that data is recorded on the information recording medium 100 by using an information recording/reproduction apparatus 300 shown in FIG. 6.

Figure 36A:
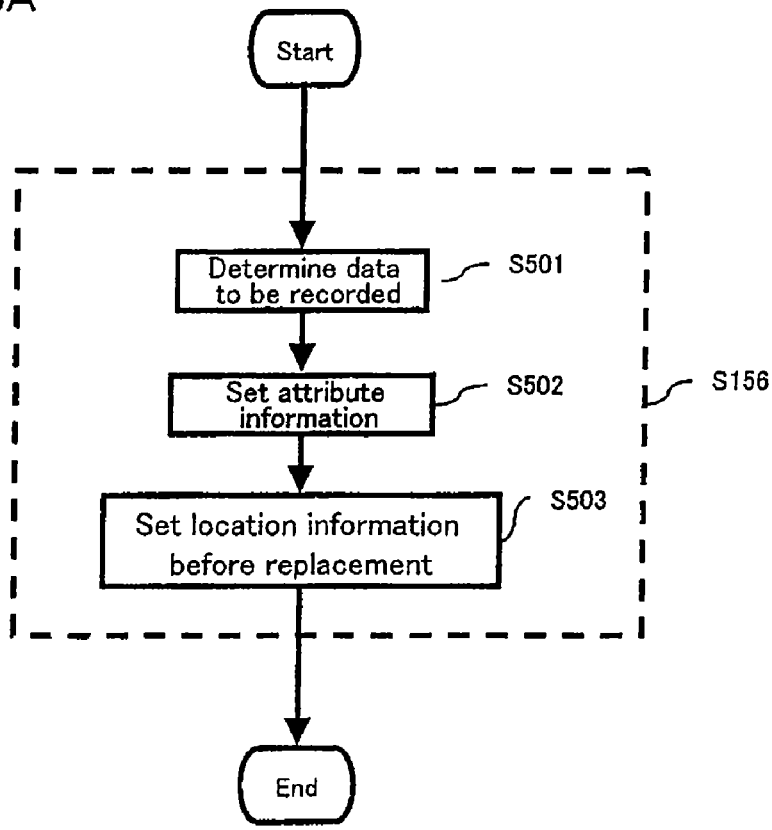
FIG. 36A is a flowchart showing a recording process according to an embodiment of the present invention.

FIG. 36A shows a detailed example of the process in step S156 shown in FIG. 8B. Each step shown in FIG. 36A is performed by the drive control section 311 of the drive apparatus 310.

Prior to step S156 shown in FIG. 8B, a read process is performed in step S153 or step S154 in FIG. 8B. Thereafter, in step S155, a modify process is performed.

If the reproduction is successfully performed in step S153 and step S154, the drive control section 311 holds the reproduced data in a memory circuit 312. When there is any physical sector, the reproduction of which has failed, in an original ECC cluster, the drive control section 311 inserts, in data held in the memory circuit 312, dummy data which is invalid data to be recorded in a physical sector in a replacement ECC sector corresponding to the physical sector, the reproduction of which has failed, in the original ECC cluster, in order to generate data to be recorded in the replacement ECC cluster.

Next, in step S155, the data to be recorded held in the memory circuit 312 is modified with data indicated by a recording instruction.

The generated result is held in the memory circuit 312 as data to be recorded.

Next, each step shown in FIG. 36A will be described in detail.

(Step S501) The drive control section 311 determines data to be recorded on the information recording medium 100.

(Step S502) The drive control section 311 sets attribute information for the data to be recorded held in the memory circuit 312.

In step S152 (FIG. 8B), when it is determined that the RMW process is required, the value of the attribute information, which is obtained as a result of reproduction in step S153 or step S154, is held as it is.

In step S153 and step S154, when there is any physical sector, the reproduction of which has failed, in the original ECC cluster, dummy data is inserted as data to be recorded in the replacement ECC cluster, wherein the dummy data is invalid data to be recorded in a physical sector in the replacement ECC sector corresponding to the physical sector, the reproduction of which has failed, in the original ECC cluster. In step S502, "1" is set in Flag-B, which corresponds to the physical sector where the invalid data is inserted.

In step S155 (FIG. 8B), Flag-C=0 is set for a physical sector which has been performed by the modify process in the RMW process.

(Step S503) The drive control section 311 sets location information before replacement for the data to be recorded held in the memory circuit 312.

In step S151 (FIG. 8B), when it is determined that an ECC cluster including a location specified by a recording instruction is not replaced yet (i.e. the data recording performed in accordance with the recording instruction is first-time pseudo-overwrite recording), information indicating an address of an original cluster is set in the location information before replacement. The address of the original cluster indicates a location specified by the recording instruction (e.g. address indicated by a value of the first PSN of an ECC cluster including the physical address, which has been translated from a logical address specified by the recording instruction in accordance with the primary logical address-physical address mapping).

In step S151 (FIG. 8B), when it is determined that an ECC cluster including a location specified by a recording instruction has been already replaced with a replacement ECC cluster (i.e. the data-recording performed in accordance with the recording instruction is a second time or more pseudo-overwrite recording), information indicating an address of an already replaced cluster is set in the location information before replacement in order to indicate the immediately previous replacement cluster.

The address of the immediately previous replacement cluster has been previously obtained, for example, from the replacement management information in step S151 (FIG. 8B).

In step S502 (FIG. 36A) described above, if there is any physical sector, in which Flag-B=1 is set, in a replacement cluster, status 2 2011B of replacement management information managing this replacement process is set as "1000" in step S113 in FIG. 8A.

Figure 36B:
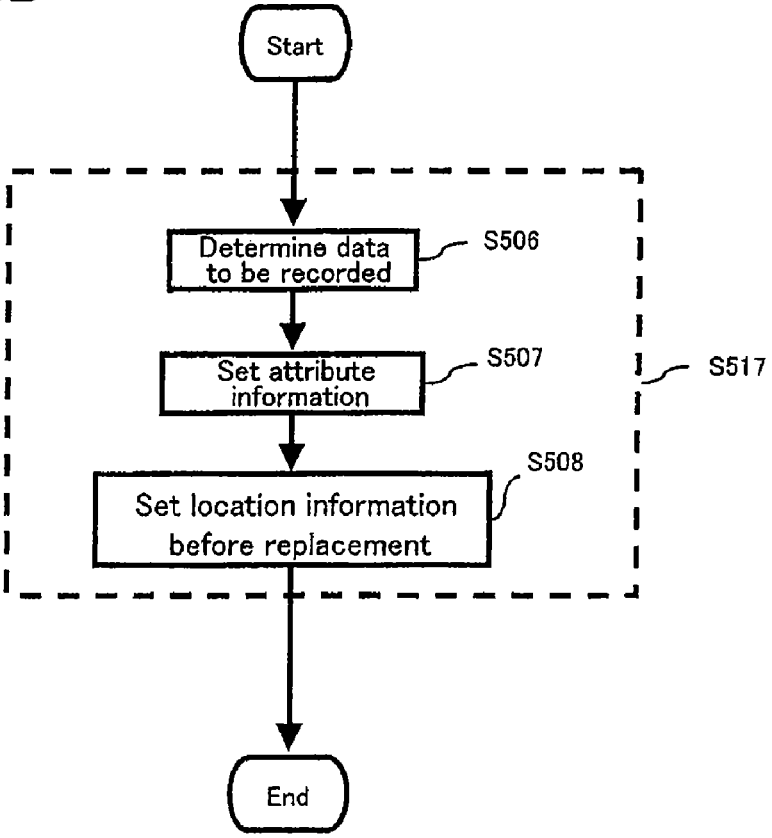
FIG. 36B is a flowchart showing a recording process according to an embodiment of the present invention.

FIG. 36B shows a detailed example of the process in step S157 shown in FIG. 8B. Each step shown in FIG. 36B is performed by the drive control section 311 of the drive apparatus 310.

(Step S506) The drive control section 311 determines the data specified by a recording instruction as the data to be recorded on the information recording medium 100.

(Step S507) The drive control section 311 sets attribute information for the data to be recorded held in the memory circuit 312.

A predetermined value is set to each flag included in the attribute information of an ECC cluster. For example, it is set that Flag-A=0, Flag-B=0 and Flag-C=0.

The generated result is held in the memory circuit 312 as data to be recorded.

(Step S508) The drive control section 311 sets location information before replacement for the data to be recorded held in the memory circuit 312. This step is the same as step S503 in FIG. 36A.

Figure 36C:
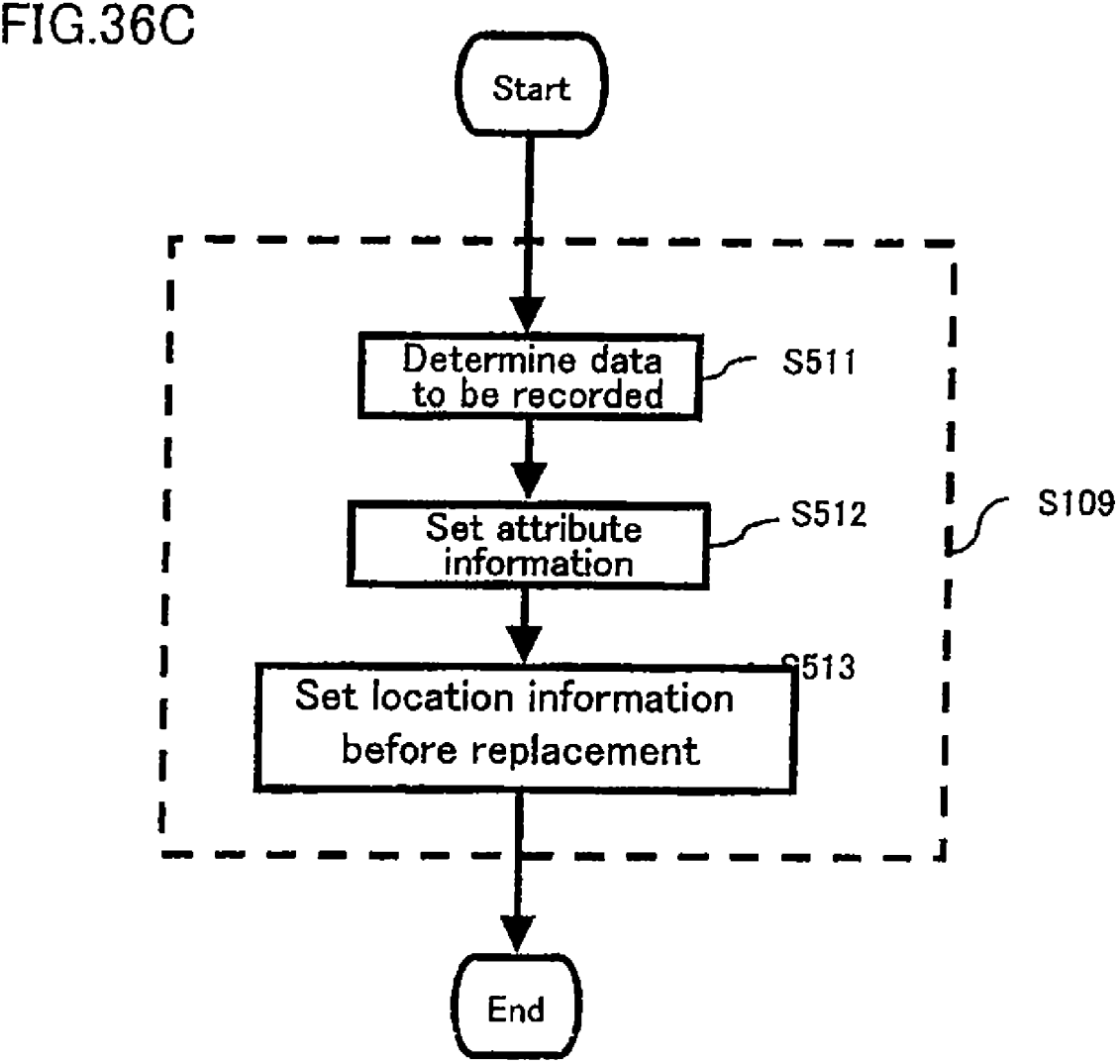
FIG. 36C is a flowchart showing a recording process according to an embodiment of the present invention.

FIG. 36C shows a detailed example of the process in step S109 shown in FIG. 8A. Each step shown in FIG. 36C is performed by the drive control section 311 of the drive apparatus 310.

(Step S511) The drive control section 311 determines data to be recorded. Specifically, the drive control section 311 determines the data specified by the recording instruction as data to be recorded.

Then, the drive control section 311 determines whether or not an end of the data specified by the recording instruction matches a boundary of the ECC clusters. If it does not match the boundary of the ECC clusters, padding data (e.g. data only including "00"h) is inserted such that the end of the data after insertion matches the boundary of the ECC clusters. In this case, the drive control section 311 determines the data after insertion as the data to be recorded.

(Step S512) The drive control section 311 sets attribute information for the data to be recorded held in the memory circuit 312.

An initial value is set to each flag included in the attribute information of an ECC cluster. For example, it is set that Flag-A=0, Flag-B=0 and Flag-C=1.

However, Flag-A=1 is set for the physical sector in which padding data is recorded in step S511.

The generated result is held in the memory circuit 312 as data to be recorded.

(Step S512) The drive control section 311 sets location information before replacement for the data to be recorded held in the memory circuit 312.

In the present step, information indicating that no replacement recording is performed is set in the location information before replacement.

For example, a value only including "0" is set.

5-3. Procedure of Reproduction Process

A procedure of data reproduction according to the present embodiment will be described with reference to FIG. 37. Herein, it is assumed that data is reproduced from the information recording medium 100 by using the information recording/reproduction apparatus 300 shown in FIG. 6.

Figure 37:
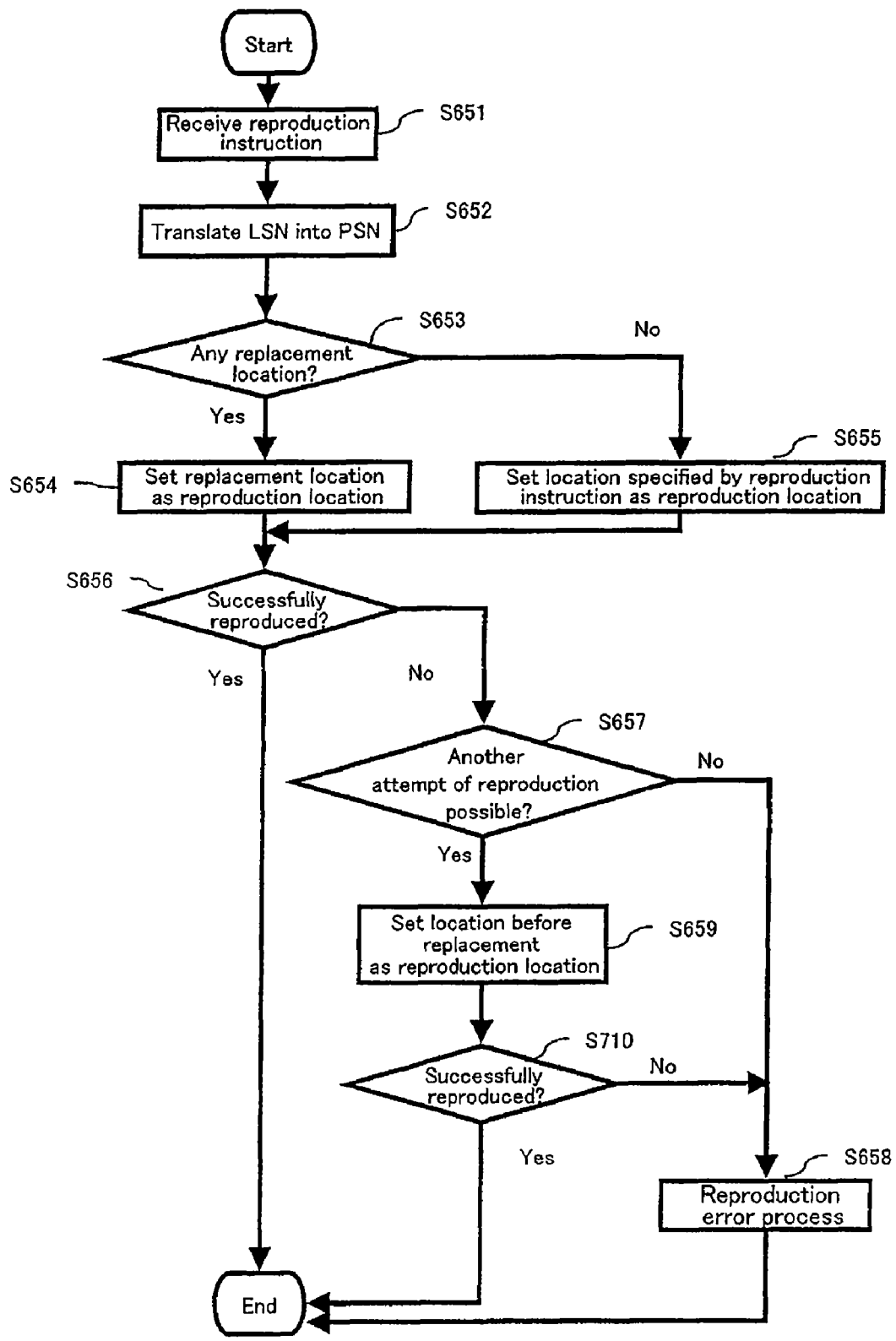
FIG. 37 is a flowchart showing a reproduction process according to an embodiment of the present invention.

Each step shown in FIG. 37 is performed by the drive control section 311 of the drive apparatus 310.

(Step S651) The drive control section 311 receives a reproduction instruction.

(Step S652) The drive control section 311 translates a logical address, which indicates a reproduction location included in the reproduction instruction, into a physical address in accordance with the primary logical address-physical address mapping.

(Step S653) The drive control section 311 retrieves replacement management information having, as an original location, the first PSN of an ECC cluster including the physical address which has been obtained in step S652.

When the corresponding replacement management information is found, then the process proceeds to step S654. When the corresponding replacement management information is not found, then the process proceeds to step S655.

(Step S654) The drive control section 311 sets a physical address indicated as a replacement location by the replacement management information found in step S653 as a reproduction location.

(Step S655) The drive control section 311 sets a physical address, which is obtained by translating the logical address specified by the reproduction instruction in accordance with the primary logical address-physical address mapping, as a reproduction location.

(Step S656) The drive control section 311 controls a recording/reproduction section 314 to reproduce data from the reproduction location set in the previous step.

The drive control section 311 determines by using an error detection/correction function whether the reproduction has been successfully performed.

When all the physical sectors have been successfully reproduced, the reproduction process is completed.

When there is any physical sector, the reproduction of which has failed, the process proceeds to step S657.

(Step S657) The drive control section 311 determines whether another attempt at the reproduction process can be performed for the physical sector, the reproduction of which has failed.

It is determined whether Flag-B=1 is set for the physical sector, the reproduction of which has failed.

When it is determined that Flag-B=1 is set, then the process proceeds to step S659. In this case, another attempt at the data reproduction is performed from a location indicated by the location information before replacement and thus it is possible to recover from a reproduction error.

Alternatively, when it is determined that there is a replacement location in step S653, it is determined whether or not Flag4 of the replacement management information is "01" (or status 2 2011B is "1000"). The decision using Flag4 is especially useful when the reproduction has failed in step S656 and Flag-B has not been able to be reproduced.

When it is determined that Flag4 is "01", the process proceeds to step S659.

Otherwise (including a case in which it is not determined that there is no replacement location in step S653), the process proceeds to step S658.

(Step S658) The drive control section 311 determines that a reproduction error has occurred. As a result, the reproduction process is completed.

(Step S659) The drive control section 311 sets the physical address indicated by the location information before replacement as a reproduction location.

(Step S660) The drive control section 311 controls the recording/reproduction section 314 to reproduce data from the reproduction location set in the previous step.

It is determined by using the error detection/correction function whether or not the reproduction has been successfully performed.

When the reproduction has been successfully performed, the reproduction process is completed. In this case, data which has been reproduced from a physical sector corresponding to the physical sector where Flag-B=1 is set in the replacement ECC cluster is output to the host apparatus 305.

When the reproduction has failed, the process proceeds to step S658.

Upon the receipt of a reproduction instruction for an unrecorded logical sector, if the drive apparatus 310 reproduces data recorded in the physical cluster corresponding to the unrecorded logical sector, then the data which should not be essentially reproduced is reproduced as described in step S656. If such a data reproduction is inconvenient, it is possible to adopt the following procedure for the reproduction process.

In other words, in reproducing data, the drive apparatus 310 translates the LSN specified by the reproduction instruction into a PSN in accordance with the primary logical address-physical address mapping, and retrieves the replacement management information 1010B having the original location information 1012 corresponding to the translated PSN in the replacement management information list 1000. When the corresponding original location information 1012 is not found, then data is reproduced from a physical sector having the translated PSN.

In this case, the location information before replacement is obtained from an ECC cluster which includes the reproduced physical cluster and it is then checked if a valid value is registered in the location information before replacement. When the valid value is registered in the location information before replacement, then it is recognized that the ECC cluster is an unrecorded logical cluster. Thus, the drive apparatus 310 does not return the data, which has been reproduced from the ECC cluster, back to the host apparatus 305. Instead, the drive apparatus 310 returns a predetermined value (e.g. value only having 0), as reproduced data, back to the host apparatus 305.

Instead of checking the location information before replacement, Flag-A may be checked. Flag-A corresponding to the reproduced physical sector is obtained and the value of Flag-A is then checked. In the case of Flag-A=1, it is recognized that the physical sector is an unrecorded logical sector. Thus, the drive apparatus 310 does not return the data, which has been reproduced from the physical sector, back to the host apparatus 305. Instead, the drive apparatus 310 returns a predetermined value (e.g. value only having 0), as reproduced data, back to the host apparatus 305.

Alternatively, Flag-B may be checked. In a similar manner, Flag-B corresponding to the reproduced physical sector is obtained and the value of Flag-B is then checked. In the case of Flag-B=1, it is recognized that the physical sector is an unrecorded logical sector. Thus, the drive apparatus 310 does not return the data, which has been reproduced from the physical sector, back to the host apparatus 305. Instead, the drive apparatus 310 returns a predetermined value (e.g. value only having 0), as reproduced data, back to the host apparatus 305.

Still alternatively, Flag-C may be checked. In a similar manner, Flag-C corresponding to the reproduced physical sector is obtained and the value of Flag-C is then checked. In the case of Flag-C=0, it is recognized that the physical sector is an unrecorded logical sector. Thus, the drive apparatus 310 does not return the data, which has been reproduced from the physical cluster, back to the host apparatus 305. Instead, the drive apparatus 310 returns a predetermined value (e.g. value only having 0), as reproduced data, back to the host apparatus 305.

According to the reproduction process described above, when it is instructed to reproduce data from the unrecorded logical sector, the data can be reproduced appropriately from the physical sector corresponding to the unrecorded logical sector.

5-4. Example of Recording and Reproduction Process

Hereinafter, an example of a specific process in accordance with the procedure of data recording and reproduction shown in FIGS. 36A to 36C and 37 will be described.

For example, in FIG. 34, it is assumed that data "A0" is newly recorded in ECC cluster#i 6000 in a user data area in accordance with a recording instruction from the host apparatus 305. In this case, values of flags for a physical sector 6003 where data "A0" is recorded are given as Flag-A=0, Flag-B=0 and Flag-C=0.

The size of data "A0" given from the host apparatus 305 does not match the boundary of the ECC cluster. Therefore, padding data, which is invalid data, is recorded in the remaining portion of the ECC cluster #i 6000 by the drive apparatus 310. Values of flags for a physical sector where padding data is recorded are given as Flag-A=1, Flag-B=0 and the like.

Figure 38A:
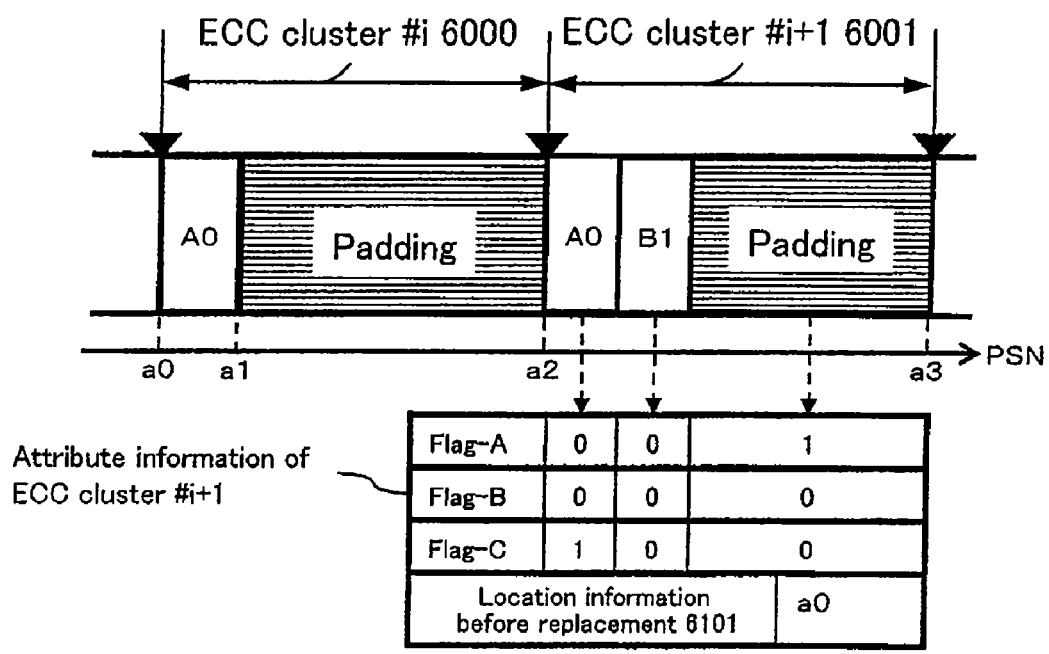
FIG. 38A is an illustrative diagram showing a replacement recording according to an embodiment of the present invention.

Next, in the state shown in FIG. 34, if the host apparatus 305 instructs to record data "B1" at PSN=a1 in ECC cluster #i 6000, the result of recording will be as shown in FIG. 38A.

ECC cluster #i 6000 is already recorded in the state shown in FIG. 34. Thus, an RMW process and a replacement process are performed. In other words, the drive apparatus 310 reproduces ECC cluster #i 6000, inserts data "B1" for the reproduced data "A0" and then updates necessary flag values. The drive apparatus 310 also inserts padding data so as to match the boundary of the ECC cluster.

The data obtained as described above is recorded in ECC cluster #i+1 6001 which is an unrecorded area. Further, replacement management information 1010 having ECC cluster #i 6000 as an original location and ECC cluster #i+1 6001 as a replacement location is generated.

As shown in FIG. 38A, a value of Flag-C for the physical sector, in which data "A0" is recorded, in ECC cluster #i+1 6001 is 1. The reason for this is because in the RMW process described above, the drive apparatus 310 has just copied data "A0" from ECC cluster #i to ECC cluster #i+1 and has not updated the value thereof.

Figures 39A, 39B:
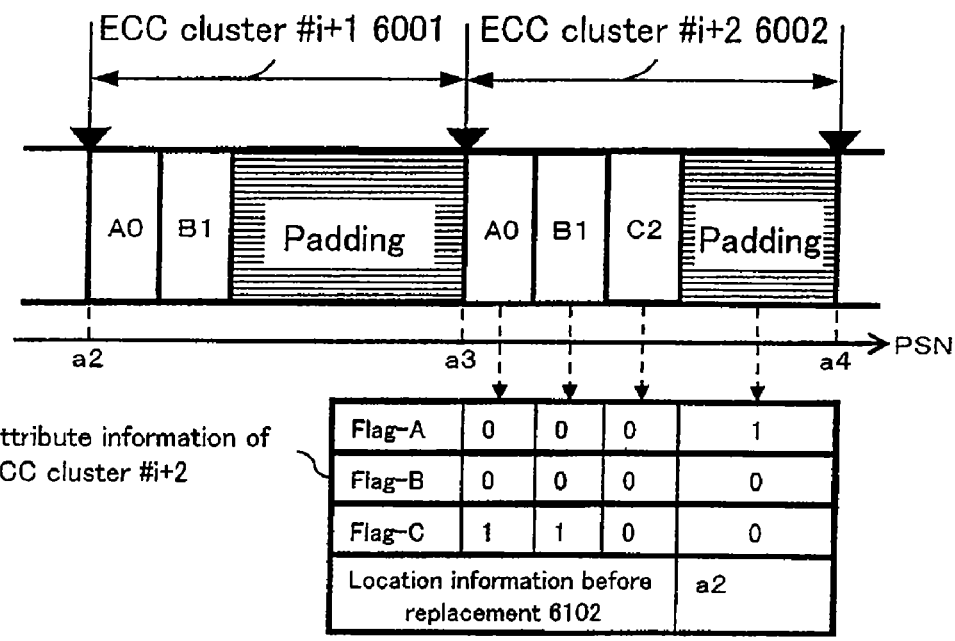
FIG. 39A is an illustrative diagram showing a replacement recording according to an embodiment of the present invention.
FIG. 39B is an illustrative diagram showing a replacement management information according to an embodiment of the present invention.

Next, in the state shown in FIG. 38A, if the host apparatus 305 instructs to record data "C2" in ECC cluster #i 6000, the result of recording will be as shown in FIG. 39A.

Similarly, in this case, ECC cluster #i 6000 is already recorded. Thus, the RMW process and the replacement process are performed. In other words, the drive apparatus 310 reproduces ECC cluster #i+1 6001, inserts data "C2" and padding data for the reproduced data and then updates necessary flag values. Thereafter, the obtained data is recorded in ECC cluster #i+2 6002 which is an unrecorded area. Further, replacement management information 6200 having ECC cluster #i 6000 as an original location and ECC cluster #i+2 6002 as a replacement location is generated, as shown in FIG. 39B.

Herein, it is assumed that the reproduction of data "A0" has failed in reproducing ECC cluster #i+1 6001. Conventionally, the RMW process cannot be performed due to this failure, which results in a recording error.

Figure 40A:
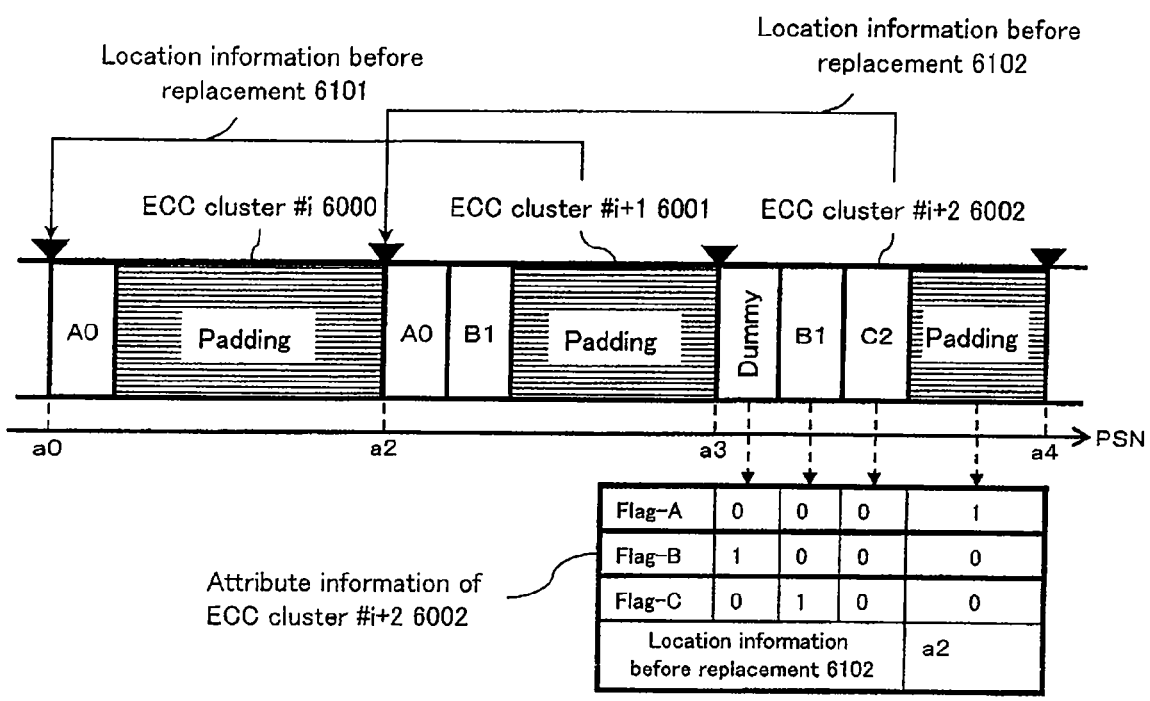
FIG. 40A is an illustrative diagram showing a replacement recording according to an embodiment of the present invention.

In contrast, in the present embodiment, as shown in FIG. 40A, dummy data is recorded in a physical sector in the ECC cluster #i+2 6002 where data "A0" is to be recorded, and Flag-B=1 is set as a flag value. In the other physical sectors, correct data reproduced from ECC cluster #i+1 6001 which is the immediately previous replacement cluster is recorded. Owing to the recording procedure described above, it is possible to continue performing the recording to ECC cluster #i+2.

Similarly, in this case, the replacement management information 6200 shown in FIG. 39B is generated.

Alternatively, as shown in FIG. 39A, the value of Flag-C of the physical sector, in which data "A0" is recorded, in ECC cluster #i+1 6001 is checked. If it is found that an update has not been made (=1), data "A0" may be read from ECC cluster #i 6000 where data having the immediately previous state of ECC cluster #i+1 6001 is recorded and then may be recorded to ECC cluster #i+2 6002.

Since the data having the immediately previous state is read, each ECC cluster according to the present embodiment has location information before replacement as one of its attribute information.

The location information before replacement will be described with reference to FIGS. 38A, 39A and 40A. For example, ECC cluster #+1 6001 has, as the location information before replacement 6101, a value of PSN=a0 which is address information of the first physical sector of ECC cluster #i 6000 (see FIG. 38A). Similarly, ECC cluster #i+2 6002 has, as the location information before replacement 6102, a value of PSN=a2 which is address information of the first physical sector of ECC cluster #i+1 6001 (see FIGS. 39A and 40A).

In other words, the recording of data "B0" to ECC cluster #i+1 6001, which has been described with reference to FIG. 38A, is a first time replacement recording and thus there is no immediately previous replacement location. Therefore, a value of PSN=a0, which is address information of the first physical sector of original ECC cluster #i 6000 is set in the location information before replacement 6101.

The recording of data "C2" to ECC cluster #i+2 6002, which has been described with reference to FIG. 39A, is a second time or more replacement recording. Therefore, a value of PSN=a2, which is address information of the first physical sector of immediately previous ECC cluster #i+1 6001 is set in the location information before replacement 6102.

The recording of data "A0" to ECC cluster #i 6000, which has been described with reference to FIG. 34, is not a replacement recording. Therefore, to indicate this information, for example, "0" is set in the location information before replacement 6100.

A write-once recording medium using ECC clusters has a characteristic that data updating is performed as pseudo-overwrite recording and thus new data is recorded with data having an immediately previous state remaining.

In the present embodiment, by utilizing this feature and further providing in an ECC cluster identification information, which indicates whether or not data has been updated in the RMW process, and location information before replacement, it is possible to improve the reliability of pseudo-overwrite recording.

In other words, attribute information, which indicates whether data recorded by the drive apparatus 310 in each physical sector is valid data or invalid data given from the host apparatus 305, is provided.

In the case of the invalid data, the drive apparatus 310 can distinguish whether it is (i) padding data (Flag-A=1) recorded in order to match the boundary of an ECC cluster since the size of data instructed by the host apparatus 305 for recording is smaller than that of the ECC cluster or (ii) invalid data (Flag-B=1) recorded in order to fill a physical sector, the reproduction of which has failed, in the RWM process.

In the RMW process, even in the case of an occurrence of a reproduction error, it is possible to complete the recording process by recording dummy data which is invalid data and setting attribute information indicating this state (Flag-B=1).

Further, at the time of reproduction, it is possible to determine whether or not there exists immediately previous valid data at a location indicated by the location information before replacement and thus it is possible to recover from the reproduction error by reproducing the immediately previous data.

Furthermore, invalid data (padding data), which is inserted because the size of data instructed by the host apparatus 305 for recording is small, and dummy data are distinguishable in a unit of physical sector. Thus, in recovering from a reproduction error, it is possible to determine from which physical sector data is valid.

If it is determined that there is immediately previous valid data, data is reproduced from an ECC cluster at a location indicated by the location information before replacement. Thus, it is possible to obtain valid data. Therefore, it is possible to improve the reliability of pseudo-overwrite recording.

By providing the location information before replacement, it is possible to reproduce the immediately previous data at the time of reproduction from a replaced ECC cluster and thus it is possible to recover from the reproduction error.

By providing Flag4, the following effects can be obtained.

When a certain replacement cluster is reproduced, there are cases in which the replacement cluster cannot be reproduced for some reason. For example, one of such cases is when stain (e.g. fingerprint of a user) is attached to the replacement cluster.

In this case, the drive apparatus 310 makes reference to Flag4 of the replacement management information, and in the case of Flag4=00 or Flag4=01, it attempts to reproduce an ECC cluster indicated by the original location information 1012.

In the case of Flag4=00, the original cluster is a defective cluster and thus a verify process failed at the time of recording the original cluster.

However, there is a possibility that the reproduction may be successfully performed this time. For example, the reproduction may be successfully performed when the state of the information recording medium 100 is changed (e.g. stain has been removed or ambient temperature is different) from the time of the verify process, or a drive apparatus for performing the reproduction is different.

If the reproduction is successfully performed, the data is the same as the one to be reproduced from the replacement cluster. Therefore, even if the reproduction from the replacement cluster has failed, it is possible to reproduce necessary data from the original cluster, and the host apparatus 305 can receive correct data.

In the case of Flag4=01, the original cluster is a cluster before an update has been made. Thus, normally, the reproduction of the ECC cluster can be performed. However, a portion of or entire data in the ECC cluster is rewritten by the RMW process at the time of updating.

To put it another way, a portion of the data remains in the cluster before the update has been made without any change. Therefore, the unchanged data is valid data for the host apparatus 305.

Further, in order to reliably return only such unchanged data from the drive apparatus 310 back to the host apparatus 305, information, capable of distinguishing physical sectors which have been updated and non-updated at the time of RMW, may be recorded in each of the physical sectors. For example, Flag-B and Flag-C, which are attribute information of an ECC cluster, correspond to such information.

Owing to this, it is possible to return data only on the unchanged physical sector back to the host apparatus 305.

In the case of Flag4=10, data in an original cluster has no relationship with updated data. Thus, the reproduction of the data is not performed and the reproduction of the data is treated as a reproduction error.

By performing the processes described above, it is possible to reproduce/record data from/on the information recording medium 100 with high reliability.

As shown in the replacement management information 514A and the replacement management information 6200, which have been described as one example of Flag4=01, when a plurality of replacement recordings is performed, the original information 1012 of those replacement management information does not indicate the immediately previous replacement cluster.

For example, the original cluster indicated by the original information 1012 of the replacement management information 514A is an ECC cluster having PSN=1228. However, the immediately previous replacement cluster is an ECC cluster having PSN=1292.

Therefore, when a plurality of recordings is performed, it is possible to recognize the immediately previous cluster before updating by making reference to the location information before replacement described above.

For example, in the case of the replacement management information 6200 shown in FIG. 39B, status 2 2011B="1000", which indicates ECC cluster #i 6000 having PSN=a0 as an original cluster.

However, as shown in FIG. 39A, for ECC cluster #i+2 6002, the immediately previous cluster before updating is ECC cluster #i+1 6001.

Dummy data is recorded (Flag-B=1) in the first physical sector of ECC cluster #i+2 6002 since it was not possible to perform reproduction in the RMW process.

In this case, the drive apparatus 310 can reproduce data from ECC cluster #i+1, which is a cluster before updating, in order to reproduce ECC cluster #i+2 6002, so that data on the first sector of ECC cluster #i+1 6001 can be returned back to the host apparatus 305 instead of the first sector of ECC cluster #i+2 6002.

Embodiment 7

When the latest replacement management list cannot be reproduced due to damage, stain or the like on an information recording medium, it is not possible to identify whether or not an ECC cluster specified by a reproduction instruction has been replaced with another ECC cluster. In this case, it is not possible to correctly reproduce the data specified by the reproduction instruction.

Therefore, in order to correctly reproduce the data, it is necessary to check whether the ECC cluster specified by the reproduction instruction has been replaced with another ECC cluster and then repair the latest replacement management list.

In the present embodiment, a procedure of data reproduction when it is not possible to reproduce a portion of or entire replacement management information list 1000 for some reason will be described with reference to FIG. 41.

Figure 41:
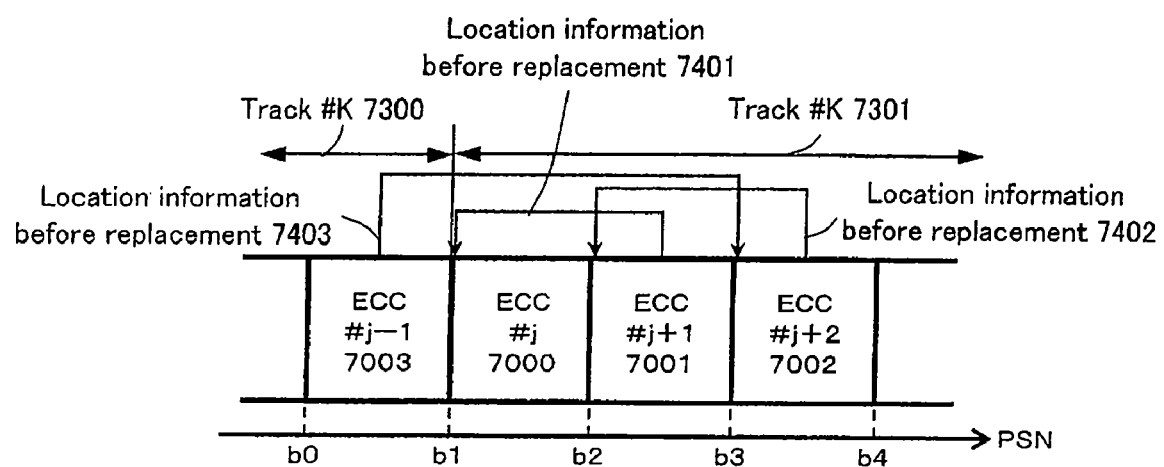
FIG. 41 is an illustrative diagram showing a replacement recording according to an embodiment of the present invention.

FIG. 41 is a diagram showing an example of data structure of the information recording medium 100 on which a plurality of recordings has been performed.

In FIG. 41, ECC cluster #j 7000 is an original cluster, and a plurality of replacement recordings has been performed for ECC cluster #j 7000. Replacement clusters are designated as ECC cluster #j+1 7001, ECC cluster #j+2 7002 and ECC cluster #j−1 7003 in that order of replacement.

This recording order when a replacement location is retrieved is determined, for example, as described above, by a retrieving procedure that first retrieves an unrecorded area along a direction in which the PSNs are increased from the location of the original ECC cluster and then, once the retrieving has reached the end location of user data, it goes back to the beginning of the user data.

In the present embodiment, each ECC cluster includes location information before replacement shown in FIG. 41.

In this state, when it is not possible to reproduce a portion of or entire replacement management information list 1000 for some reason, conventionally, it is impossible to correctly reproduce data since the corresponding relationship in a replacement recording is unclear.

In the present embodiment, a method will be described in which location information before replacement held by each ECC cluster is checked so as to repair the latest replacement management information 1000 and thus correct data reproduction can be performed.

When a repair process according to the present embodiment is performed, an information recording/reproduction apparatus 300B and a drive apparatus 310 reproduce each ECC cluster of the information recording medium 100 and then checks the location information before replacement held by each ECC cluster.

In other words, the location information before replacement held by each ECC cluster of the information recording medium 100 is checked. Then, it is recognized that an ECC cluster, in which information indicating that no replacement recording is performed (e.g. value is "0") is set in the location information before replacement, is an original ECC cluster or an ECC cluster for which a replacement recording has not been performed.

It is recognized that an ECC cluster, in which a value of the location information before replacement is not information indicating that no replacement recording is performed, is a replacement ECC cluster.

In FIG. 41, information indicating that no replacement recording is performed (e.g. value is "0") is set in location information before replacement of ECC cluster #j 7000.

Information indicating PSN=b1, PSN=b2 and PSN=b3 is set in location information before replacement 7700, 7701 and 7702 of ECC clusters #j+1 7001, #j+2 7002 and #j−1 7003, respectively.

In this state, it is necessary to detect the latest replacement location for ECC cluster #j 7000.

The latest replacement location for ECC cluster #j 7000 is determined by using the location information before replacement. In other words, it is possible to determine the latest replacement cluster by checking the location information before replacement.

In FIG. 41, it is recognized that ECC cluster #j 7000 has been replaced with ECC cluster #j−1 7003.

Owing to this, it is possible to regenerate replacement management information having ECC cluster #j 7000 as an original cluster and ECC cluster #j−1 7003 as a replacement cluster, and thus the replacement management information list 1000 can be repaired.

As described above, even when it is not possible to reproduce a portion of or entire replacement management information list 1000 for some reason, it is possible to repair the latest replacement management information list 1000 by checking the value of location information before replacement for all the recorded ECC clusters of the information recording medium 100.

In other words, it is possible to regenerate the replacement management information list 1000 since the corresponding relationship between the original cluster and the replacement cluster can be recognized. Thus, it is then possible to perform a normal reproduction from next time by recording the regenerated replacement management information list 1000 on the information recording medium 100.

Regarding another method for determining the latest replacement cluster, a method in which an updating counter is provided as attribute information of each ECC cluster can be employed.

This updating counter sets 0 to an ECC cluster for new recording. Regarding a replacement ECC cluster to be recorded, the updating counter increments by one every time an update is made.

In FIG. 41, "0" is set to ECC cluster #j 7000. "1", "2" and "3" are set to ECC cluster #j+1 7001, ECC cluster #j+2 7002 and ECC cluster #j−1 7003, respectively.

The ECC cluster which has the largest value in the updating counter holds the latest data.

A flag indicating a type of recording (Flag-D) may be provided as attribute information of an ECC cluster.

This flag is information indicating whether a replacement ECC cluster is for replacement recording of a defective cluster (Flag-D=0) or for replacement recording of pseudo-overwrite recording (Flag-D=1).

Supposedly, when ECC cluster #j 7000 described above becomes a defective cluster, there are cases in which it is not possible to reproduce attribute information of location information before replacement and the like included in ECC cluster #j 7000.

In such a case, if there is a flag indicating the type of recording (Flag-D) in a replacement ECC cluster, then it is possible to recognize whether the original cluster is a defective cluster or a cluster before updating for pseudo-overwrite recording.

Such information is useful in regenerating the replacement management information list 1000.

In the pseudo-overwrite recording, information indicating that replacement recording is not performed, an address value of an original cluster and an address value of an immediately previous replacement cluster are set and recorded in location information before replacement. Thus, by reproducing the ECC cluster having the location information before replacement held therein, it is possible to repair the ECC cluster when the replacement management information list is damaged for some reason. By checking the location information before replacement of all the recorded ECC clusters, it is possible to recognize whether they are original ECC clusters or replacement ECC clusters. Further, it is possible to determine the latest replacement ECC cluster with respect to the original ECC cluster.

Embodiment 8

Figure 42:
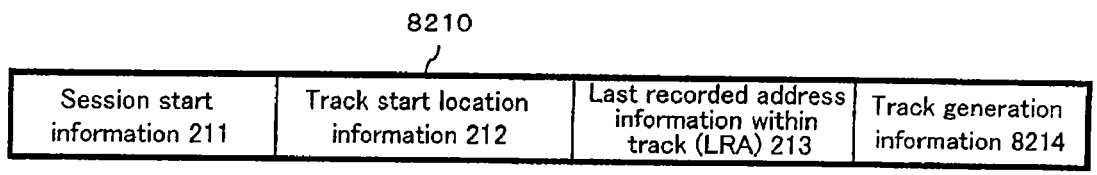
FIG. 42 is an illustrative diagram showing an exemplary data structure of track management information 9210 according to an embodiment of the present invention.

FIG. 42 is a diagram showing a data structure of track management information 8210 according to the present embodiment. The track management information 8210 is characterized that it has track generation information 8214 in addition to track management information 210.

The track generation information 8214 is provided for storing various information when a track is added to an information recording medium 100.

For example, the host apparatus 305 instructs a size and location of a track. Thus, when a new track is added, information indicating the addition of the new track is set in the track generation information 8214 of the track management information 8210 which corresponds to the track specified regarding the size and location. This information is, for example, a predetermined flag or ID information indicating its host apparatus.

As another example, the drive apparatus 310 instructs a size and location of a track. Thus, when a new track is added, a flag indicating the addition of the new track is set in the track generation information 8214 of the track management information 8210 which corresponds to the track specified regarding the size and location. Alternatively, ID information indicating its host apparatus may be set.

There may exist a track which is not clearly instructed regarding a size and location of the track. A predetermined value is set for the track generation information 8214 in the track management information 8210 which corresponds to the track. For example, the track generation information 8214 is set only having 00h.

Figure 43:
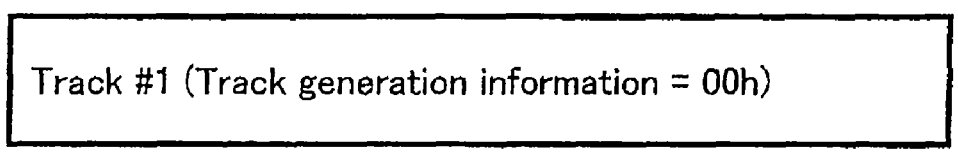
FIG. 43 is an illustrative diagram showing a track allocation of an information recording medium according to an embodiment of the present invention.

FIG. 43 is a diagram showing the change of a state when a track is added to the information recording medium 100.

Figure 44:
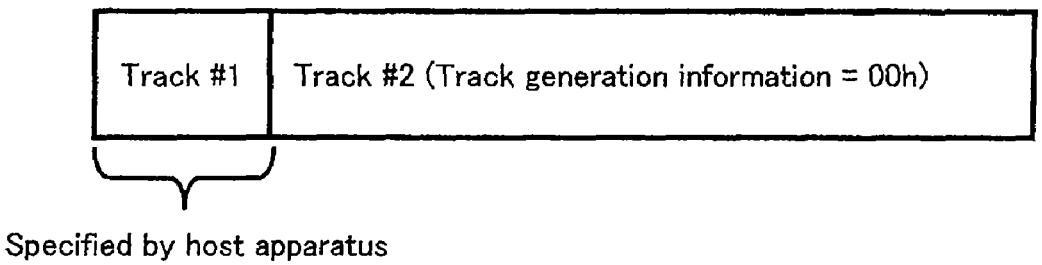
FIG. 44 is an illustrative diagram showing a track allocation of an information recording medium according to an embodiment of the present invention.

FIG. 43 shows an initial state, and the entire information recording medium is allocated to one track #1. FIG. 44 shows a state in which a size of track #1 is specified by the host apparatus 305 and track #2 is added for the initial state shown in FIG. 43.

In this case, a flag indicating that track #1 is generated by the host apparatus 305 is set in the track generation information 8214 for track #1.

In contrast, track #2 is not directly specified regarding its size and the like by the host apparatus 305. Track #2 is a track which has been added incidental to the specification of the size of track #1.

Thus, 00h is set in the track generation information 8214 for track #2.

Figure 45:
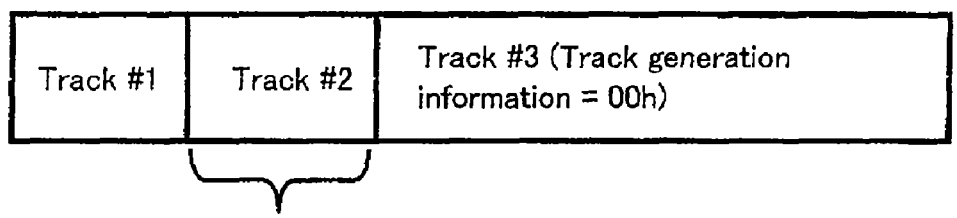
FIG. 45 is an illustrative diagram showing a track allocation of an information recording medium according to an embodiment of the present invention.

Hereinafter, in a similar manner, when a size of track #2 is specified in FIG. 45, a flag is re-set in the track generation information 8214 for track #2 so as to indicate that track #2 is generated by the host apparatus 305.

Track #3 is not directly specified regarding its size and the like by the host apparatus 305. Track 3 is a track which has been added incidental to the specification of the size of track #2. Thus, 00h is set in the track generation information 8214 for track #3.

Figure 46:
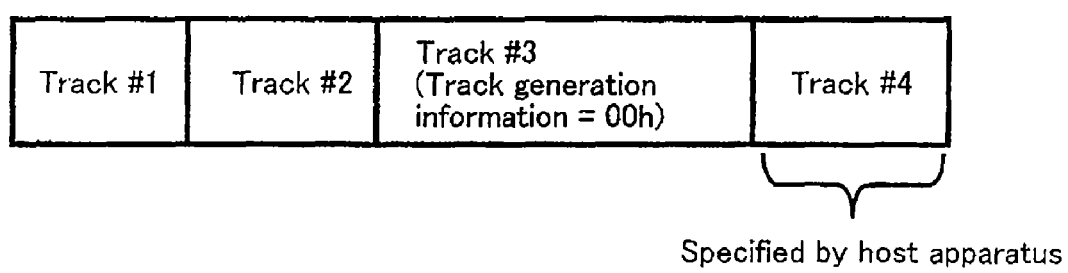
FIG. 46 is an illustrative diagram showing a track allocation of an information recording medium according to an embodiment of the present invention.

In FIG. 46, it is instructed by the host apparatus 305 to newly add track #4 at the end location of the information recording medium 100.

In this case, a flag indicating that track #4 is generated by the host apparatus 305 is set in the track generation information 8214 for track #4.

The size of track #3 can be changed. However, since it is not directly specified by the host apparatus 305, the value of the track generation information 8214 does not change (remain as 00h).

The track generation information 8241 described above is useful in the following case.

Normally, a track is secured by the host apparatus 305 or the like for some purpose.

If there is no remaining space on a certain track, a new track is added.

In this case, it is considered that the host apparatus 305 has instructed to add a new track for the track having an unrecorded area.

However, tracks which were added, by the instruction from the host apparatus 305 before the new track is added, were added for some utilization purpose.

Therefore, a size which is allocated to each track is set with some purpose. Thus, addition of another track for such a certain track contradicts the purpose at the time when the track was initially added.

In the present embodiment, the track generation information 8214 is referred to so as to determine if there are any tracks for which a size is not intentedly set by the host apparatus 305 or the like before a new track is added.

In other words, when a track having 00h set in the track generation information 8214 is found, a new track then is added for that track.

By performing the process described above, it is possible to add a new track without contradicting the purpose at the time when a track was initially added, thereby improving the convenience for application and user.

It is possible to add a new track for only a track having 00h set in the track generation information 8214 and prohibit the addition of new track for a track having values other than 00h set. In this case, it is possible to more strictly limit the addition of new track, which contradicts the purpose at that time when a track was initially added.

INDUSTRIAL APPLICABILITY

The present invention is useful, since it provides a drive apparatus and the like capable of utilizing the user data area without any loss in the pseudo-overwrite recording for the write-once optical disc.

The invention claimed is:

1. A drive apparatus for performing a sequential recording for a write-once recording medium, wherein
the write-once recording medium includes a plurality of error correction code (ECC) clusters,
the drive apparatus comprising:
  a recording/reproduction section for performing a recording operation or a reproduction operation for the write-once recording medium; and
  a drive control section for controlling the recording/reproduction section,
wherein
the drive control section at least performs a process including:
  receiving a recording instruction at least specifying a location at which data is to be recorded;
  determining whether a data recording which is performed in accordance with the recording instruction is an appending recording, a first time pseudo-overwrite recording or a second time or more pseudo-overwrite recording;
  generating data including location information for an immediately previous ECC cluster having information set therein according to the result of the determination; and
  controlling the recording/reproduction section to record the data in one of the plurality of ECC clusters of the write-once recording medium,
the drive control section performs a process including:
  when the data recording is determined to be the appending recording,
    setting information indicating that a replacement recording is not performed in the location information for an immediately previous ECC cluster;
  when the data recording is determined to be the first time pseudo-overwrite recording,
    setting information indicating the location specified by the recording instruction in the location information for an immediately previous ECC cluster; or
  when the data recording is determined to be the second time or more pseudo-overwrite recording,
    setting information indicating a replacement location for the location specified by the recording instruction in the location information for an immediately previous ECC cluster.

2. A drive apparatus for performing a sequential recording for a write-once recording medium, wherein
the write-once recording medium includes a plurality of error correction code (ECC) clusters,
each of the plurality of ECC clusters includes a plurality of physical sectors and a plurality of attribute information, the plurality of attribute information respectively corresponding to the plurality of physical sectors,
the drive apparatus comprising:
a recording/reproduction section for performing a recording operation or a reproduction operation for the write-once recording medium; and
a drive control section for controlling the recording/reproduction section,
wherein
the drive control section at least performs a process including:
receiving a recording instruction at least specifying data to be recorded and a location at which the data is to be recorded;
determining whether or not the data specified by the recording instruction can be recorded in at least one of the plurality of physical sectors included in one of the plurality of ECC clusters; and
controlling the recording/reproduction section to record invalid data and the attribute information in each of the at least one physical sector when it is determined that the data specified by the recording instruction cannot be recorded in the at least one physical sector,
in an read-modify-write (RMW) process of reproducing data recorded in an original ECC cluster including the location specified by the recording instruction; modifying at least a portion of the reproduced data; and recording the modified data in a replacement ECC cluster, the drive control section performs a process including
controlling the recording/reproduction section to record dummy data as the invalid data in a physical sector in the replacement ECC cluster and setting first information in the attribute information corresponding to the physical sector having the invalid data recorded thereon when the data recorded in a physical sector included in the original ECC sector cannot be recorded due to a failure of the data reproduction, the physical sector in the replacement ECC cluster replacing the physical sector in the original ECC cluster having the failure of the data reproduction; and
controlling the recording/reproduction section to record padding data as the invalid data in each of the at least one physical sector, with an insufficient amount of the data, of the plurality of physical sectors included in the ECC cluster and setting second information in the attribute information corresponding to each of the at least one physical sector having the invalid data recorded thereon when the data specified by the recording instruction cannot be recorded due to the amount of data insufficiently filling one entire ECC cluster.

3. A drive apparatus for reproducing data recorded in a write-once recording medium, wherein
the write-once recording medium includes a plurality of error correction code (ECC) clusters,
each of the plurality of ECC clusters includes a plurality of physical sectors,
location information for an immediately previous ECC cluster is recorded in each of the plurality of ECC sectors,
information indicating that a replacement recording is not performed is set in the location information for an immediately previous ECC cluster when a data recording which is performed in accordance with a recording instruction is an appending recording,
information indicating the location specified by the recording instruction is set in the location information for an immediately previous ECC cluster when the data recording which is performed in accordance with the recording instruction is a first time pseudo-overwrite recording; and
information indicating a replacement location for the location specified by the recording instruction is set in the location information for an immediately previous ECC cluster when the data recording which is performed in accordance with the recording instruction is a second time or more pseudo-overwrite recording,
attribute information is recorded in each of the plurality of physical sectors, first information or second information is set in the attribute information,
in an read-modify-write (RMW) process of reproducing data recorded in an original ECC cluster including the location specified by the recording instruction; modifying at least a portion of the reproduced data; and recording the modified data in a replacement ECC cluster, the first information indicates that the data recorded in a physical sector included in the original ECC sector cannot be recorded due to a failure of the data reproduction,
the second information indicates the data specified by the recording instruction cannot be recorded due to the amount of data insufficiently filling one entire ECC cluster,
the drive apparatus comprising:
a recording/reproduction section for performing a recording operation or a reproduction operation for the write-once recording medium; and
a drive control section for controlling the recording/reproduction section,
wherein
the drive control section at least performs a process including:
receiving a reproduction instruction at least specifying a location at which data is to be recorded;
determining whether or not an ECC cluster including the location specified by the reproduction instruction is already replaced with a replacement ECC cluster;
controlling the recording/reproduction section to reproduce data recorded in the replacement ECC cluster when it is determined that the ECC cluster including the location specified by the recording instruction is already replaced with the replacement ECC cluster;
determining whether or not attribute information having the first information set therein is included in the reproduced data;
controlling the recording/reproduction section to reproduce the data recorded in a physical sector included in an ECC cluster, at a location indicated by the location information for an immediately previous ECC cluster, corresponding to the replacement ECC cluster when the attribute information having the first information set therein is determined to be included in the reproduced data, the physical sector corresponding to a physical sector having the attribute information recorded thereon, the attribute information having the first information set therein at the replacement ECC cluster.

4. A method for performing a sequential recording for a write-once recording medium, the write-once recording medium including a plurality of error correction code (ECC) clusters, the method performing at least steps of:

determining whether a data recording which is performed in accordance with a recording instruction specifying at least a location at which data is to be recorded is an appending recording, a first time pseudo-overwrite recording or a second time or more pseudo-overwrite recording;

generating data including location information for an immediately previous ECC cluster having information set therein according to the result of the determination; and recording the data in one of the plurality of ECC clusters of the write-once recording medium, wherein when the data recording is determined to be the appending recording, information indicating that a replacement recording is not performed in the location information for an immediately previous ECC cluster is set;

when the data recording is determined to be the first time pseudo-overwrite recording, information indicating the location specified by the recording instruction in the location information for an immediately previous ECC cluster is set; and when the data recording is determined to be the second time or more pseudo-overwrite recording, information indicating a replacement location for the location specified by the recording instruction in the location information for an immediately previous ECC cluster is set.

5. A method for performing a sequential recording for a write-once recording medium, wherein the write-once recording medium includes a plurality of error correction code (ECC) clusters, each of the plurality of ECC clusters includes a plurality of physical sectors and a plurality of attribute information, the plurality of attribute information respectively corresponding to the plurality of physical sectors, the method performing at least steps of:

determining whether or not the data specified by a recording instruction specifying at least data to be recorded and a location at which the data is to be recorded can be recorded in at least one of the plurality of physical sectors included in one of the plurality of ECC clusters; and recording invalid data and the attribute information in each of the at least one physical sector when it is determined that the data specified by the recording instruction cannot be recorded in the at least one physical sector, wherein in an read-modify-write (RMW) process of reproducing data recorded in an original ECC cluster including the location specified by the recording instruction; modifying at least a portion of the reproduced data; and recording the modified data in a replacement ECC cluster, when the data recorded in a physical sector included in the original ECC sector cannot be recorded due to a failure of the data reproduction, the physical sector in the replacement ECC cluster replacing the physical sector in the original ECC cluster having the failure of the data reproduction, dummy data is recorded as the invalid data in a physical sector in the replacement ECC cluster and first information is set in the attribute information corresponding to the physical sector having the invalid data recorded thereon; and when the data specified by the recording instruction cannot be recorded due to the amount of data insufficiently filling one entire ECC cluster, padding data is recorded as the invalid data in each of the at least one physical sector, with an insufficient amount of the data, of the plurality of physical sectors included in the ECC cluster and second information is set in the attribute information corresponding to each of the at least one physical sector having the invalid data recorded thereon.

6. A reproduction method for reproducing data recorded in a write-once recording medium, wherein the write-once recording medium includes a plurality of error correction code (ECC) clusters, each of the plurality of ECC clusters includes a plurality of physical sectors, location information for an immediately previous ECC cluster is recorded in each of the plurality of ECC sectors, information indicating that a replacement recording is not performed is set in the location information for an immediately previous ECC cluster when a data recording which is performed in accordance with a recording instruction is an appending recording, information indicating the location specified by the recording instruction is set in the location information for an immediately previous ECC cluster when the data recording which is performed in accordance with the recording instruction is a first time pseudo-overwrite recording; and information indicating a replacement location for the location specified by the recording instruction is set in the location information for an immediately previous ECC cluster when the data recording which is performed in accordance with the recording instruction is a second time or more pseudo-overwrite recording, attribute information is recorded in each of the plurality of physical sectors, first information or second information is set in the attribute information, in an read-modify-write (RMW) process of reproducing data recorded in an original ECC cluster including the location specified by the recording instruction; modifying at least a portion of the reproduced data; and recording the modified data in a replacement ECC cluster, the first information indicates that the data recorded in a physical sector included in the original ECC sector cannot be recorded due to a failure of the data reproduction, the second information indicates the data specified by the recording instruction cannot be recorded due to the amount of data insufficiently filling one entire ECC cluster, the method performing at least steps of:

determining whether or not an ECC cluster including the location specified by a reproduction instruction specifying at least a location at which data is to be recorded is already replaced with a replacement ECC cluster;

reproducing data recorded in the replacement ECC cluster when it is determined that the ECC cluster including the location specified by the recording instruction is already replaced with the replacement ECC cluster; and when attribute information having the first information set therein is included in the reproduced data, reproducing the data recorded in a physical sector included in an ECC cluster, at a location indicated by the location information for an immediately previous ECC cluster, corresponding to the replacement ECC cluster, the physical sector corresponding to a physical sector having the attribute information recorded thereon, the attribute information having the first information set therein at the replacement ECC cluster.

* * * * *